US008827517B2

(12) United States Patent
Cammenga et al.

(10) Patent No.: US 8,827,517 B2
(45) Date of Patent: Sep. 9, 2014

(54) CLEAR BEZEL

(75) Inventors: David J. Cammenga, Zeeland, MI (US); Danny L. Minikey, Jr., Fenwick, MI (US); Mark R. Roth, Coloma, MI (US); William L. Tonar, Holland, MI (US); Jeremy A. Fogg, Holland, MI (US); Michael F. Lisowski, Holland, MI (US); Peter N. Rizk, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 90 days.

(21) Appl. No.: 13/271,745

(22) Filed: Oct. 12, 2011

(65) Prior Publication Data

US 2012/0268961 A1    Oct. 25, 2012

Related U.S. Application Data

(60) Provisional application No. 61/503,942, filed on Jul. 1, 2011, provisional application No. 61/441,841, filed on Feb. 11, 2011, provisional application No. 61/392,119, filed on Oct. 12, 2010.

(51) Int. Cl.
*B60Q 1/26* (2006.01)
*B60R 1/08* (2006.01)
*B60R 1/12* (2006.01)

(52) U.S. Cl.
CPC ......... *B60R 1/088* (2013.01); *B60R 2001/1253* (2013.01); *B60R 1/12* (2013.01); *B60R 1/1207* (2013.01)
USPC ........... 362/494; 362/135; 359/871; 359/841; 359/844

(58) Field of Classification Search
CPC ........ B60Q 3/00; B60Q 3/023; B60Q 3/0279; F21S 8/10; B60R 1/00
USPC .......... 362/494, 135; 359/601, 838, 871–877, 359/841, 844
See application file for complete search history.

(56) References Cited

U.S. PATENT DOCUMENTS 3,171,886 A    3/1965 Holt et al.
3,382,354 A    5/1968 Hedgewick et al.
(Continued)

FOREIGN PATENT DOCUMENTS

EP    0047808 A1    9/1980
WO    2011044312 A1    4/2011

OTHER PUBLICATIONS

Patent Cooperation Treaty, International Searching Authority, International Search Report, Written Opinion of the International Searching Authority and Notification of Transmittal, May 31, 2012, 22 Pages.

*Primary Examiner* — Mary McManmon
(74) *Attorney, Agent, or Firm* — Price Heneveld LLP; Scott P. Ryan

(57) ABSTRACT

A rearview assembly having a mounting structure configured to be operably coupled with a vehicle. A housing is operably connected with the mounting structure and a rearward viewing device is supported by one of the housing and the mounting structure. The rearward viewing device provides a rearward view to a vehicle driver and includes a front substrate and a rear substrate. The entire front surface of the front substrate is exposed and the entire rear substrate is positioned behind the front substrate. A concealing layer is disposed about a periphery of the rearward viewing device between the front substrate and the rear substrate. A partially optically transparent bezel is disposed adjacent to both the rearward viewing device and the housing, the optically transparent bezel having an edge radius greater than 2.5 mm and the optically transparent bezel being substantially flush with the front surface of the front substrate.

44 Claims, 28 Drawing Sheets

(56) References Cited

U.S. PATENT DOCUMENTS

| | | | |
|---|---|---|---|
| 4,308,316 A | 12/1981 | Gordon | |
| 4,377,613 A | 3/1983 | Gordon | |
| 4,419,386 A | 12/1983 | Gordon | |
| 4,440,822 A | 4/1984 | Gordon | |
| 4,679,906 A * | 7/1987 | Brandenburg | 359/606 |
| 5,066,112 A | 11/1991 | Lynam et al. | |
| 5,151,824 A * | 9/1992 | O'Farrell | 359/604 |
| 5,198,929 A | 3/1993 | Clough | |
| 5,659,423 A * | 8/1997 | Schierbeek et al. | 359/604 |
| 5,669,705 A * | 9/1997 | Pastrick et al. | 362/494 |
| 5,679,283 A | 10/1997 | Tonar et al. | |
| 5,682,267 A * | 10/1997 | Tonar et al. | 359/603 |
| 5,790,298 A | 8/1998 | Tonar | |
| 5,888,431 A | 3/1999 | Tonar et al. | |
| 5,928,572 A | 7/1999 | Tonar et al. | |
| 5,940,201 A | 8/1999 | Ash et al. | |
| 6,102,546 A | 8/2000 | Carter | |
| 6,193,378 B1 | 2/2001 | Tonar et al. | |
| 6,264,353 B1 * | 7/2001 | Caraher et al. | 362/494 |
| 6,447,123 B2 | 9/2002 | Tonar et al. | |
| 6,466,136 B2 | 10/2002 | Deline et al. | |
| 6,499,850 B2 | 12/2002 | Waldmann | |
| 6,545,794 B2 | 4/2003 | Ash et al. | |
| 6,572,233 B1 | 6/2003 | Northman et al. | |
| 6,578,972 B1 | 6/2003 | Heirich et al. | |
| 6,614,579 B2 * | 9/2003 | Roberts et al. | 359/267 |
| 6,635,194 B2 | 10/2003 | Kloeppner et al. | |
| 6,697,024 B2 * | 2/2004 | Fuerst et al. | 343/711 |
| 6,709,136 B2 * | 3/2004 | Pastrick et al. | 362/494 |
| D493,394 S | 7/2004 | Lawlor et al. | |
| 6,816,297 B1 | 11/2004 | Tonar et al. | |
| 6,888,322 B2 | 5/2005 | Dowling et al. | |
| 6,916,100 B2 * | 7/2005 | Pavao | 359/841 |
| 7,064,882 B2 * | 6/2006 | Tonar et al. | 359/267 |
| 7,121,028 B2 * | 10/2006 | Shoen et al. | 40/593 |
| 7,310,178 B2 * | 12/2007 | Lawlor et al. | 359/267 |
| 7,324,261 B2 | 1/2008 | Tonar et al. | |
| 7,349,143 B2 | 3/2008 | Tonar et al. | |
| 7,372,611 B2 | 5/2008 | Tonar et al. | |
| 7,379,225 B2 | 5/2008 | Tonar et al. | |
| 7,391,563 B2 * | 6/2008 | McCabe et al. | 359/345 |
| 7,477,439 B2 | 1/2009 | Tonar et al. | |
| 7,488,099 B2 | 2/2009 | Fogg et al. | |
| 7,510,287 B2 | 3/2009 | Hook | |
| 7,510,311 B2 * | 3/2009 | Romas et al. | 362/494 |
| 7,511,872 B2 | 3/2009 | Tonar et al. | |
| 7,532,149 B2 * | 5/2009 | Banko et al. | 342/20 |
| 7,570,413 B2 | 8/2009 | Tonar et al. | |
| 7,602,542 B2 | 10/2009 | Tonar et al. | |
| 7,612,929 B2 | 11/2009 | Tonar et al. | |
| 7,683,768 B2 | 3/2010 | Lindahl et al. | |
| 7,690,824 B2 * | 4/2010 | Uken et al. | 362/494 |
| 7,719,750 B2 | 5/2010 | Tonar et al. | |
| 7,817,020 B2 | 10/2010 | Turnbull et al. | |
| 7,859,738 B2 | 12/2010 | Baur et al. | |
| 7,914,172 B2 | 3/2011 | Nagara et al. | |
| 7,978,393 B2 | 7/2011 | Tonar et al. | |
| 7,990,079 B2 | 8/2011 | Hargenrader et al. | |
| 8,004,741 B2 | 8/2011 | Tonar et al. | |
| 8,049,640 B2 | 11/2011 | Uken et al. | |
| 8,287,164 B2 * | 10/2012 | Fehn et al. | 362/494 |
| 2001/0055214 A1 | 12/2001 | Chang | |
| 2002/0024713 A1 * | 2/2002 | Roberts et al. | 359/267 |
| 2002/0093826 A1 * | 7/2002 | Bos et al. | 362/494 |
| 2002/0191409 A1 | 12/2002 | Deline et al. | 362/494 |
| 2003/0031024 A1 * | 2/2003 | Fant et al. | 362/494 |
| 2003/0128131 A1 * | 7/2003 | Skiver et al. | 340/815.4 |
| 2004/0032638 A1 | 2/2004 | Tonar et al. | |
| 2005/0281043 A1 | 12/2005 | Eisenbraun | |
| 2006/0126150 A1 * | 6/2006 | Tonar et al. | 359/265 |
| 2007/0201122 A1 | 8/2007 | Dozeman et al. | |
| 2008/0310005 A1 | 12/2008 | Tonar et al. | |
| 2009/0091489 A1 * | 4/2009 | Banko et al. | 342/20 |
| 2009/0213604 A1 * | 8/2009 | Uken | 362/494 |
| 2009/0251913 A1 * | 10/2009 | Bruhnke et al. | 362/494 |
| 2009/0303566 A1 | 12/2009 | Tonar et al. | |
| 2010/0020380 A1 | 1/2010 | Tonar et al. | |
| 2010/0032017 A1 | 2/2010 | Bae | |
| 2010/0066519 A1 | 3/2010 | Baur et al. | |
| 2010/0067253 A1 | 3/2010 | Fehn et al. | |
| 2010/0091394 A1 * | 4/2010 | DeWind et al. | 359/838 |
| 2010/0246017 A1 | 9/2010 | Tonar et al. | |
| 2010/0321758 A1 | 12/2010 | Bugno et al. | |
| 2011/0001428 A1 * | 1/2011 | Rodriguez Barros et al. | 315/77 |
| 2011/0283577 A1 * | 11/2011 | Cornelissen et al. | 40/582 |
| 2011/0317242 A1 | 12/2011 | Tonar et al. | |
| 2012/0236388 A1 * | 9/2012 | De Wind et al. | 359/267 |

* cited by examiner

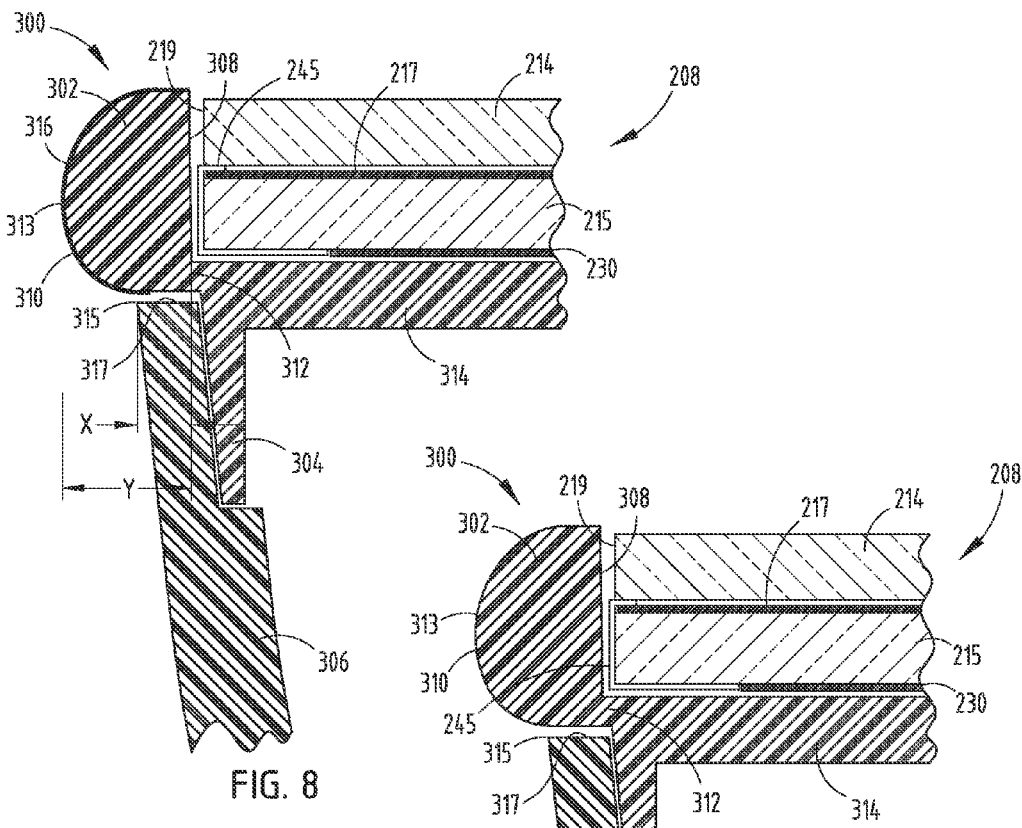
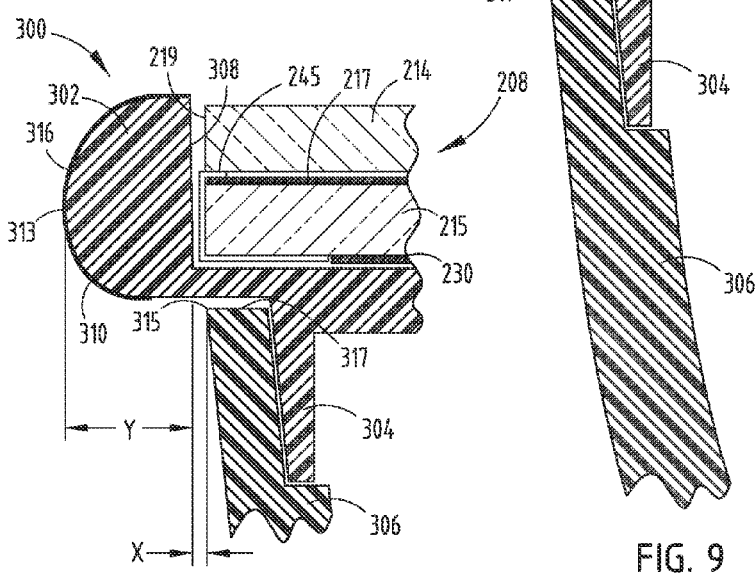
FIG. 8
FIG. 9
FIG. 8A

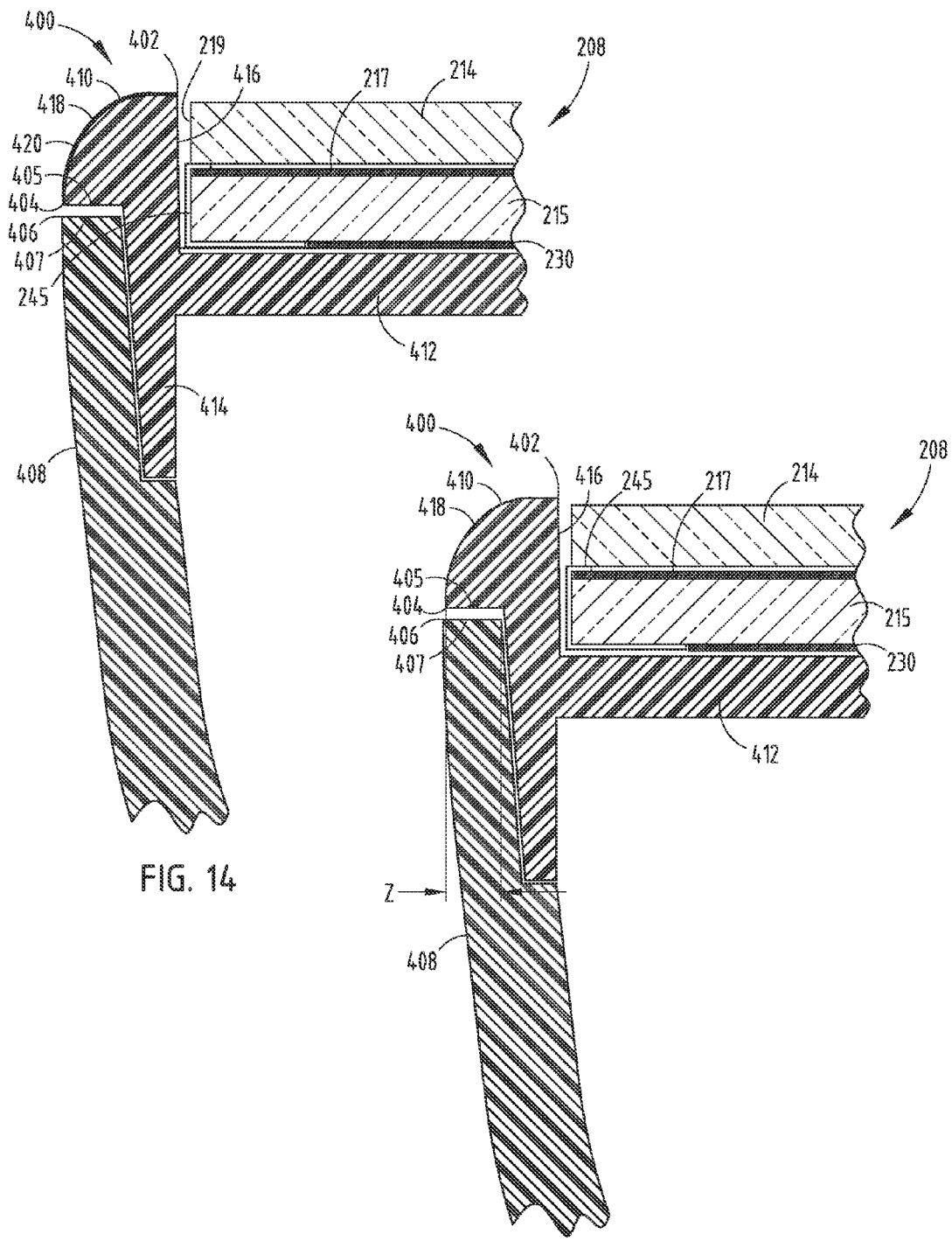

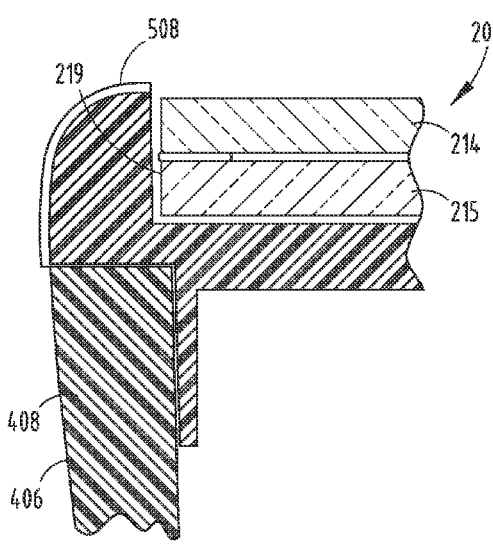
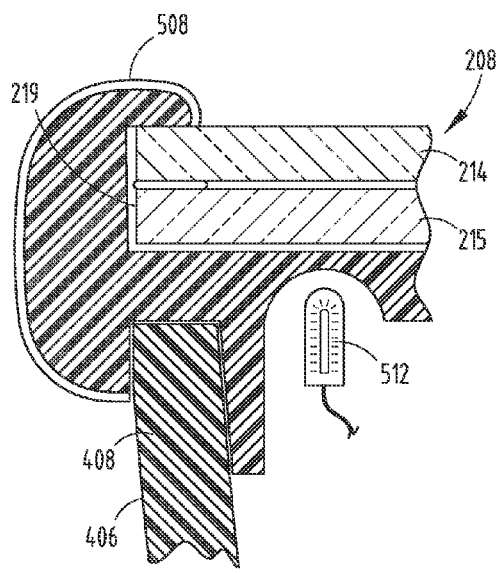
FIG. 30A    FIG. 30B
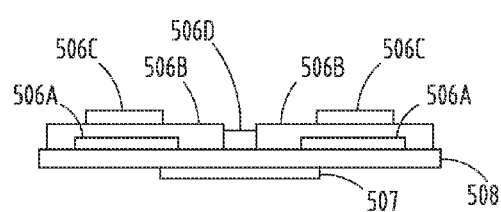
FIG. 30C
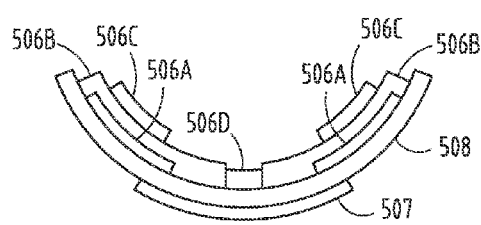
FIG. 30D
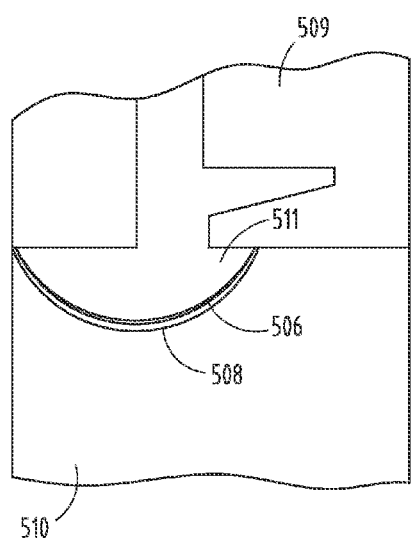
FIG. 30E

CLEAR BEZEL

CROSS-REFERENCE TO RELATED APPLICATIONS

This application claims the benefit of and priority to: U.S. Provisional Patent Application No. 61/503,942, filed on Jul. 1, 2011, entitled "CLEAR BEZEL," U.S. Provisional Patent Application No. 61/441,841, filed on Feb. 11, 2011, entitled "CLEAR BEZEL"; and U.S. Provisional Patent Application No. 61/392,119, filed on Oct. 12, 2010, entitled "CLEAR BEZEL," the disclosures of which are hereby incorporated herein by reference in their entirety.

FIELD OF THE INVENTION

The present invention generally relates to rearview assemblies and systems incorporating such devices. In particular, the invention relates to electro-optic devices used in architectural windows or vehicular rearview mirror elements.

SUMMARY OF THE INVENTION

One aspect of the present invention includes a rearview assembly having a mounting structure configured to be operably coupled with a vehicle. A housing is operably connected with the mounting structure and a rearward viewing device is supported by one of the housing and the mounting structure. The rearward viewing device provides a rearward view to a vehicle driver and includes a front substrate and a rear substrate. The entire front surface of the front substrate is exposed and the entire rear substrate is positioned behind the front substrate. A concealing layer is disposed about a periphery of the rearward viewing device between the front substrate and the rear substrate. A partially optically transparent bezel is disposed adjacent to both the rearward viewing device and the housing, the optically transparent bezel having an edge radius greater than 2.5 mm and the optically transparent bezel being substantially flush with the front surface of the front substrate.

Another aspect of the present invention includes a rearview assembly having a mounting structure configured to be operably coupled with a vehicle. A housing is operably connected with the mounting structure. A rearward viewing device is supported by one of the housing and the mounting structure. The rearward viewing device is adapted to provide a rearward view to a vehicle driver. A partially optically transparent bezel is disposed adjacent to both the rearward viewing device and the housing. A hiding layer is disposed between one of: 1) the bezel and rearward viewing device; and 2) the bezel and housing.

Another aspect of the present invention includes a rearview assembly having a mounting structure configured to be operably coupled with a vehicle. A housing is supported on the mounting structure. A rearward viewing device has a front surface and is operably coupled with the housing proximate a forward edge of the housing. The rearward viewing device is configured to provide a rearward view to a vehicle driver. A substantially optically transparent bezel is disposed adjacent to the rearward viewing device and the housing. The bezel has a forward edge that is substantially flush with the front surface of the rearward viewing device and an outer perimeter that is larger than an outer perimeter of the forward edge of the housing.

Yet another aspect of the present invention includes a rearview assembly having a mounting structure configured to be operably coupled with a vehicle. A housing with an outer wall is operably connected to the mounting structure. A rearward viewing device has a front surface. The rearward viewing device is operably connected to the housing and adapted to provide a rearward view to a vehicle driver. An at least partially optically transparent bezel is disposed adjacent to both the rearward viewing device and the housing. The bezel has a forward edge that is substantially flush with the front surface of the rearward viewing device and a side edge that is substantially flush with the outer wall of the housing. A hiding layer is disposed on the bezel.

Still another aspect of the present invention includes a rearview assembly having a mounting structure configured to be operably coupled with a vehicle. A housing is operably connected with the mounting structure. A rearward viewing device is supported by one of the housing and the mounting structure. The rearward viewing device is adapted to provide a rearward view to a vehicle driver. A bezel is included and has an arcuate outer wall that is at least partially optically transparent and an inner wall adjacent to an outer periphery of the rearward viewing device. A light source is adjacent to the bezel and is configured to illuminate a portion of the bezel.

Yet another aspect of the present invention includes a rearview assembly having a mounting structure configured to be operably coupled with a vehicle. A housing is operably connected with the mounting structure. A rearward viewing device is supported by one of the housing and the mounting structure. The rearward viewing device is adapted to provide a rearward view to a vehicle driver. A substantially optically transparent bezel is operably connected with a forward edge of the rearward viewing device. A decorative treatment is disposed between the optically transparent bezel and the rearward viewing device.

These and other aspects, objects, and features of the present invention will be understood and appreciated by those skilled in the art upon studying the following specification, claims, and appended drawings.

BRIEF DESCRIPTION OF THE DRAWINGS

FIG. 4 is an enlarged cross-sectional view of area IV of the rearview assembly shown in

FIG. 3;

FIG. 8 is an enlarged cross-sectional partial view of one embodiment of a clear bezel of the present invention;

FIG. 8A is another enlarged cross-sectional partial view of one embodiment of a clear bezel of the present invention;

FIG. 9 is an enlarged cross-sectional partial view of another embodiment of a clear bezel of the present invention;

FIG. 14 is an enlarged cross-sectional partial view of another embodiment of a clear bezel of the present invention;

FIG. 15 is an enlarged cross-sectional partial view of another embodiment of a clear bezel of the present invention;

FIG. 30A is an enlarged cross-sectional partial view of another embodiment of a clear bezel of the present invention;

FIG. 30B is an enlarged cross-sectional partial view of another embodiment of a clear bezel of the present invention;

FIG. 30C is an enlarged cross-sectional view of a film layer for use on a bezel of the present invention;

FIG. 30D is an enlarged cross-sectional view of the film layer of FIG. 30C after forming;

FIG. 30E is an enlarged cross-sectional partial view of a clear bezel of the present invention during the molding process and introduction of a film layer;

DETAILED DESCRIPTION OF EMBODIMENTS

Figure 1:
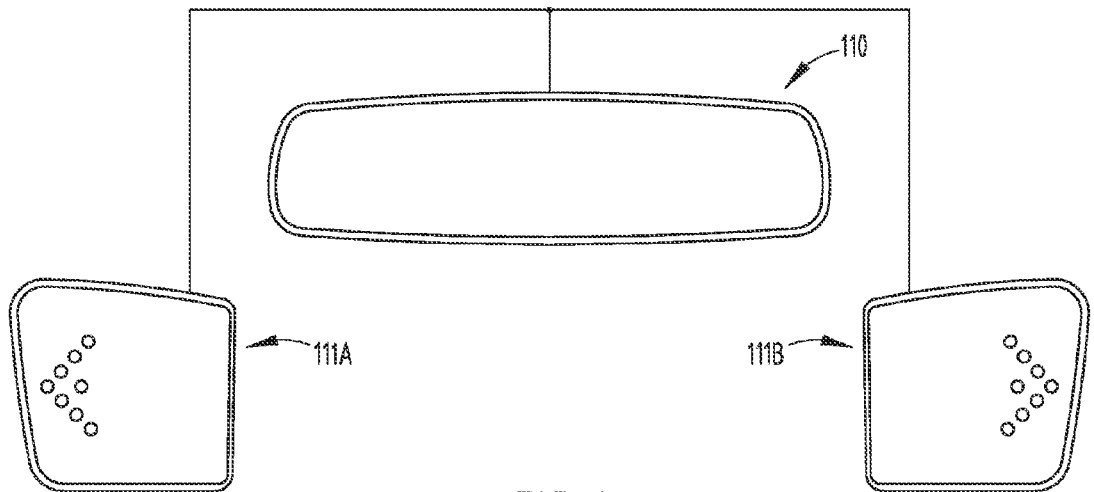
FIG. 1 is a front elevational view schematically illustrating one embodiment of an inside/outside electrochromic rearview mirror system for motor vehicles.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a front elevational view schematically illustrating an inside mirror assembly 110 and two outside rearview mirror assemblies 111a and 111b for the driver-side and passenger-side, respectively, all of which are adapted to be installed on a motor vehicle in a conventional manner and where the mirrors face the rear of the vehicle and can be viewed by the driver of the vehicle to provide a rearward view. While mirror assemblies in general are utilized herein to describe the present invention, it is noted that this invention is equally applicable to the construction of electrochromic windows. The inside mirror assembly 110 and the outside rearview mirror assemblies 111a, 111b may incorporate light-sensing electronic circuitry of the type illustrated and described in the above-referenced Canadian Patent No. 1,300,945, U.S. Pat. Nos. 5,204,778, or 5,451,822, and other circuits capable of sensing glare and ambient light and supplying a drive voltage to the electrochromic element. In the illustrated example, electrical circuitry 150 (FIG. 2) is connected to and allows control of the potential to be applied across the reflector/electrode 120 (FIG. 2) and a transparent electrode 128 (FIG. 2), such that electrochromic medium 126 (FIG. 2) will darken and thereby attenuate various amounts of light traveling therethrough and then vary the reflectance of the mirror containing the electrochromic medium 126. The mirror assemblies 110, 111a, 111b are similar in that like numbers identify components of the inside and outside mirrors. These components may be slightly different in configuration, but function in substantially the same manner and obtain substantially the same results as similarly numbered components. For example, the shape of the front glass element of the inside mirror 110 is generally longer and narrower than the outside mirrors 111a, 111b. There are also some different performance standards placed on the inside mirror 110 compared with the outside mirrors 111a, 111b. For example, the inside mirror 110 generally, when fully cleared, should have a reflectance value of about 50 percent to about 85 percent or higher, whereas the outside mirrors often have a reflectance of about 50 percent to about 65 percent. Also, in the United States (as supplied by the automobile manufacturers), the passenger-side mirror 111b typically has a spherically bent or convex shape, whereas the driver-side mirror 111a and the inside mirror 110 presently must be flat. In Europe, the driver-side mirror 111a is commonly flat or aspheric, whereas the passenger-side mirror 111b has a convex shape. In Japan, both of the outside mirrors 111a, 111b have a convex shape. The following description is generally applicable to all mirror assemblies of the present invention, while the general concepts are equally applicable to the construction of electrochromic windows.

Figure 2:
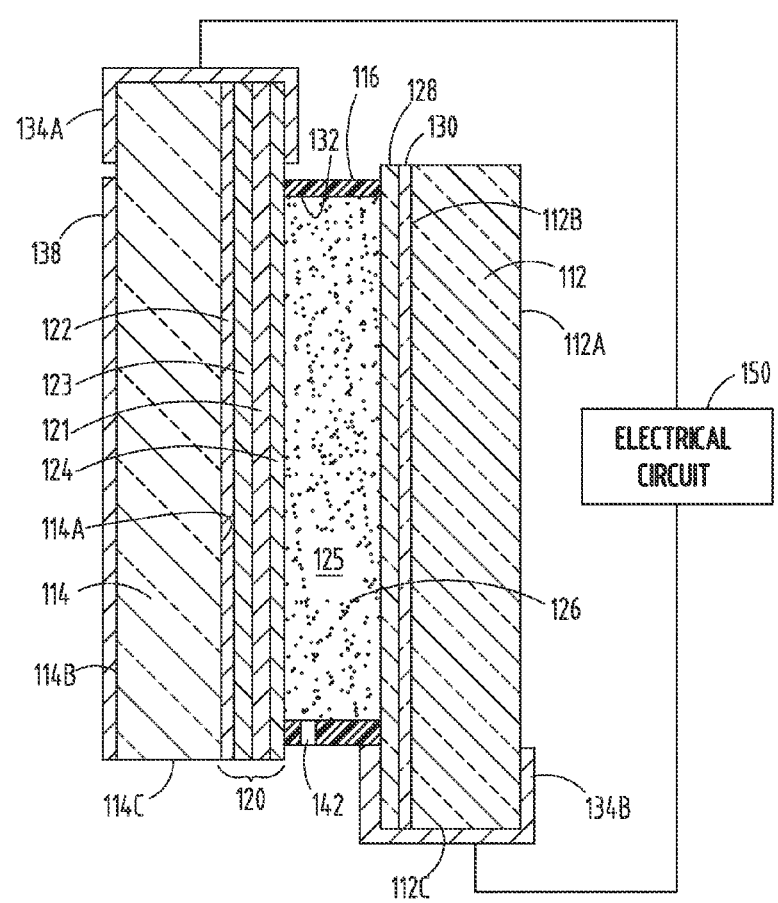
FIG. 2 is an enlarged cross-sectional view of an electrochromic mirror incorporating a third surface reflector/electrode.

FIG. 2 shows a cross-sectional view of the mirror assembly 111a having a front transparent substrate 112 having a front surface 112a and a rear surface 112b, and a rear substrate space 114 having a front surface 114a and a rear surface 114b. For clarity of description of such a structure, the following designations will be used hereinafter. The front surface 112a of the front substrate will be referred to as the first surface 112a, and the back surface 112b of the front substrate as the second surface 112b. The front surface 114a of the rear substrate will be referred to as the third surface 114a, and the back surface 114b of the rear substrate as the fourth surface 114b. The front substrate 112 further includes an edge surface 112c, while the rear substrate 114 further includes an edge surface 114c. A chamber 125 is defined by the layer of transparent electrode 128 (carried on the second surface 112b), the reflector/electrode 120 (FIG. 2) (disposed on the third surface 114a), and an inner circumferential wall 132 of a sealing member 116. The electrochromic medium 126 is contained within the chamber 125. When a user is seated in the vehicle, the front surface 112a is closest to the user.

As broadly used and described herein, the reference to an electrode or layer as being "carried" on or applied to a surface of an element, refers to both electrodes or layers that are disposed directly on the surface of an element or disposed on another coating, layer or layers that are disposed directly on the surface of the element. Further, it is noted that the mirror assembly 111a is described for explanatory purposes only, and that the specific components and elements may be rearranged therein, such as the configuration illustrated in FIG. 1, and those configurations known for electrochromic windows. The reflectors for the rearview assemblies disclosed herein are generally disposed on the fourth surface or behind the fourth surface.

The front transparent substrate 112 may be any material which is transparent and has sufficient strength to be able to operate in the conditions, e.g., varying temperatures and pressures, commonly found in the automotive environment. The front substrate 112 may comprise any type of borosilicate glass, soda lime glass, float glass, or any other material, such as, for example, a polymer or plastic, that is transparent in the visible region of the electromagnetic spectrum. The front substrate 112 may be a sheet of glass. The rear substrate 114 must meet the operational conditions outlined above, except that it does not need to be transparent in all applications, and therefore may comprise polymers, metals, glass, ceramics, and may be a sheet of glass.

The coatings of the third surface 114a are sealably bonded to the coatings on the second surface 112b in a spaced-apart and parallel relationship by the sealing member 116 disposed near the outer perimeter of both the second surface 112b and the third surface 114a. The sealing member 116 may be any material that is capable of adhesively bonding the coatings on the second surface 112b to the coatings on the third surface 114a to seal the perimeter such that the electrochromic material 126 does not leak from within the chamber 125. Optionally, the layer of transparent electrode 128 and the layer of reflector/electrode 120 may be removed over a portion where the sealing member 116 is disposed (not the entire portion, otherwise the drive potential could not be applied to the two coatings). In such a case, the sealing member 116 must bond well to glass.

The performance requirements for the perimeter sealing member 116 used in an electrochromic device are similar to those for a perimeter seal used in a liquid crystal device (LCD), which are well known in the art. The sealing member 116 must have good adhesion to glass, metals and metal oxides; must have low permeabilities for oxygen, moisture vapor, and other detrimental vapors and indium; and must not interact with or poison the electrochromic or liquid crystal material it is meant to contain and protect. The perimeter sealing member 116 can be applied by means commonly used in the LCD industry, such as by silk-screening or dispensing. Totally hermetic seals, such as those made with glass frit or solder glass, can be used, but the high temperatures involved in processing (usually near 450 degrees C.) this type of seal can cause numerous problems, such as glass substrate warpage, changes in the properties of transparent conductive electrode, and oxidation or degradation of the reflector. Because of their lower processing temperatures, thermoplastic, thermosetting or UV curing organic sealing resins may be used. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins may be used. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments may be used. Cured resin crosslink density can be controlled by use of mixtures of mono-functional, di-functional, and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter sealing member 116 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 21Z, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, 8202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif.

The electrochromic medium 126 is capable of attenuating light traveling therethrough and has at least one solution-phase electrochromic material in intimate contact with the reflector/electrode 120 and at least one additional electroactive material that may be solution-phased, surface-confined, or one that may plate onto a surface. However, the presently preferred medium is solution-phased redox electrochromics, such as those disclosed in U.S. Pat. Nos. 4,902,108; 5,128,799; 5,278,693; 5,280,380; 5,282,077; 5,294,376; and 5,336,448 6,020,987 entitled "AN IMPROVED ELECTROCHROMIC MEDIUM CAPABLE OF PRODUCING A PRE-SELECTED COLOR, DISCLOSES ELECTROCHROMIC MEDIUM THAT ARE PERCEIVED TO BE GREY THROUGH THEIR NORMAL RANGE OF OPERATION." The entire disclosures of these patents are hereby incorporated by reference herein. If a solution-phase electrochromic medium is utilized, it may be inserted into chamber 125 through a sealable fill port 142 (FIG. 2) through well-known techniques. It should be noted that the electrochromic medium 126 may also be a solid state electrochromic device.

The layer of transparent electrode 128 is deposited on the second surface 112b to act as an electrode. The transparent electrode 128 may be any material which bonds well to front substrate 112, is resistant to corrosion to any materials within the electrochromic device, resistant to corrosion by the atmosphere, has minimal diffuse or specular reflectance, high light transmission, near neutral coloration, and good electrical conductance. The transparent electrode 128 may be fluorine-doped tin oxide, doped zinc oxide, indium zinc oxide ($Zn_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, or other transparent conductors. Generally, the conductance of transparent electrode 128 will depend on its thickness and composition. If desired, an optional layer or layers of a color suppression material 130 (FIG. 2) may be deposited between the transparent electrode 128 and the second surface 112b to suppress the reflection of any unwanted portions of the electromagnetic spectrum.

The combination reflector/electrode 120 is disposed on the third surface 114a and comprises at least one layer of a reflective material 121 (FIG. 2) which serves as a mirror reflectance layer and also forms an integral electrode in contact with and in a chemically and electrochemically stable relationship with any constituents in an electrochromic medium. As stated above, the conventional method of building electrochromic devices was to incorporate a transparent conductive material on the third surface as an electrode, and place a reflector on the fourth surface. By combining the "reflector" and "electrode" and placing both on the third surface, several advantages arise which not only make the device manufacture less complex, but also allow the device to operate with higher performance. For example, the combined reflector/electrode 120 on the third surface 114a generally has higher conductance than a conventional transparent electrode and previously used reflector/electrodes, which allows greater design flexibility. One can either change the composition of the transparent electrode 128 on the second surface 112b to one that has lower conductivity (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductivity transparent electrode can be used on the second surface, such as, for example, ITO, IMI, etc. The combination of the high conductivity (i.e., less than 250 Ohms/square, preferably less than 15 Ohms/square) reflector/electrode 120 on the third surface 114a and the high conductivity transparent electrode 128 on the second surface 112b will not only produce an electrochromic device with more even overall coloration, but will also allow for increased speed of coloration and clearing. Furthermore, in fourth surface reflector mirror assemblies there are two transparent electrodes with relatively low conductivity, and in previously used third surface reflector mirrors there is a transparent electrode and a reflector/electrode with relatively low conductivity and, as such, a long buss bar on the front and rear substrate to bring current in and out is necessary to ensure adequate coloring speed. The mirror assembly may further have a construction as described in U.S. Pat. No. 7,746,534; U.S. Patent Application Publication Nos. 2005/0270620; 2007/0201122; 2007/0206263; 2008/0030836; 2008/0302657; 2009/0207513; and pending U.S. patent application Ser. Nos. 12/691,830 and 12/819,802.

In the illustrated example, a resistive heater 138 (FIG. 2) is disposed on the fourth glass surface 114b. Electrically conductive spring clips 134a, 134b are placed on the coated glass sheets 112, 114 to make electrical contact with exposed areas of the transparent electrode 128 (clip 134b) and the third surface reflector/electrode 120 (clip 134a). Suitable electrical conductors (not shown) may be soldered or otherwise connected to the spring clips 134a, 134b so that a desired voltage may be applied to the device from a suitable power source.

One configuration in conformance with an appreciated embodiment of the present invention comprises a first substrate of glass approximately 1.6 mm thick having a conductive electrode approximately 0.4 wavelengths (approximately 80 percent of half-wave) thick of indium-tin-oxide applied over substantially the entire second surface by sputtering. It should be apparent that a portion of conductive electrode is removed during treatment. A spectral filter material approximately 400 ANG thick of chrome is applied approximately 4.5 mm wide near the perimeter of the first substrate proximate the conductive electrode. An electrical conduction stabilizing material approximately 100 ANG thick of a platinum group metal (PGM) (i.e., iridium, osmium, palladium, platinum, rhodium, and ruthenium) is applied approximately 2.0 cm wide near the perimeter of the first substrate proximate the spectral filter material. A first separation area is laser etched approximately 0.025 mm wide with a portion thereof extending parallel to, and within the width of, a portion of a primary seal material area to substantially electrically insulate the first and second conductive electrode portions, spectral filter material portions and adhesion promotion material portions. A second substrate of glass approximately 1.6 mm thick having an optional conductive electrode approximately 0.5 wavelengths thick over substantially all of the third surface is provided. A second separation area is laser etched approximately 20 to 200 µm wide with a portion thereof extending parallel to, and within the width of, a portion of a primary seal material to substantially electrically insulate the third and fourth conductive electrode portions. Alternatively, the second separation area may be formed by masking a portion of the reflector or by laser ablating most of the reflector in the seal/plug area so that the seal can be inspected and a plug can be inserted and UV cured. A reflective material approximately 400 ANG thick of chrome is applied proximate the third conductive electrode portion substantially defined by the inboard edge of the primary seal. An optional overcoat approximately 120 ANG thick of ruthenium is applied proximate the reflective material substantially defined by the inboard edge of the primary seal. A primary seal material, comprising an epoxy having a cycloaliphatic amine curing agent and approximately 155 µm substantially spherical glass or plastic beads, is provided to secure the first and second substrates together in a spaced apart relation to define a chamber. A substantially rigid polymer matrix electro-optic medium, as generally taught in assigned U.S. Pat. Nos. 5,679,283, 5,888,431, 5,928,572, 5,940,201, 6,545,794, and 6,635,194, the disclosures of which are incorporated in their entireties herein by reference, is provided between the first conductive electrode portion and the optional overcoat material within the chamber through a plug opening in the primary seal material. The plug opening is sealingly closed using ultra-violet light curable material with UV light irradiating the plug bottom through the third and fourth surface. The cured primary seal material and the plug material are inspected by viewing the element looking toward the fourth surface. An electrically conductive material comprising a bisphenol F epoxy functional resin, viscosity of approximately 4000 cP having a cycloaliphatic amine curing agent, viscosity of approximately 60 cP, and a silver flake, tap density approximately 3 g/cc and average particle size of approximately 9 µm is applied proximate the outboard edge of the primary seal material between the second adhesion promotion material portion, the third conductive electrode portion and the first electrical clip. This same electrically conductive material is applied proximate the outboard edge of the primary seal material between the first adhesion promotion material portion, the fourth conductive electrode portion and the second electrical clip. A double sided, pressure sensitive, adhesive material is provided between the electrical clip and the fourth surface of the second substrate. The electrically conductive material is cured after placement of the first and second electrical clips. The primary seal material is partially cured prior to application of the electrically conductive material; additional primary seal material curing coincides with curing the electrically conductive material. This curing process is beneficial to prevent warping of the element and improves overall related adhesion, sealing and conductivity characteristics. This example mirror element description is provided for illustrative purposes and in no way should be construed to limit the scope of the present invention. As described throughout this disclosure, there are many variants for the individual components of a given element and associated rearview mirror assembly.

In embodiments of the present invention having a highly reflective spectral filter material applied between the second surface of the first substrate and the primary seal, it has proven advantageous to use specifically selected spacer material to eliminate bead distortion. Glass beads are typically added to the primary seal material to control the spacing between the substrates that form the chamber containing the electro-optic medium. The diameter of preferably substantially spherically shaped glass beads is a function of the desired "cell" spacing.

These glass beads function well as spacers in electro-optic devices that have two transparent substrates, a transparent front substrate and a reflector positioned on surface three or four. These spacers also function well in devices with a spectral filter material on the first surface or within the first substrate. However, when the spectral filter material is applied proximate the primary seal material and the second surface, "dimples," or small distortions in the chrome spectral filter material, are created by typical glass spacer beads and are visible in the seal area of a resulting mirror element. These dimples are also visible in mirror elements having a third surface reflector; however, they can only be seen if the mirror element is viewed looking at the fourth surface. These third surface dimples in a reflector are not visible in a resulting mirror element when viewed once installed in a vehicle.

Additionally, it is known that the reflectivity of a low reflectance metal may be increased by putting a thin layer of a higher reflectance metal above it. For instance, metals such as Rhodium or Ruthenium may be used. The necessary thickness of these metals to attain a given reflectivity level will be a direct result of the surface roughness of the underlying chrome layer. Other metals that could be used as the conductive layer include, but are not limited to, aluminum, cadmium, chromium, cobalt, copper, gold, iridium, iron, magnesium, molybdenum, nickel, osmium, palladium, platinum, rhodium, ruthenium, silver, tin tungsten and zinc. Alloys of these metals with each other or with another metal or metals may be possible. The suitability of these materials in a given application will depend on the full list of requirements. For instance, Ruthenium may be an expensive metal in one application but in another application it may be low cost relative to another metal such as Rhodium and may therefore fall within the spirit of this invention. In other non-limiting embodiments a given metal or alloy may not be compatible with all of the other components in an application. In this case, the sensitive metal may be buried or otherwise isolated from components where there are interaction limitations. The layers deposited on top of the chrome usually will pattern the roughness of the underlying layer. Therefore, a thin layer of a higher reflectance metal will also not have its ideal reflectivity because of the layer or layers underneath it. In most instances the preferred embodiment is one that has the higher reflectance metal oriented toward the observer. Many of the high conductivity metals listed above also have high reflectivity. These metals may need to be alloyed with other metals to have adequate chemical, environmental or physical properties. The metals or alloys may then have an unacceptable color or hue. The overall reflectance intensity may be adequate for the desired application but if the reflected color does not meet requirements then the metal or alloy is unsuitable. In this case, similar to the description above, the metal or alloy may be buried beneath a layer with lower intrinsic reflectivity but one that has a more preferable reflected color.

A lower reflectivity requirement for OEC elements enables use of different configurations of materials including silver, silver alloys, chrome, rhodium, ruthenium, rhenium, palladium, platinum, iridium, silicon, semiconductors, molybdenum, nickel, nickel-chrome, gold and alloy combinations for the associated reflective and, or, transflective layer(s) stacks with fewer difficulties in meeting the preferred reflectance, durability and electrochromic performance characteristics. Some of these materials have an advantage over silver or silver alloys in that silver and silver alloys are susceptible to damage in an outside mirror environment. Use of harder metals is advantageous for durability of the mirror element in terms of manufacturing options and a more robust final product. Reflective and, or, transflective stacks may also be created with dielectric materials which produce high enough reflectance levels for use in an OEC element.

Silver based materials will generally gain approximately 1% transmittance for every percent of reflectance reduction in the mid-visible range. An advantage associated with increased transmission is the ability to utilize lower cost, lower light output light sources, such as, displays or LED's. The outside mirror has typically been used for indication type displays that generally use LED's that can be ordered with very high light outputs. Novel designs are disclosed herein that enable the use of Ag based transflective coatings in inside and outside mirror applications. These novel designs preserve the unique optical properties and benefits derived from the Ag layer while simultaneously addressing the limitations for using Ag based materials in outside applications. Different coating options may be considered when lower transmittance is part of the design criteria using stacks that have and do not have an Ag based layer. One big advantage to a lower transmittance is the reduction, or elimination, of the need for an opacifier layer.

In many markets the size of the mirror is increasing to allow for more field of view. The darkening time for larger mirrors is a challenge and is an important consideration in the design options. Larger mirrors, generally associated with outside mirrors, require increased or improved conductivity to maintain an acceptable darkening and clearing speed. The previous limitations of a single thin metal coating as described above are solved by the innovative use of a Transparent Conductive Oxide (TCO) in the stack. The TCO provides a means for achieving good conductivity while maintaining a high level of transmittance. Several of the following examples illustrate that satisfactory levels of transmittance for outside mirrors can be achieved with relatively thick Indium Tin Oxide (ITO). ITO is one specific example of the broader TCO class of materials. Other TCO materials include $F:SnO_2$, $Sb:SnO_2$, Doped ZnO, IZO, etc. The TCO layer is overcoated with a metal coating that may consist of a single metal or alloy or a multilayer metal coating. The use of multiple metal layers may be needed, for instance, to facilitate adhesion between different materials. In another embodiment a semiconductor layer may be added in addition or in lieu of the metal layers. The semiconductor layer provides some unique properties that will be discussed below. When the thickness of the ITO/TCO layer(s) is increased to improve conductivity the effects of coating roughness need to be considered. The increased roughness can lead to lower reflectance which in turn requires increased metal thickness which can lower transmittance. Increased roughness can also lead to unacceptable haze as described elsewhere. The roughness issue can be solved by either modifying the deposition process for the ITO and/or implementing ion beam smoothing after the ITO deposition and before the deposition of subsequent layers. Both methods were discussed above in detail. In addition, improved ITO materials discussed above may be employed in this embodiment to lower the sheet resistance of the overall transflective coating.

The semiconductor layer may comprise Silicon or doped silicon. Small amounts of an additional element or elements may be added to alter the physical or optical properties of the Silicon to facilitate its use in different embodiments. The benefit of a semiconductor layer is that it enhances the reflectivity with less absorption compared to a metal. Another benefit of many semiconductor materials is that they have a relatively low band gap. This equates to an appreciable amount of absorption in the blue to green wavelengths of the visible spectrum. The preferential absorption of one or more bands of light lends the coating to have relatively pure transmitted color. The high transmitted color purity equates to having certain portions of the visible or near infrared spectra with transmittance values greater than 1.5 times the transmittance of the lower transmitting regions. More preferably the transmittance in the high transmitting region will be greater than two times the transmittance in the low transmitting region and most preferably greater than four times the transmittance in the low transmitting region. Alternately, the transmitted color of the transflective stack should have a C* value [sqrt(a*.sup.2+b*.sup.2)] greater than about 8, preferably greater than about 12, and most preferably greater than about 16. Other semiconductor materials that result in transflective coatings with relatively high purity transmitted color include SiGe, InSb, InP, InGa, InAlAs, InAl, InGaAs, HgTe, Ge, GaSb, AlSb, GaAs and AlGaAs. Other semiconductor materials that would be viable would be those that have a band gap energy at or below about 3.5 eV. In an application where stealthy characteristics are desired and a red signal is used then a material such as Ge or an SiGe mixture may be preferred. Ge has a smaller band gap compared to Si and this results in a greater wavelength range that have relatively low transmittance levels. This can be preferred because the lower transmittance at wavelengths different from the display are more effective at hiding any features behind the mirror. If a uniform transmittance is needed then it would be advantageous to select a semiconductor material that has a relatively high band gap.

Figure 2A:
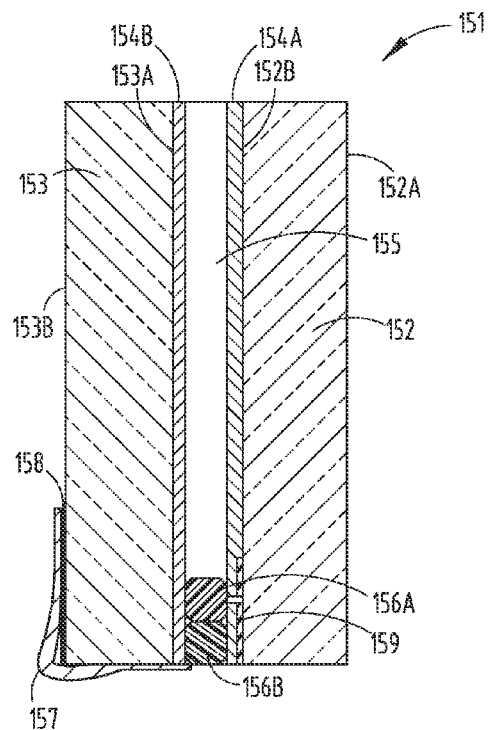
FIG. 2A is a cross-sectional elevational view of another embodiment of an electrochromic mirror assembly.

FIG. 2A illustrates yet another embodiment of an electrochromic mirror construction for an inside mirror assembly to be used as a rearward viewing device of the present invention. An inside mirror assembly 151 includes a front substrate 152 having a front surface 152A and a rear surface 152B. The inside mirror assembly 151 also includes a rear substrate 153 having a front surface 153A and a rear surface 153B. A first coating 154A is applied to the rear surface 152B of the front substrate 152 and a second coating 154B is applied to the front surface 153A of the front surface 153. In addition, an electrochromic medium 155 is disposed between the front substrate 152 and the rear substrate 153 and sealed between the substrates 152, 153 by a first sealant 156A (such as black epoxy). A second sealant 156B, which may also be an epoxy and which may be conductive, is disposed outward from the first sealant proximate the outer periphery of the inside mirror assembly 151. A clip 157 is operably coupled with the second substrate 153 by an adhesive 158 or similar material to provide electrical communication to the electrochromic medium 155 disposed between the front substrate and the rear substrate. An outer ring 159, sometimes referred generally as a chrome ring, is provided about a periphery of the inside mirror assembly 151 to hide the clip 157 as well as the first and second sealants 156A, 156B from view. The outer ring 159 is disposed between the front substrate 152 and rear substrate 153 and serves as a peripheral concealing layer that generally hides the clip 157 and sealants 156A, 156B from view.

Figure 3:
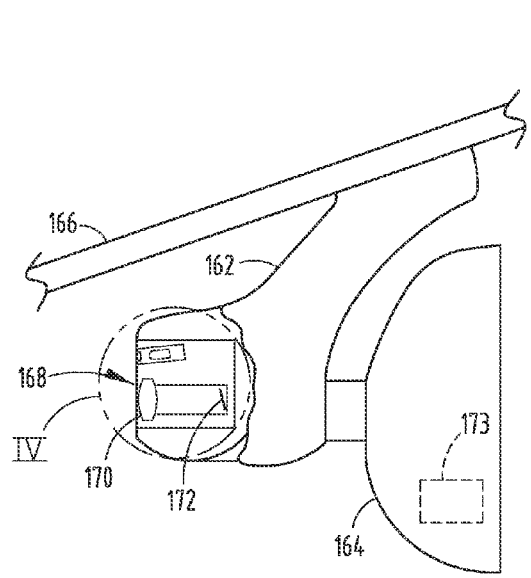
FIG. 3 is a side elevational view of a rearview assembly in partial cross section, constructed in accordance with an alternative embodiment of the present invention.
Figure 4:
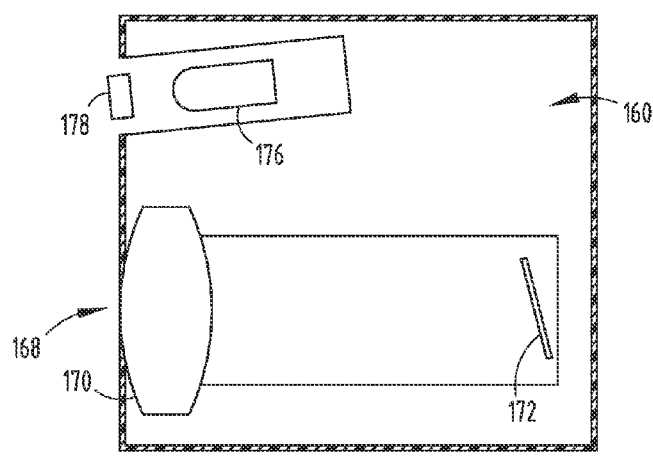

Turning now to the embodiment illustrated in FIGS. 3 and 4, a camera/sensor system 160 may be mounted in a mounting structure 162 of a rearview assembly of the present invention. The same structure 162 may likewise be mounted in or otherwise attached to a housing 164. In general, the system 160 shown in FIG. 3 may be used for sensing moisture on a windshield 166 of the vehicle in the manner disclosed in U.S. Pat. No. 5,923,027. As shown in FIG. 4, system 160 includes an image sensor 168 including a lens 170 and an image sensor array 172 for sensing an image of the vehicle windshield 166. A processor may be provided in housing 164 to perform a moisture detection algorithm based upon the sensed images. A supplemental illuminator 176 and an associated lens 178 may be provided to illuminate the portion of the window being imaged. Both lenses 170 and 178 may be made integral with the transparent walls of housing 164 or transparent walls of the transparent mounting structure 162. As noted above, image array sensor 172 may alternatively or additionally be used for sensing headlamps of oncoming vehicles or tail lamps of preceding vehicles such that the information obtained from these images may be used to control the headlamps of the vehicle in which the present invention is installed. As yet another alternative or additional feature, image array sensor 172 may be a high dynamic range, forward-looking camera that is sensitive to either near or far infrared for use in a collision avoiding system. As yet another alternative or additional feature, the camera may be used for adaptive cruise control systems. Additional systems and functionality, such as those disclosed in U.S. Pat. Nos. 5,537,003; 5,837,994; 5,990,469; 6,049,171; 6,130,421; 6,130,448; 6,255,639; 6,281,632; 6,291,812; 6,403,942; 6,429,594; 6,465,963; 6,469,739; 6,587,573; 6,593,698; 6,611,610; 6,621,616; 6,631,316; 6,653,614; 6,653,615; 6,728,393; 6,774,988; 6,861,809; 6,868,322; 6,906,467; 6,919,548; 6,924,470; 6,928,180; 6,947,576; 6,947,577; 7,149,613; 7,302,326; 7,321,112; 7,408,136; 7,417,221; 7,423,821; 7,432,967; 7,565,006; 7,567,291; 7,599,134; 7,613,327; 7,630,803; 7,653,215; and 7,700,906, which are incorporated herein by reference in their entirety, may be implemented into the mirror assembly disclosed in this application.

European regulations of automotive design require that a non-recessed hard edge of any element have a radius of at least 2.5 mm, as a safety measure. In response to such a requirement, a non-recessed perimeter edge of an inside automotive mirror may be covered with an appropriate bezel. To satisfy the European regulations, a front lip of a bezel extending over the perimeter edge of the mirror element is designed with an outer radius of at least 2.5 mm. As further discussed in this application, a mirror that has an about 5-mm-wide peripheral ring provides a uniform reflective appearance to the edge of the mirror by hiding the seal and the clip from view and covering the seal from exposure to light (such as chrome ring mirrors, for example) may have no bezel extending out onto the first surface of the mirror. For aesthetic reasons it is often desirable to either not have a perimeter bezel or have a bezel with a lip that surrounds the perimeter edge of the mirror and is substantially flush with the front substrate. For purposes of this application, "substantially flush" will be understood to mean that the forward edge of the bezel is level with the first surface of the front substrate, but may be as much as 0.3 mm offset from the first surface of the front substrate. If the bezel must meet the European edge design requirements and it is flush with the front surface of the mirror, the bezel must be configured to have an at least 2.5 mm radius curvature, which means that the overall transverse dimensions of the rearview assembly as viewed from the front of it are at least 5 mm larger than the transverse dimensions of the mirror element.

The outer ring, often generally referred to as a chrome ring, is formed from a material that closely resembles the underlying mirror substrate disposed on the third surface of the rear substrate. By closely matching the outer ring and the main reflector, the appearance is that the outer ring and the underlying mirror substrate on the third surface of the rear substrate are integral thus providing an aesthetically appealing design. Further, as noted above, the outer ring generally hides the seals, as well as peripheral clips from view, thereby generally defining a peripheral concealing layer. It should be understood that it is within the scope of the present invention to treat at least a portion of a surface, a corner, an edge, or a combination thereof to define "beveled," "rounded," "sanded," "seamed," "polished," "etched," "sand blasted," "water-jetted," "over-coated," "ground," or combinations thereof. Commonly assigned U.S. Pat. Nos. 6,614,579; 7,064,882; and 7,324,261 describe various mechanisms for carrying out the edge treatment of mirror assemblies. The corresponding treatment improves the visual appearance and durability of the mirror element.

Figure 5:
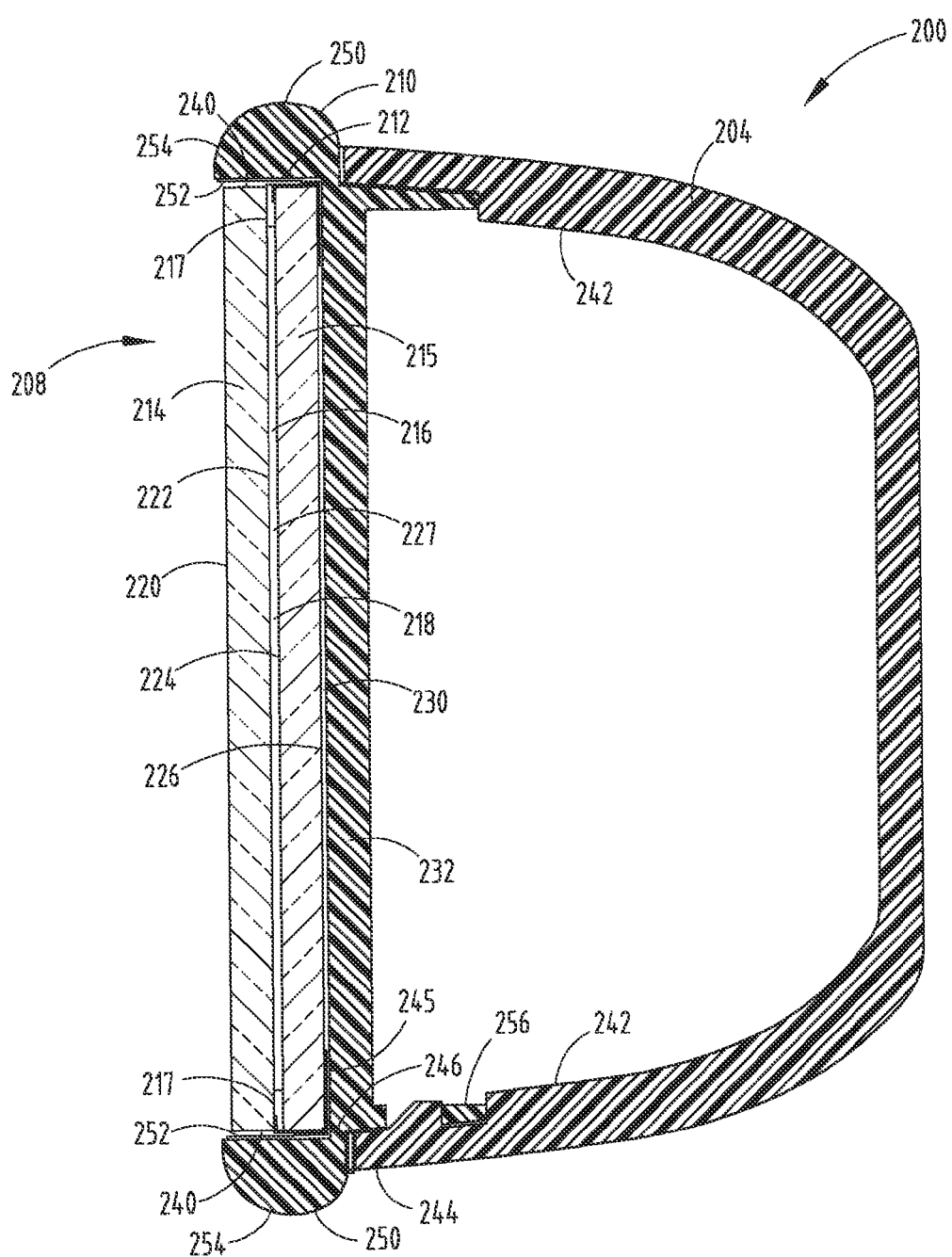
FIG. 5 is a side cross-sectional view of one embodiment of a clear bezel of the present invention in an electrochromic mirror.

Referring now to the embodiment illustrated in FIG. 5, reference numeral 200 generally designates a rearview assembly having a mounting structure 162 (FIG. 3) configured to be operably coupled with a vehicle. A housing 204 may be supported on the mounting structure 162, as shown, or may be mounted to a rearward viewing device 208 operably connected with the mounting structure 162. The rearward viewing device 208 is supported by the housing 204 and adapted to provide a rearward view to a vehicle driver. An optically transparent bezel 210 is disposed between the rearward viewing device 208 and the housing 204. A reflective or decorative layer 212 is optionally disposed proximate an outer periphery of the bezel 210 to obscure the mirror element edge from view. Optionally, the reflective or decorative layer 212 may also be disposed on a forward wall of the housing 204, between the housing 204 and the bezel 210, or on the back of bezel 210 to obscure visibility of the housing 204 from view. Various constructions of the optically transparent bezel are provided in several embodiments discussed in detail below.

The rearward viewing device 208 includes an electrochromic element having a front substrate 214 and a rear substrate 215 and an electrochromic medium 227 disposed therebetween. The electrochromic element 216 may be similar to the one disclosed in detail above with reference to FIG. 2. A reflective layer or decorative layer 217 extends over a third surface 224 disposed on the rear substrate 215 and a seal extends about a periphery 219 (FIG. 8) of the electrochromic element 216 between the front substrate 214 and the rear substrate 215. A closed void 218 is formed between the front substrate 214 and the rear substrate 215 and the seal. The front substrate 214 includes a first surface 220 and a second surface 222 of the electrochromic element 216. The rear substrate 215 includes the third surface 224 and a fourth surface 226 of the electrochromic element 216. The electrochromic medium 227 is disposed in the void 218 between the second surface 222 of the front substrate 214 and the third surface 224 of the rear substrate 215. A foam backer or adhesive 230 is disposed behind the rear substrate 215 adjacent the fourth surface 226. The foam backer or adhesive 230 is disposed between the fourth surface 226 and at least a portion of a rear wall 232 of the bezel 210. It is contemplated that the foam backer 230 may be operably coupled with the bezel 210, or may be operably coupled with the fourth surface 226 of the rear substrate 215 of the rearward viewing device 208. The rearward viewing device 208 is generally contemplated to be an electrochromic element similar to the design discussed above, but could also be implemented into a prism construction as detailed further below. Examples of various reflective elements are described in U.S. Pat. Nos. 5,682,267; 5,689,370; 6,064,509; 6,062,920; 6,268,950; 6,195,194; 5,940,201; 6,246,507; 6,057,956; 6,512,624; 6,356,376; 6,166,848; 6,111,684; 6,193,378; 6,239,898; 6,441,943; 6,037,471; 6,020,987; 5,825,527; 6,111,684; and 5,998,617, the entire disclosures of which are incorporated herein by reference.

Many of the embodiments referenced in this application include various decorative treatments made on different surfaces of the bezel, housing, or rearward viewing device. The term "decorative treatments" as disclosed in this application will be generally understood to include physical or chemical modifications to the referenced surface or the addition of a material or layer to the referenced surface in one or more embodiments. The decorative treatments may include functional and/or aesthetic features. Further, throughout many of the embodiments disclosed in this application reference is made to a "reflective layer" or "decorative layer" which may be disposed on a forward wall of the housing, between the housing and the bezel, on the back of bezel, or other various disclosed locations to obscure visibility of the housing from view. In this respect, it will be generally understood that the reflective/decorative layer serves as a hiding layer that may be completely or partially opaque, diffuse, reflective, or translucent. This hiding layer may be highly reflective, diffuse reflective, or specular reflective. The use of the term "reflective layer" or "decorative layer" in this application is not meant to be limiting and is only meant to indicate that the referenced layer does not completely absorb light.

Figure 6:
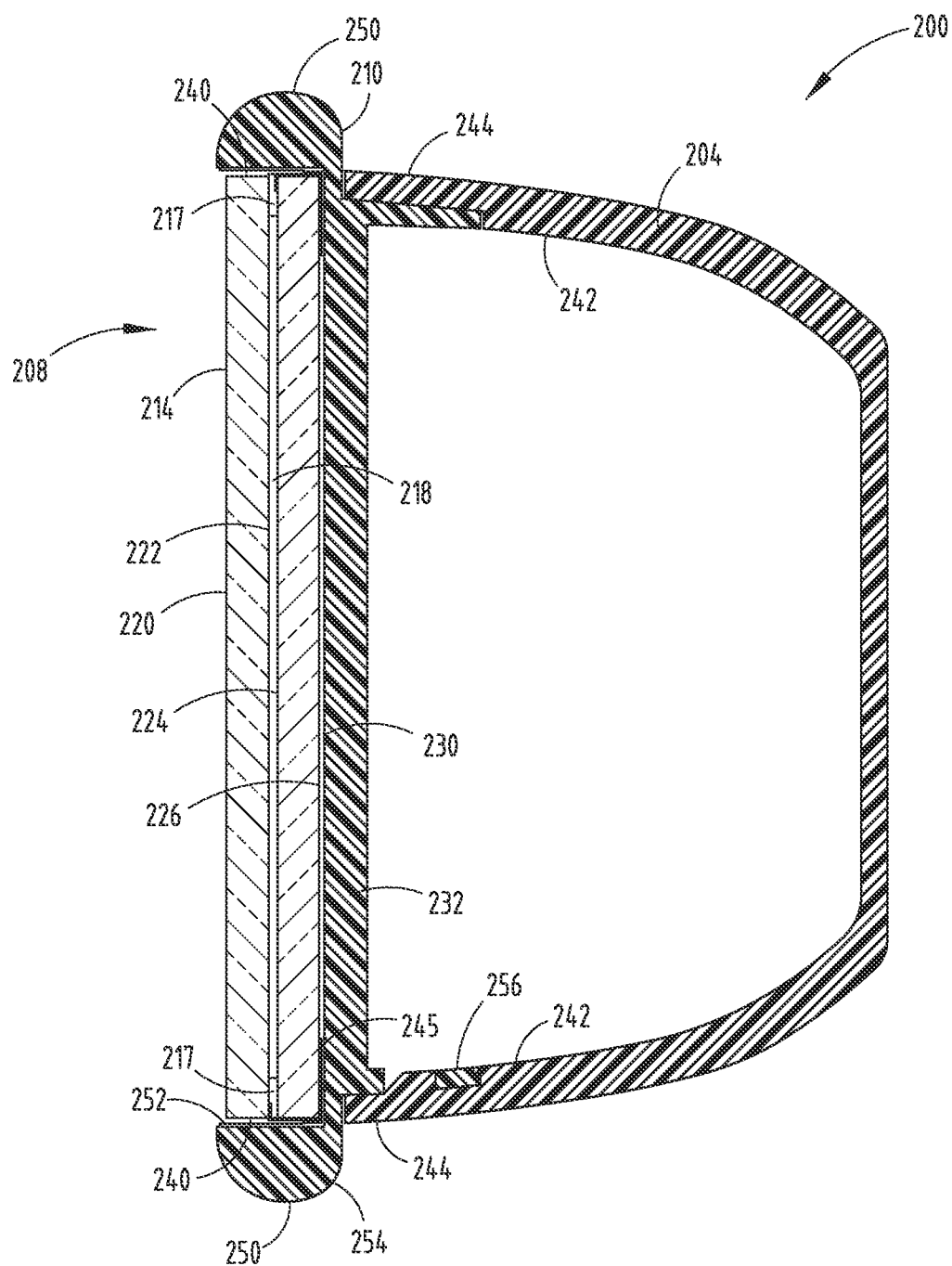
FIG. 6 is a side cross-sectional view of another embodiment of a clear bezel of the present invention in an electrochromic mirror.

Referring now to FIGS. 5 and 6, it is contemplated that an outside edge 240 of the rearward viewing device 208 may be aligned with an interior wall 242 of the housing 204 (FIG. 5) or the outside edge 240 of the rearward viewing device 208 may be aligned with an exterior wall 244 of the housing 204 (FIG. 6). More specifically, the electrochromic element 216 may include a length that is less than, equal to, or greater than the distance across the housing 204. As shown in FIG. 5, the electrochromic element 216 is disposed inside the interior wall 242 of the housing 204. However, as shown in FIG. 6, the electrochromic element 216 has a length that is equal to the exterior wall 244 of the housing 204. It will be generally understood by one having ordinary skill in the art that the bezel 210 as described herein can be used in conjunction with electrochromic elements 216 of various sizes, and further may be any length between an inner periphery height of the housing 204 or an outer periphery height of the housing 204. The electrochromic elements 216 may include a variety of constructions including solution phase, gelled solid state, or a hybrid as generally known in the art. The translucent or transparent carrier or bezel 210 is adapted to connect with the housing 204. It will be understood that the bezel and carrier may be integral or may be connected by mechanical fasteners, friction-fit, adhesive, etc. It is generally contemplated that the rear wall 232 of the bezel 210 will extend completely behind the rearward viewing device 208, however, the rear wall 232 of the bezel 210 may include one or more apertures, and therefore may extend behind only a portion of the rearward viewing device 208. In addition, the bezel 210 may include a variety of connection constructions, such as those disclosed in U.S. Pat. No. 6,195,194, entitled "LIGHT-WEIGHT ELECTROCHROMIC MIRROR," filed on Mar. 16, 1999, and U.S. Pat. No. 6,650,457, entitled "REARVIEW MIRROR CONSTRUCTED FOR EFFICIENT ASSEMBLY," filed on May 21, 2001, the entire contents of which are incorporated herein by reference in their entirety.

The bezel 210 is generally designed to be compliant with existing safety laws in the automobile industry, while at the same time providing an aesthetic appearance and support structure to hold the rearward viewing device 208. The bezel 210 provides a boundary between the outer periphery 219 of the rearward viewing device 208, thereby minimizing the likelihood of possible harm to a user during a collision event. In addition, the rear wall 232, also known as a support substrate, secures the rearward viewing device 208 and supports the rearward viewing device 208 on the housing 204.

As disclosed above relating to the embodiment of FIGS. 1 and 2, a clip 245 typically having an L, J, or Z configuration is disposed proximate the bezel 210 and the rear substrate 215 of the rearward viewing device 208. The conductive clip 245 serves to provide electrical communication between a power source and the electrically conductive layer or electrochromic medium 227 disposed between the rear surface 222 of the front substrate 214 and the forward surface 224 of the rear substrate 215. The clip 245 may be constructed and generally connected as described in U.S. patent application Ser. No. 12/832,838, filed on Jul. 8, 2010, entitled "VEHICULAR REARVIEW MIRROR ELEMENTS AND ASSEMBLIES INCORPORATING THESE ELEMENTS," the entire disclosure of which is hereby incorporated herein by reference.

Referring again to FIG. 5, the bezel 210 includes a bulbous peripheral frame 250 that extends around the electrochromic element 216. The bulbous peripheral frame 250 includes an inner wall 252 and an arcuate outer wall 254. The bulbous peripheral frame 250 also includes a connection portion 256 that connects the bulbous peripheral frame 250 to the rear wall 232 of the bezel 210. The bulbous peripheral frame 250 may include a radius of greater than or equal to approximately 2.5 mm, or may be formed from more than one radius, thus eliminating a hemispherical appearance. The bezel 210 can be constructed from any of the materials mentioned, and is generally contemplated to be formed from at least one of a transparent plastic or elastomer, acrylic, polycarbonate, cyclic polyolefin, polyolefin, polysulfone, PVC, epoxy, silicone, polyurethane, polyester, etc.

Figure 7:
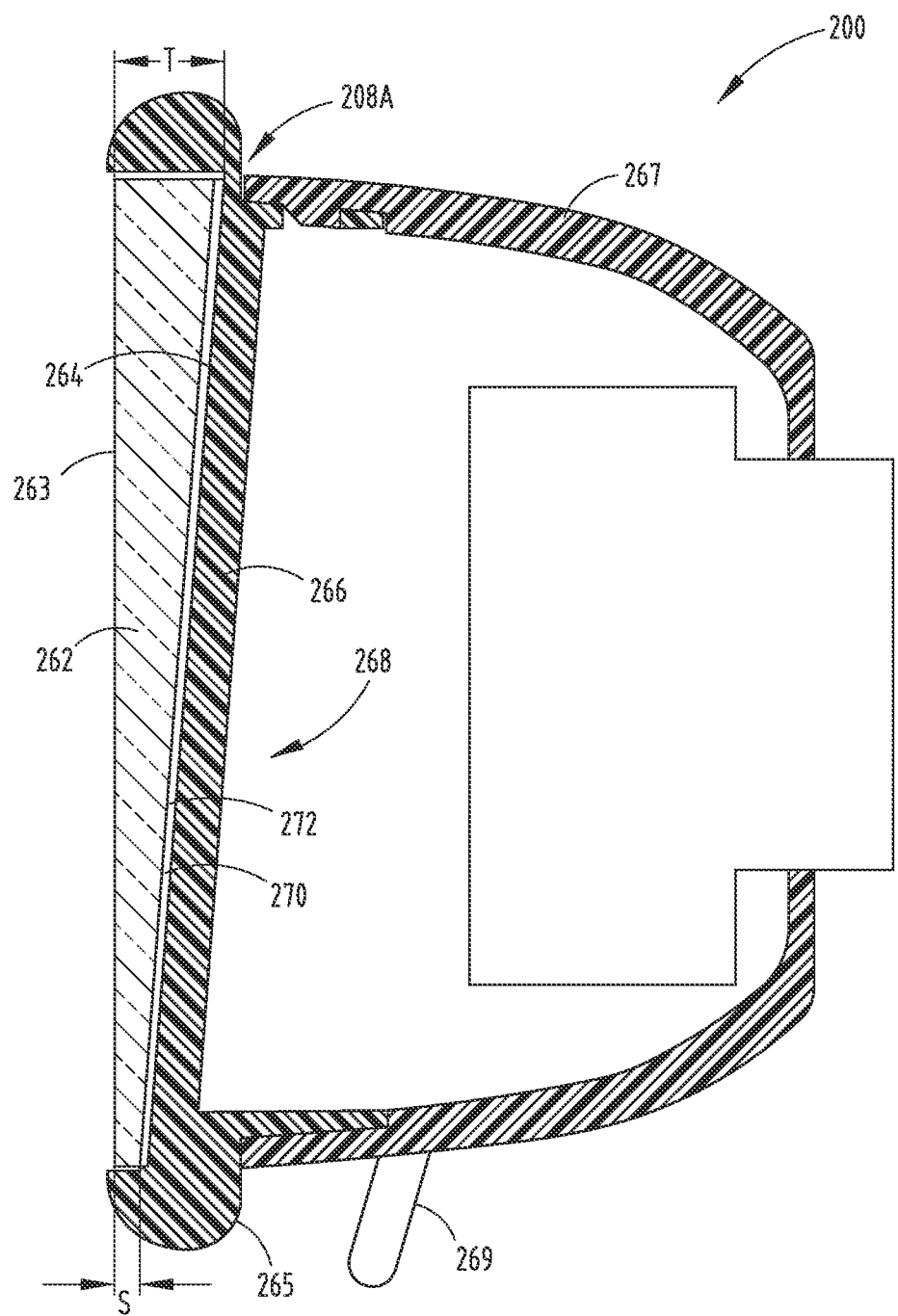
FIG. 7 is a side cross-sectional view of yet another embodiment of a clear bezel of the present invention in a prism-type mirror.

As shown in FIG. 7, rearview assembly 200 includes another embodiment of a rearward viewing device 208A having a front substrate 262 with a cross-section that is similar to a square frustum-shape, a front first surface 263 and a second rear surface 264. The front substrate 262 is adapted for connection with a bezel 265 having an angled rear wall 266, which cooperate to form a prism-type mirror assembly 268. A foam backer or adhesive 270 is disposed between the front substrate 262 and the bezel 265, and a reflective film layer 272 is disposed on the second rear surface 264 of the front substrate 262. The rearward viewing device 208A is disposed in a housing 267 which is adapted for connection to an inside surface of a windshield. The rearward viewing device may include a construction such as that described in U.S. Pat. No. 6,168,277, which is hereby incorporated herein by reference in its entirety. A lever 269 is operably connected to the prism-type rearward viewing device 208A through the housing 267 to allow the prism-type rearward viewing device 208A to move between day and night positions as is readily understood by one having ordinary skill in the art.

Referring again to FIG. 7, the bezel 265 of the prism-type mirror assembly 268 includes an angled back wall designed to interface with the front substrate 262. The angle of the second rear surface 264 of the front substrate 262 is complementary to the angle of the rear wall 266 of the bezel 265. Accordingly, after connection of the front substrate 262 to the bezel 265, the first surface 263 of the front substrate 262 forms a substantially normal or perpendicular plane relative to the housing 204. It is contemplated that the first surface 263 of the front substrate 262 may be coplanar with a front forward edge of the bezel 265, or may be slightly recessed approximately 0.1 mm or greater. In addition, it is contemplated that a potting material may be disposed between the bezel 265 and the front substrate 262 at either the wide surface of the front substrate 262, the narrow surface of the front substrate 262, or both the wide surface and the narrow surface of the front substrate 262.

Furthermore, it is contemplated that various other bezel constructions, such as those outlined in detail below, may be used in conjunction with the prism-type mirror assembly 268. The prism-type mirror element assembly differs in that it needs a mechanical or electrical means to move the prism between day and night positions. Therefore, the illustration provided in FIG. 7 is for example only, and is not meant to limit the prism-type mirror assembly 268 to only the bezel 265 construction shown. Rather, the prism-type mirror assembly 268 may be used with any of the bezel constructions shown herein. However, it will be understood that in each of the other embodiments, angled rear wall 266, a short wall S, and a tall wall T will need to be provided to the bezel 265. It is also noted that the potting material described above can be used in prism and electrochromic element assemblies and is primarily intended to fill the gap between the outside edge of the prism or electrochromic element and the inside edge of the bezel 265 to prevent the intrusion of liquid, dirt, and debris into the gap between the mirror element and the bezel 265. The potting material can be transparent or opaque, clear or colored, rigid or elastomeric, elastomeric being preferred to compensate for the thermal expansion differences between the glass mirror element (typical) and the bezel. The potting material may have a refractive index that is close to matching the mirror element material, bezel material or both, thereby providing a visibly smooth transition from the mirror element to the potting material and bezel.

Turning now to FIGS. 8-19, the illustrated bezel constructions are designed for use in both electrochromic mirror assemblies and prism-type mirror constructions. Each of the embodiments illustrated in FIGS. 8-13 of the present invention include a bezel 300 having a hemispherical bulbous peripheral frame 302. A housing interface member 304 extends rearwardly toward a housing 306. The bulbous peripheral frame 302 includes an inner wall 308 and an arcuate outer wall 310. The bulbous peripheral frame 302 also includes a connection portion 312 that connects the bulbous peripheral frame 302 to a rearward wall 314 of the bezel 300. The rearward viewing device 208 is installed in the bezel 300.

Referring to FIG. 8, it is contemplated that the distance of the bulbous peripheral frame 302 between an outermost edge 313 of the arcuate outer wall 310 and the inner wall 308 of the bezel 300 represented by reference numeral Y would be approximately 2.5 mm. However, it is contemplated that the size of the bezel measured at reference numeral Y could be greater than 3 mm. In either instance, the dimension denoted by reference numeral Y will be larger than the dimension noted by reference numeral X, which is the distance between the inner wall 308 and an outer wall 315 of the housing 306. More specifically, it is contemplated that X will be approximately two-thirds of Y, and may be approximately one-third of Y. A smooth coating that gives a shine or gloss to the arcuate outer wall 310 may also be applied. The dimensions may apply to any of the embodiments discussed herein that include a bulbous peripheral frame. Further, with reference to FIG. 8A, it is also generally contemplated that the value X may be negative. Stated differently, the inner wall 308 of the bezel 300 may extend past the outer wall 315 of the housing 306 such that the value X is a negative value.

The illustrated bezel constructions of FIGS. 8-18 are designed to communicate light through the bezel utilizing various arrangements of the shape and size of the bezel, one or more reflective layers, roughed surfaces, potting materials, etc. The light is collected in the bezel and generally relayed indirectly back to the user. Each of the embodiments are designed to meet the requirements of the United Nations Economic Commission for Europe Regulation 46, Section 6.2.1.

With reference to FIG. 8, a material 316, such as any of those disclosed in detail above, is disposed on the arcuate outer wall 310 of the bezel 300 and has the effect of redirecting light away from the bezel 300. The material 316 may terminate proximate a forward wall 317 of the housing 306 and may be fully reflective, partially transmissive, or transflective, or may be a smooth clear coat, as outlined above, that provides some gloss or shine to the bezel 300. It is also contemplated that the bezel 300 may include dichroic characteristics. It should be noted that instead of applying the material 316 to the outer edge of the bezel 302, the material 316 could also optionally be applied to the inner wall 308 and optionally to the forward wall 317 of the housing 306 between the forward wall 317 and the bezel 302, or on the surface of the bezel 302 in the location of the forward wall 317 to obscure the housing 306 from view, as disclosed in more detail below and shown in the embodiments of FIGS. 9-13. When applied to the inner wall 308, the material 316 may be reflective, opaque, diffuse, or generally include properties that hide the edge of the rearward viewing device 208 from view by the user.

Referring now to FIG. 9, in another embodiment of the present invention, the bulbous peripheral frame 302 does not include any reflective material 316. In this instance, the bulbous peripheral frame 302 of the bezel 300 will generally appear to have the same color or shade as the housing 306 in which it is in abutting contact with. Stated differently, the color or hue of the housing 306 will show through the bezel 300 at the arcuate outer wall 310.

Figures 10, 11:
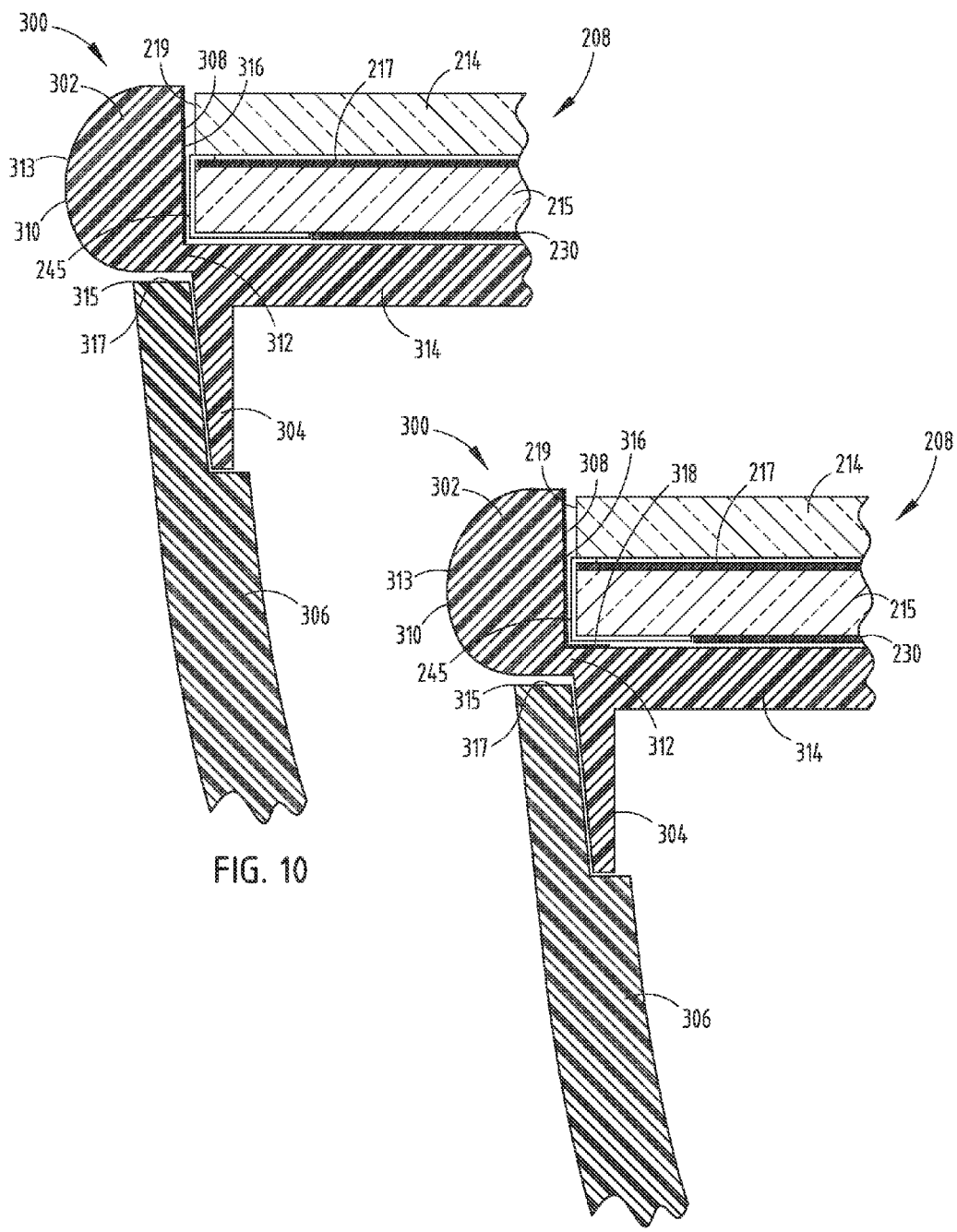
FIG. 10 is an enlarged cross-sectional partial view of another embodiment of a clear bezel of the present invention.
FIG. 11 is an enlarged cross-sectional partial view of another embodiment of a clear bezel of the present invention.

As shown in FIG. 10, in yet another embodiment of the present invention, the bulbous peripheral frame 302 includes the reflective material 316 disposed on the inner wall 308 of the bezel 300. The reflective material 316 is disposed between the periphery 219 of the rearward viewing device 208 and the inner wall 308. In this instance, the reflective material 316 may be fully reflective, partially reflective, partially transmissive, or transflective, and will shield the edge of the rearward viewing device 208 from direct view by the user, and at the same time, prevent light from entering the rearward viewing device 208 from the bulbous peripheral frame 302 of the bezel 300. The reflective material 316 may be deposited on the inner wall 308 of the bezel 300, or may be deposited on the periphery 219 of the rearward viewing device 208. It may be desirable to prevent light entering the bezel 302 from entering the inside of housing 306 (undesired photo sensor interaction). It may also be desirable to prevent light generated inside housing 306 from illuminating bezel 302 (LCD backlight). In this case, an opaque coating can be applied to the back of bezel 302 on surfaces that are inside housing 306. The bezel 302 plastic in the non-bulbous area could also be made opaque.

Referring now to FIG. 11, yet another embodiment includes a first reflective layer or decorative layer 316 that may be disposed between the inner wall 308 of the bezel 300 and the periphery 219 of the rearward viewing device 208, and a second reflective layer or decorative layer 318 may be disposed between a portion of the rear wall 314 of the bezel 300 and the fourth surface 226 of the rear substrate 215 of the rearward viewing device 208. The rear wall 314 may be generally integral with the bezel 300 and may be translucent or opaque.

Figures 12, 13:
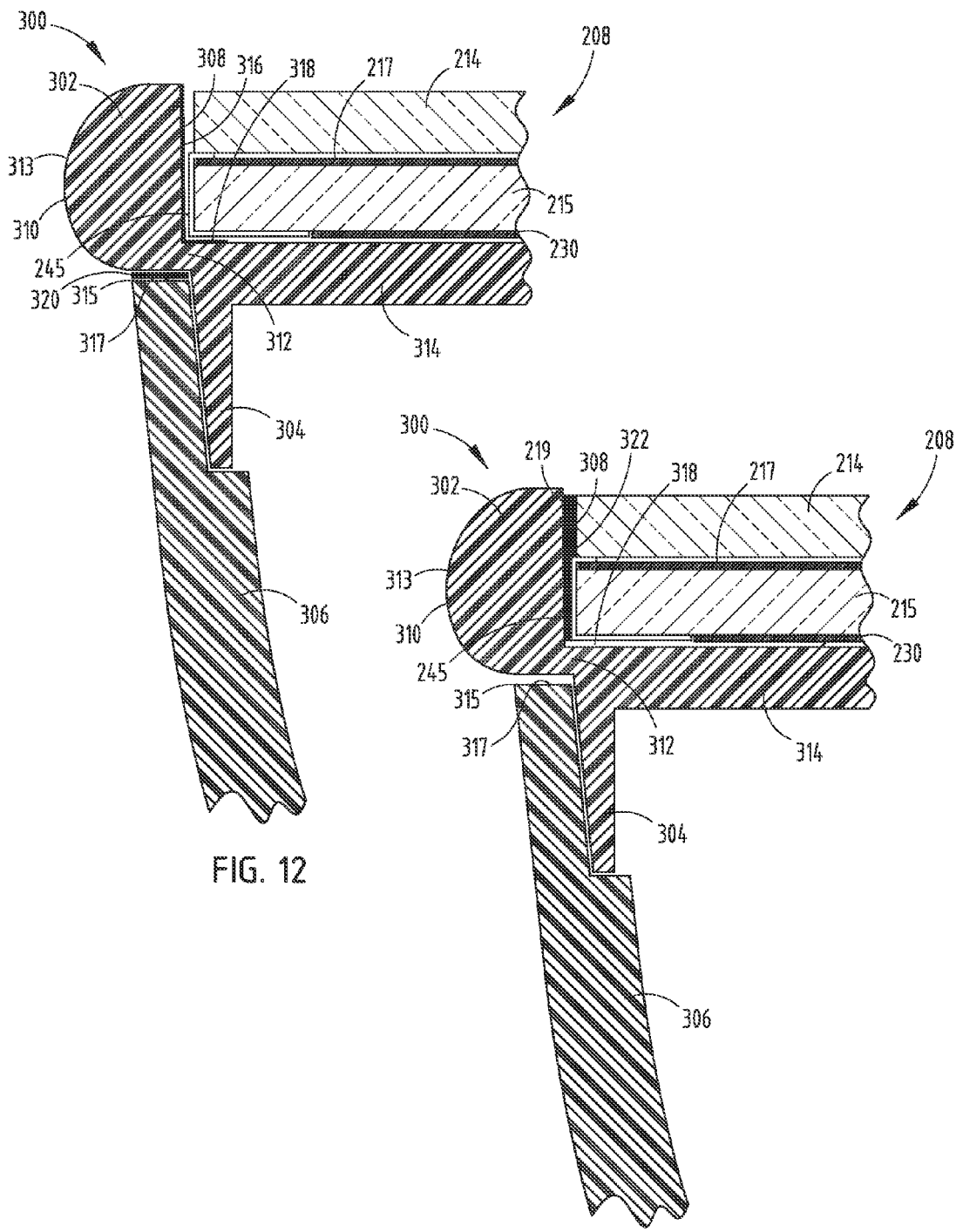
FIG. 12 is an enlarged cross-sectional partial view of another embodiment of a clear bezel of the present invention.
FIG. 13 is an enlarged cross-sectional partial view of another embodiment of a clear bezel of the present invention.

Referring now to FIG. 12, the illustrated embodiment is similar to that illustrated in FIG. 11, but further includes a third reflective layer or decorative layer 320 disposed between the arcuate outer wall 310 of the bulbous peripheral frame 302 of the bezel 300 and the forward wall 317 of the housing 306. It will be understood that each of the layers 316, 318, and 320 may be separate and independent from one another or may be created from similar materials. The reflective layer or decorative layer 320 may be a film, laminate, paint, ink, plastic section, or coating applied between the forward wall 317 of the housing 306 and the bezel 300. The reflective layer or decorative layer 320 could also be aesthetic and include various patterns and aesthetic qualities. The reflective layer or decorative layer 320 may appear to have a carbon fiber pattern, or appear to be shaded, woven, single-colored, multi-colored, etc. The reflective layer or decorative layer 320 may also include functionality, i.e., conductive of electricity. Further, any of the layers 316, 318, 320 may include inkjet printing that defines functional displays. The inkjet printing may be disposed on the internal or external surfaces of the bezel 300. It is contemplated that the film layer 320 may be a foil or plastic that is at least partially reflective and may be partially transmissive. It is also contemplated that the film layer may be constructed from any of the materials disclosed above. Additionally, it is contemplated that the film layer may be applied to the forward wall 317 of the housing 306, or may be applied to the arcuate outer wall 310 of the bezel 300, or both the forward wall 317 of the housing 306 and the arcuate outer wall 310 of the bezel 300. The reflective materials 316, 318, and 320 may be applied using the methods disclosed in U.S. Patent Application Publication Nos. 2010/0020380; 2008/0310005; and 2007/0201122, as well as U.S. Pat. Nos. 7,324,261; 7,064,882; 6,816,297; 6,635,194; 6,545,794; 6,447,123; 6,193,378; 5,940,201; 5,928,572; 5,888,431; 5,679,283; 4,440,822; 4,419,386; 4,377,613; 4,308,316; 2008/0310005; and U.S. patent application Ser. No. 12/832,838, filed on Jul. 8, 2010, entitled "VEHICULAR REARVIEW MIRROR ELEMENTS AND ASSEMBLIES INCORPORATING THESE ELEMENTS," the entire disclosures of which are hereby incorporated herein by reference.

Referring now to the embodiment illustrated in FIG. 13, a potting material 322, such as an adhesive, plastic, or elastomer, for example, polyurethane, acrylic, silicone, or epoxy, may be disposed between the bulbous peripheral frame 302 of the bezel 300 and the periphery 219 of the rearward viewing device 208. The potting material 322 may have reflective, transflective, or transmissive properties. In addition, in an effort to hide the clip 245 that extends over the rear substrate 215, the inner wall 308 of the bezel 300 may be flat or shaped and may include an opaque, frosted, or roughed surface.

Referring now to FIGS. 14-19, yet another embodiment is illustrated that includes a bezel 400 that has a forward edge 402 that is substantially evenly aligned with the front or first surface 220 of the rearward viewing device 208, and a side edge 404 that is substantially evenly aligned with an outer wall 406 of a housing 408. A forward edge 407 of the housing 408 abuts an outside lip 405 of the bezel 400. Similar to the dimension Y discussed in the previous embodiment, a dimension Z (FIG. 15) is generally 2.5 to 3 mm, although the dimension Z could be larger or smaller than these values. The bezel 400 has a rounded peripheral frame 410 with a quarter sphere-like shape protruding forward. A rear wall 412 extends behind the rearward viewing device 208. A housing interface member 414 extends rearward orthogonal to the rear wall 412. The bezel 400 also includes an inner wall 416 and an arcuate outer wall 418 (FIG. 15). A smooth clear coat 420 that gives a shine or gloss to the arcuate outer wall 418 may also be applied. This coating may have anti-scratch properties.

Referring to the embodiment of FIG. 14, in one embodiment of the present invention, a reflector material extends over the arcuate outer wall 418, thereby preventing some or all light from passing from the bezel 400 to the rearward viewing device 208 and from the rearward viewing device 208 to the bezel 400.

With reference again to FIG. 14, a reflective material 420, such as any of those disclosed in detail above, is disposed on the arcuate outer wall 418 of the bezel 400 and is adapted to reflect light away from the bezel 400. The reflective material 420 terminates proximate the forward edge 402 of the housing 408 and may be fully reflective, partially transmissive, or transflective. The arcuate outer wall 418 of the rounded peripheral frame 410 of the bezel 400 is designed such that the forward edge 402 is juxtaposed proximate the front surface 220 of the front substrate 214. At the same time, the side edge 404 of the arcuate outer wall 418 of the rounded peripheral frame 410 is juxtaposed and substantially aligned with the outer wall 406 of the housing 408. This constructions provides an apparently seamless flow from the rearward viewing device 208 to the housing 408.

Referring now to FIG. 15, in another embodiment of the present invention, the rounded peripheral frame 410 does not include any reflective material. In this instance, the rounded peripheral frame 410 of the bezel 400 may appear to have the same color or shade as the housing 408 in which it is in abutting contact with. Stated differently, the color or hue of the housing 408 will show through the bezel 400 at the arcuate outer wall 418.

Figures 16, 17:
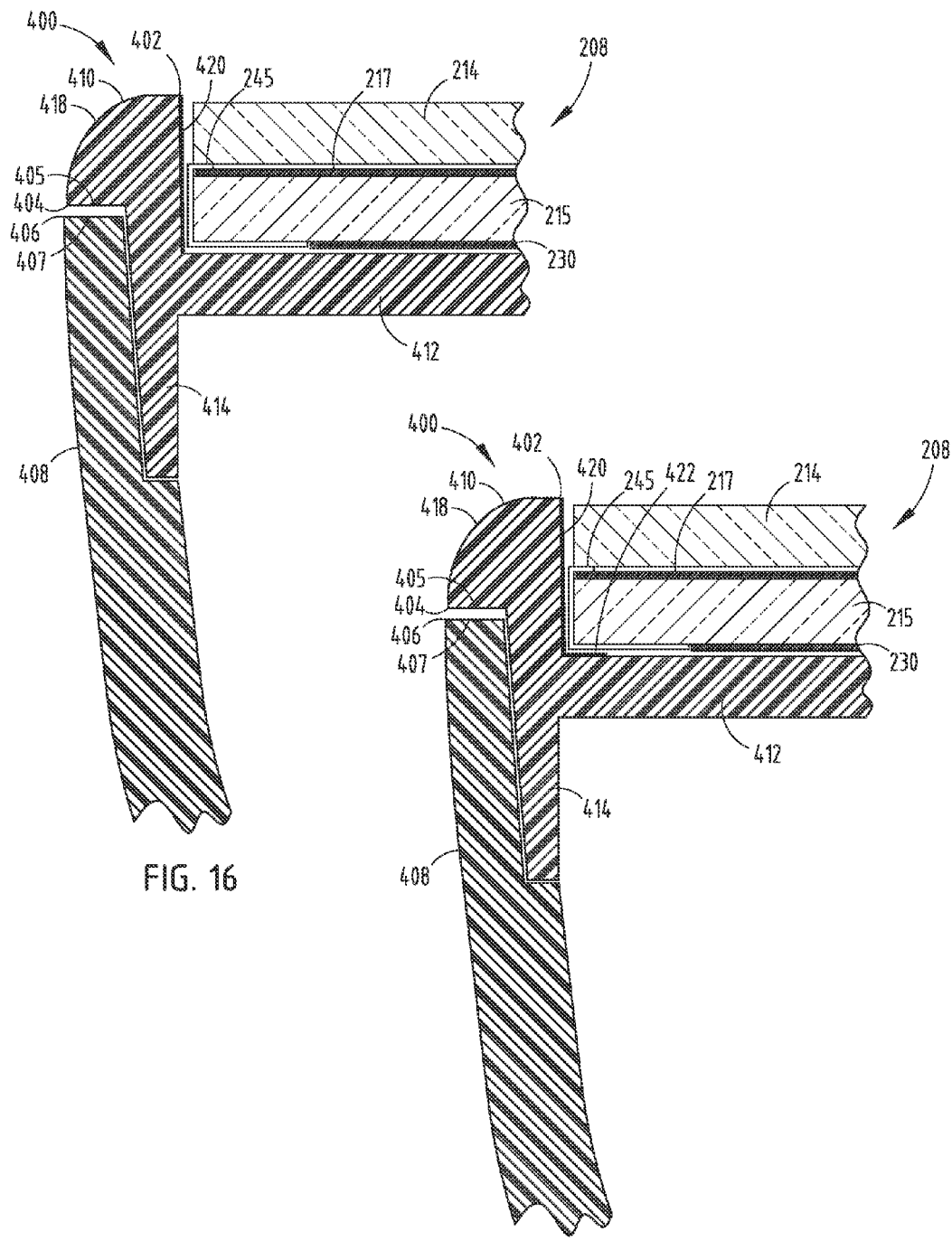
FIG. 16 is an enlarged cross-sectional partial view of another embodiment of a clear bezel of the present invention.
FIG. 17 is an enlarged cross-sectional partial view of another embodiment of a clear bezel of the present invention.

As shown in FIG. 16, in yet another embodiment of the present invention, the rounded peripheral frame 410 includes reflective material 420 disposed on the inner wall 416 of the bezel 400. The reflective material 420 is disposed between the periphery 219 of the rearward viewing device 208 and the inner wall 416. In this instance, the reflective material 420 may be fully reflective, partially reflective, partially transmissive, or transflective, and will act to prevent some or all light from entering the rounded peripheral frame 410 from the rearward viewing device 208, and at the same time, prevent light from entering the rearward viewing device 208 from the rounded peripheral frame 410 of the bezel 400. The reflective material 420 may be deposited on the inner wall 416 of the bezel 400, or may be deposited on the periphery 219 of the rearward viewing device 208.

Referring now to FIG. 17, yet another embodiment includes the first reflective layer or decorative layer 420 disposed between the inner wall 416 of the bezel 400 and the periphery 219 of the rearward viewing device 208, and a second reflective layer or decorative layer 422 may be disposed between a portion of the rear wall 412 of the bezel 400 and the fourth surface 226 of the rear substrate 215 of the rearward viewing device 208.

Figures 18, 19:
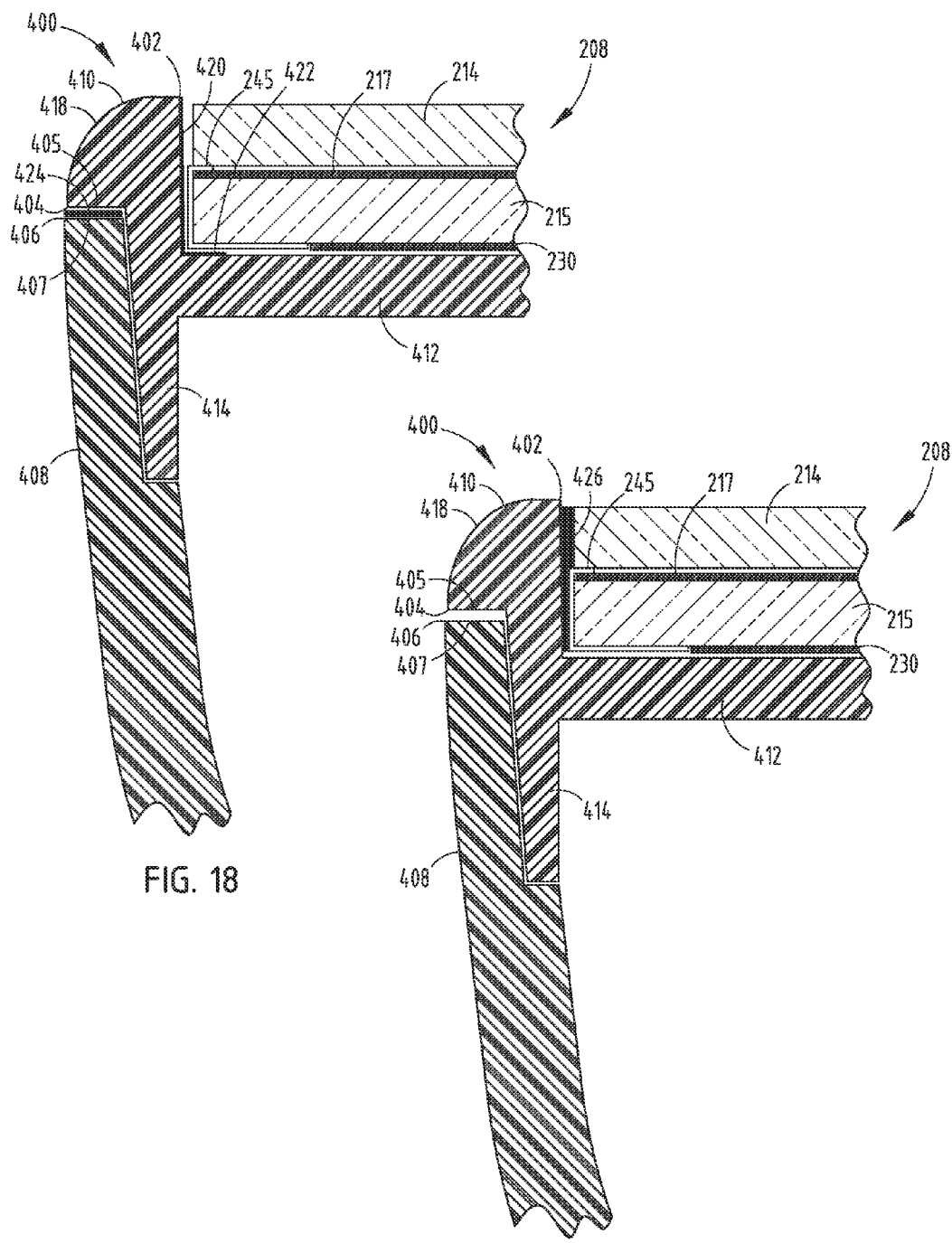
FIG. 18 is an enlarged cross-sectional partial view of another embodiment of a clear bezel of the present invention.
FIG. 19 is an enlarged cross-sectional partial view of another embodiment of a clear bezel of the present invention.

Referring now to FIG. 18, the illustrated embodiment is similar to that illustrated in FIG. 17, but further includes a third reflective layer or decorative layer 424 disposed between the outside lip 405 of the rounded peripheral frame 410 of the bezel 400 and the forward edge 407 of the housing 408. The third reflective layer or decorative layer 424 is a film, laminate, or coating applied between the forward edge 407 of the housing 408 and the bezel 400. The third reflective layer or decorative layer 424 may extend to cover all of the area where the bezel 400 contacts the housing 408 to hide the housing 408 from view through the bezel 400. It is contemplated that the film layer may be a foil or plastic that is at least partially reflective and may be partially transmissive. It is also contemplated that the film layer may be constructed from any of the materials disclosed above. Additionally, it is contemplated that the film layer may be applied to the forward edge 407 of the housing 408, or may be applied to the arcuate outer wall 418 of the bezel 400, or both the forward edge 407 of the housing 408 and the arcuate outer wall 418 of the bezel 400. The reflective materials may be applied using the methods disclosed in U.S. Patent Application Publication Nos. 2010/0020380; 2008/0310005; and 2007/0201122, as well as U.S. Pat. Nos. 7,324,261; 7,064,882; 6,816,297; 6,635,194; 6,545,794; 6,447,123; 6,193,378; 5,940,201; 5,928,572; 5,888,431; 5,679,283; 4,440,822; 4,419,386; 4,377,613; 4,308,316; 2008/0310005; and U.S. patent application Ser. No. 12/832,838, the entire disclosures of which are hereby incorporated herein by reference.

Referring now to the embodiment illustrated in FIG. 19, a potting material 426, such as an adhesive, plastic, or elastomer, for example, polyurethane, acrylic, silicone, or epoxy, may be disposed between the rounded peripheral frame 410 of the bezel 400 and the periphery 219 of the rearward viewing device 208. The potting material 426 may have reflective, transflective, or transmissive properties. In addition, in an effort to hide the clip 245 that extends over the rear substrate 215, the inner wall 416 of the bezel 400 may be flat or shaped and may include an opaque, frosted, or roughed surface.

An icon and/or switch circuitry and/or backlight illuminator can be entirely contained in and/or behind the mirror element, in and/or behind the bezel element or a combination of the bezel and mirror area as disclosed in further detail below. A flush bezel could extend a minimum of 2.5 mm around the perimeter of the mirror and still meet European minimum edge radius requirements. A typical perimeter ring is about 5 mm wide. Unless the ring or the bezel is made wider in the switch area, which may be aesthetically undesirable, a 2.5 mm or 5 mm switch/icon area may not be easily discernable by the driver and a 2.5 mm or 5 mm touch landing pad area may be difficult to accurately locate and touch. Combining both the bezel area and the perimeter ring area to enable an enlarged switch area for the icons, backlight and circuitry enable a more user friendly and functional switch system. The icon symbols and backlight could be positioned in the mirror area and the bezel could have a continuation of the icon, or the bezel could be a different color in the icon area and/or the bezel could be raised in the icon area to enhance switch location visibility and functionality. Since finger prints are more readily visible on a smooth glass surface than on most bezel surfaces, it may be desirable to attract direct finger contact primarily to the bezel area. It is also desirable to cover the contacted area of the bezel and/or glass area with an anti-finger print layer or coating to avoid the visually objectionable accumulation of dirt and finger oils.

The embodiments of FIGS. 20-32 generally illustrate various embodiments having different constructions at the interface where the rearward viewing device, whether an electrochromic or prism-type mirror construction, meets the bezel. It will be understood that any of the embodiments illustrated in these figures could be used in conjunction with the bulbous peripheral frame or rounded peripheral frame discussed in detail above.

Figure 20:
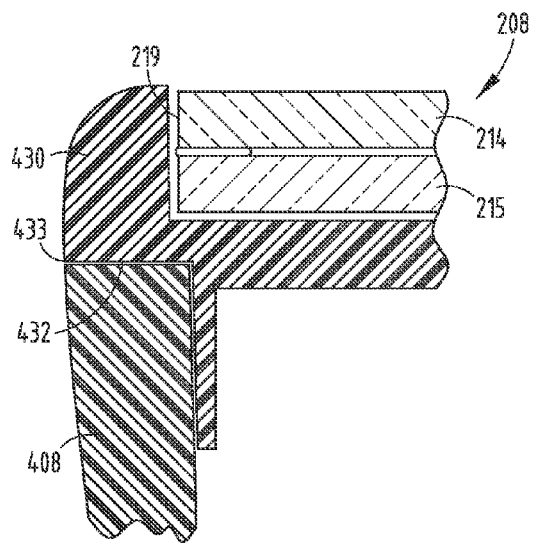
FIG. 20 is an enlarged cross-sectional partial view of another embodiment of a clear bezel of the present invention.

Referring now to FIG. 20, the illustrated embodiment shows a clear bezel 430 having a reflective layer or decorative layer 432 disposed between a forward wall 433 of housing 408 and the bezel 430. The reflective material covers all of the exposed bezel area that is visible from the rear of the housing 408. In fact, the illustrated embodiment shows the reflective layer or decorative layer 432 covering all of the forward wall 433 of the housing 408 up to and past the peripheral edge 219 of the rearward viewing device 208. This construction ensures that the housing 408 is not visible from the front of the mirror assembly as the user looks toward the first surface 220 of the front substrate 214.

Figure 21:
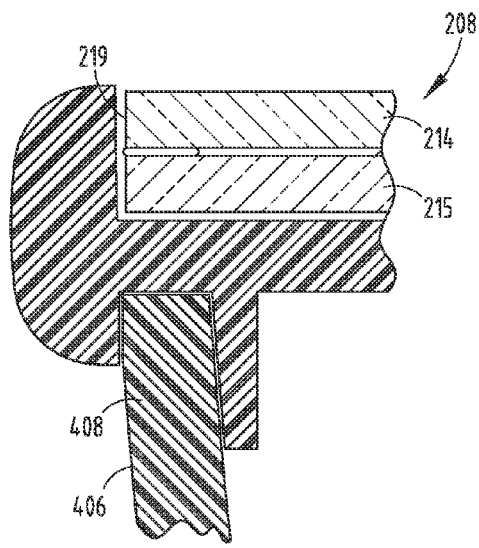
FIG. 21 is an enlarged cross-sectional partial view of another embodiment of a clear bezel of the present invention.

Referring now to FIG. 21, in another embodiment, the outer wall 406 of the housing 408 is positioned directly behind or inside the peripheral edge 219 of the rearward viewing device 208. Accordingly, the housing 408 cannot be readily seen when a user is viewing the rearward viewing device 208 when the user is positioned directly in front of and normal to the rearward viewing device 208.

Figure 22:
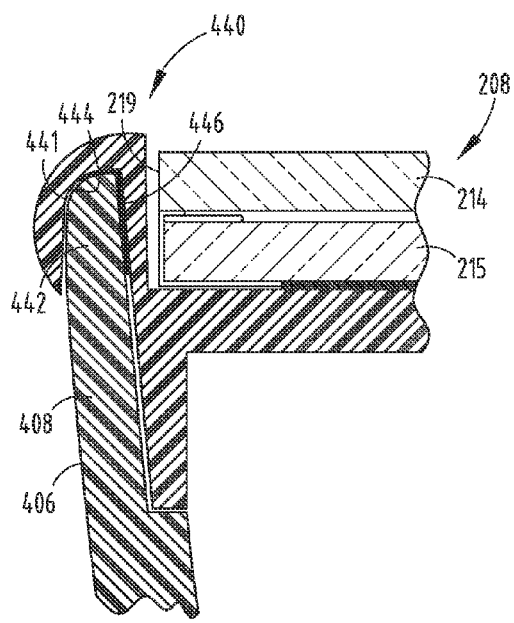
FIG. 22 is an enlarged cross-sectional partial view of another embodiment of a clear bezel of the present invention.

As shown in the embodiment illustrated in FIG. 22, yet another embodiment of the present invention includes a bezel 440 having a recess 441 adapted to receive an engagement portion 442 of the housing 408. The recess 441 is generally defined by a receiving wall 444 of the bezel 440. It is contemplated that any part of, or all of the space between the receiving wall 444 and the engagement portion 442 of the bezel 440 may include a reflective layer or decorative layer 446 to give the desired aesthetic appearance. In fact the reflective layer or decorative layer 446 could extend all the way around the engagement portion 442. The reflective layer or decorative layer 446 could be connected with the bezel 440, housing 408, both, or may simply be positioned between the bezel 440 and housing 408 without being connected to either the bezel 440 or housing 408. In addition, it is contemplated that the receiving wall 444 may extend over a portion of the outer wall 406 of the housing 408, as shown, or may gently taper into the outer wall 406 to provide a streamlined homogenous appearance between the housing 408 and the bezel 440.

Figure 23:
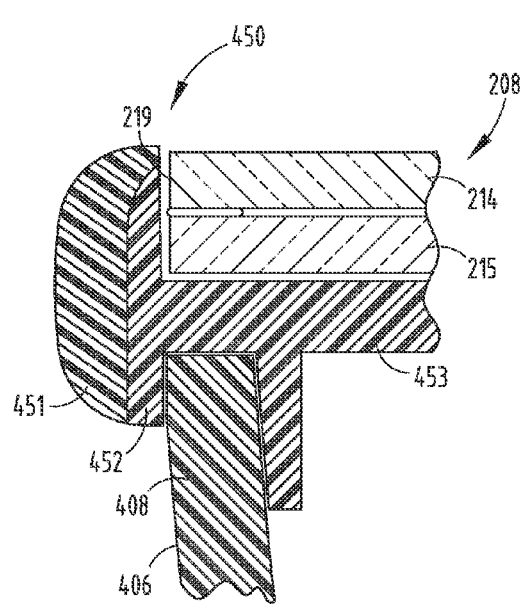
FIG. 23 is an enlarged cross-sectional partial view of another embodiment of a clear bezel of the present invention.

Referring now to FIG. 23, in yet another embodiment, an outer periphery of an optically transparent bezel 450 is constructed from two separate materials. In the illustrated embodiment, an outer periphery 451 of the bezel 450 is constructed from an optically clear or transparent material, while an inner periphery 452 of the bezel 450 and a rear wall 453 of the bezel 450 is constructed from a material that is not optically clear. The second material that is not optically clear may include light scattering properties, may be filled with metal flakes or another particulate filler, may be a coated glass material, or may be a plastic material, such as those containing a dye, pigment, pearlescent pigment, fluorescent dye, glow-in-the-dark dye, glass or coated glass, metallic pigment, etc., known as LEDA® Compounded Color Technology (LUNA, Mirage, Mina, Rx, Just Cool), AURA® infusion technology, and MILENA® color concentrate provided by Bayer Material Science LLC, 100 Bayer Road, Pittsburgh, Pa. 15205-9741, USA. It is also contemplated that the entire bezel could be entirely molded from one of these materials. The surface of the second material could be coated with a reflective or opaque material to achieve the same visual affect. In this case, the material could be identical or different, but the bezel is molded during two sequential molding steps.

Figure 24:
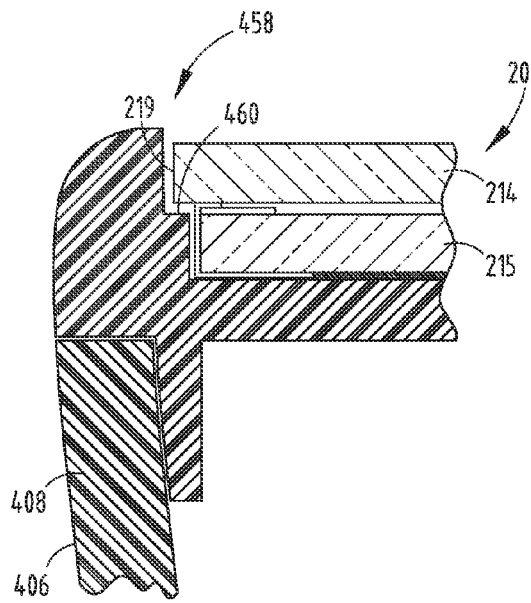
FIG. 24 is an enlarged cross-sectional partial view of another embodiment of a clear bezel of the present invention.

Referring now to FIG. 24, another embodiment of a clear bezel 458 includes a stepped construction on an inner wall 460 designed to accommodate a front substrate 214 that is a larger perimeter than the rear substrate 215. The stepped construction allows for a close fit with the peripheral edge 219 of the rearward viewing device 208. It will be understood that potting materials, as disclosed throughout this application, as well as other adhesives or layers, may be disposed between the stepped construction of the inner wall 460 of the bezel 458 and the rearward viewing device 208.

Figure 25:
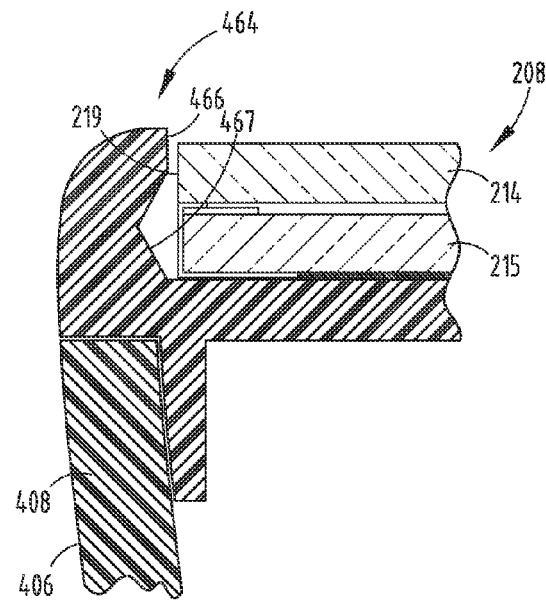
FIG. 25 is an enlarged cross-sectional partial view of another embodiment of a clear bezel of the present invention.
Figure 26A:
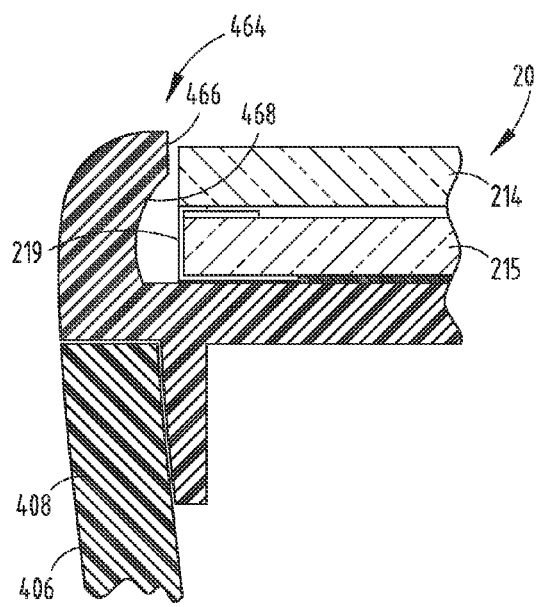
FIG. 26A is an enlarged cross-sectional partial view of another embodiment of a clear bezel of the present invention.
Figure 26B:
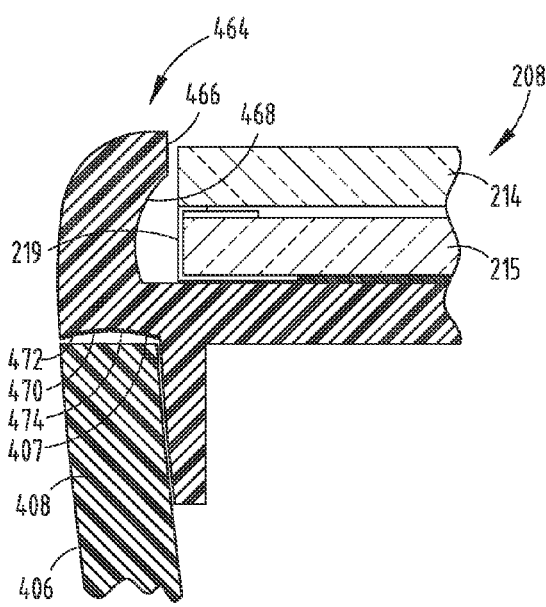
FIG. 26B is an enlarged cross-sectional partial view of another embodiment of a clear bezel of the present invention.

Referring now to FIGS. 25, 26A and 26B, in yet another embodiment of an optically clear bezel 464, an inner wall 466 of the bezel 464 may include an angled portion 467 (FIG. 25) or an arcuate portion 468 (FIG. 26) coated with a metal film or paint to provide optically aesthetic qualities that are externally visible. The angled portion 467 and the arcuate portion 468 are generally designed to reflect light indirectly in the general direction of a user, while at the same time hiding the peripheral edge 219 of the rearward viewing device 208. The inner wall portion could be coated with a decorative coating layer, such as those described herein.

Figures 27, 28:
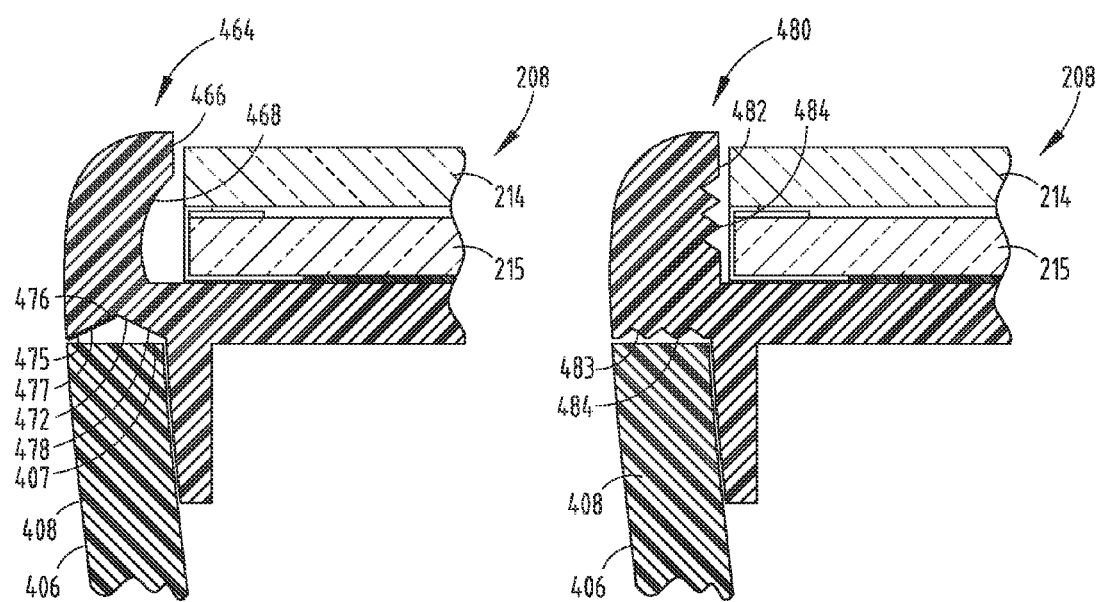
FIG. 27 is an enlarged cross-sectional partial view of another embodiment of a clear bezel of the present invention.
FIG. 28 is an enlarged cross-sectional partial view of another embodiment of a clear bezel of the present invention.

The embodiment illustrated in FIG. 26B is similar to FIG. 26A, but further includes a second arcuate portion 470 disposed on an outside lip 472 of the bezel 464 adjacent the housing 408. The second arcuate portion 470 provides a curved surface that can be used in conjunction with a reflective or decorative layer 474 to reflect light back toward a user, thereby hiding the housing 408 from view. It is contemplated that the forward edge 407 of the housing 408 may include an arcuately convex construction that is consistent with the second arcuate portion 470 of the bezel 464. The reflective layer or decorative layer 474 can be operably connected with the bezel 464, housing 408, or both. Alternatively, the reflective layer or decorative layer 474 may simply be sandwiched between the bezel 464 and housing 408 and held in place by friction. It is also contemplated that a second angled portion 476 could be provided instead as shown in FIG. 27. In this instance, a reflective layer or decorative layer 475 may be applied to a first angled surface 477 or a second angled surface 478 on the bezel 464, or both. Alternatively, the reflective layer or decorative layer 475 may be applied to the forward edge 407 of the housing 408 or two angled surfaces on the forward edge 407 of the housing 408 between the housing 408 and the bezel 464. The constructions illustrated in FIGS. 25-29 are designed to affect the transmission of light into and out of the optically clear or transparent bezel 464.

In yet another embodiment of the present invention, as illustrated in FIG. 28, an optically clear bezel 480 includes an inner wall 482 and an outside lip 483 having a plurality of acute channels 484. The channels 484 may be formed or cut into the outside lip 483 or inner wall 482 of the bezel 480. The resulting surface has the affect of reflecting light back at various angles back through the bezel 480. The channels 484 may be constructed at various angles, and may be symmetrical or non-symmetrical depending on the desired effect. The channels 484 may be large, as shown, or may be small, which will have a frosted appearance. The channels 484 could be coated with a reflective or decorative layer.

With reference to FIGS. 8-28, one exemplary embodiment of a rearview assembly includes a mounting structure configured to be operably coupled with a vehicle. A housing is operably connected with the mounting structure and a rearward viewing device is supported by one of the housing and the mounting structure. The rearward viewing device provides a rearward view to a vehicle driver and includes a front substrate and a rear substrate. The entire front surface of the front substrate is exposed and the entire rear substrate is positioned behind the front substrate. A concealing layer is disposed about a periphery of the rearward viewing device between the front substrate and the rear substrate. A partially optically transparent bezel is disposed adjacent to both the rearward viewing device and the housing, the optically transparent bezel having an edge radius greater than 2.5 mm and the optically transparent bezel being substantially flush with the front surface of the front substrate.

Figure 29A:
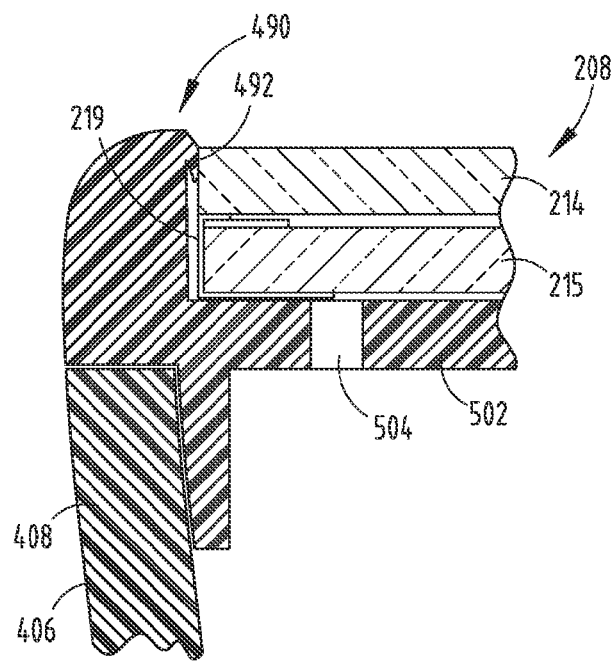
FIG. 29A is an enlarged cross-sectional partial view of another embodiment of a clear bezel of the present invention.
Figure 29B:
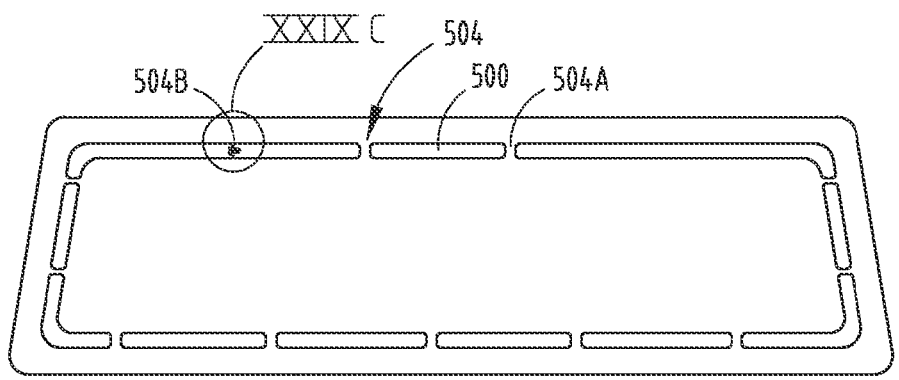
FIG. 29B is a front elevation view of one embodiment of a clear bezel of the present invention.
Figure 29C:
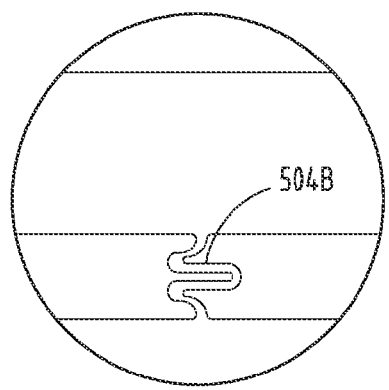
FIG. 29C is an enlarged front elevational view taken at area XXIXC of FIG. 29B.

Referring now to FIGS. 29A-29C, in yet another embodiment of the present invention, any gap that is disposed between the mirror element and the bezel is minimized by the use of a flexible peripheral bezel 490 having a "finger like" or "goose neck" protuberance 492 that flexes against the rearward viewing device 208, thereby avoiding hoop stress and maintaining a consistent fit about the periphery of the rearward viewing device 208. Additionally, slots 500 may be disposed in a rear wall 502 of the bezel 490, as shown in FIG. 29B. The slots 500 are designed to relieve hoop stress that can occur as a result of thermodynamic action on the bezel 490. The slots 500 may be separates by a plurality of connecting members 504 that may include a linear construction 504A as generally shown in FIG. 29B, or may include a spring-like construction 504B as shown in area XXIX of FIG. 29B and in FIG. 29C. The spring-like construction assists in relieving stress that can otherwise accumulate in the bezel 490. It will be understood that the construction of the bezel 490 as noted above may also include features generally disclosed in U.S. Pat. Nos. 7,064,882, 7,324,261, 7,372,611, 7,602,542, 7,379,225, 7,477,439, 8,004,741, as well as pending U.S. patent application Ser. Nos. 12/832,838 and 11/043,191, all of which are incorporated herein by reference in their entirety.

Referring now to FIGS. 30A-30E, a method of adding features to a bezel such as a bulbous bezel is to use technologies known as In-Mold Decoration (IMD) and In-Mold Labeling (IML). During IMD and IML, one layer 506A or multiple layers 506A, 506B, 506C, 506D are applied to a first side of a film substrate 508 generally held flat in a 2D configuration (FIG. 30C) with a printing process (screen, offset, inkjet, etc.), subsequently formed (FIG. 30D, and then incorporated into a molded part (FIG. 30E). The layers may be different colors or form different patterns on the film substrate 508. One or more layers 507 may also be added to a second side of the film substrate 508. In IMD the 2D film is preformed into a 3D shape and then incorporated into a molded part. The film substrate 508 can be colored, clear, transparent, metallic or mirror like in appearance, textured like brushed metal, frosted or a combination of some or all of the above. The film substrate 508 can be incorporated into the molded part such that the ink is on the outer surface exposed surface but it is most preferred to have the ink imbedded in the part protected by the film, the injected molded plastic or both. The exposed surface of the film substrate 508 can be coated with a hard coat to protect the film substrate 508 against mechanical abrasion and/or solvent or chemical attach. Stated differently, the film 508 can be positioned anywhere between a first mold cavity 509 and second mold cavity 510 prior to introduction of injection molded material 511 into the mold cavity. The film substrate 508 can be sandwiched in between injection molded resin layers if desired. Clear, transparent, translucent, opaque, or colored injection molding resins can be used alone or in combination to achieve a desired visual effect. Single or multiple patterned conductive ink layers can be incorporated along with insulating layers to form electric circuits for switches such as capacitive touch, pressure activated and field effect (FIG. 30B). The conductive layer(s) can be buried beneath opaque layers hiding them from sight or the conductive layers could be transparent, such as those made from films of doped tin oxide, zinc oxide, or indium oxide. Inks can be filled with particles of these materials to make them conductive and transparent. The insulating film and/or non-conductive ink layers are also beneficial in isolating the conductive areas and protecting them from static discharge. Illuminating portions of the bezel or switch area is possible by back lighting or piping light (via an LED 512, for example) into an area if semi-transparent films, resins and inks are used in all or select areas, as illustrated in FIG. 30B. Mirror like ink layers can be used to produce a chrome plated look if desired. Any pattern, texture, icon or image or decoration in one or more colors can be printing as desired. Combinations of colored, black white, opaque, transparent and conductive inks can be applied in patterns in single or multiple layers to achieve a desired visual and functional effect(s). Film base layers that are clear, transparent, opaque, metal like, mirror like, brushed or textured metal like, transflective, textured or diffuse can also be combined with the above inks layers to achieve a desired visual and functional effect(s). This method can be used to form a bezel 514 having an IMD formed film, as shown in FIGS. 30A and 30B. The bezel 514 may be raised in a predetermined area to allow for switches or buttons that actuate features on the rearward viewing device 208. Some injection molding resins that may be used with IMD include, but are not limited to, polycarbonate (PC), PC-polybutylene terephalate (PC-PBT) blend, PC-acrylonitrile butadiene styrene (PC-ABS) blend, polyethylene terephalate (PET), PC-PET blend, PC-acrylic styrene acrylonitrile (PC-ASA) blend, and ABS. Some films that may be used with IMD include, but are not limited to, acrylic, PC, PC-aliphatic polyester, and PC-polyvinyl fluoride. Some ink suppliers for IMD may include Coates, Nazdar, Polymeric Imaging, Marabuwerke, Proell, and Sericol. The inks can be screen printed, offset printed, pod printed, inkjet printed, etc. These inks can also be applied directly onto the bezel, mirror element, carrier, housing, etc.

Figure 31:
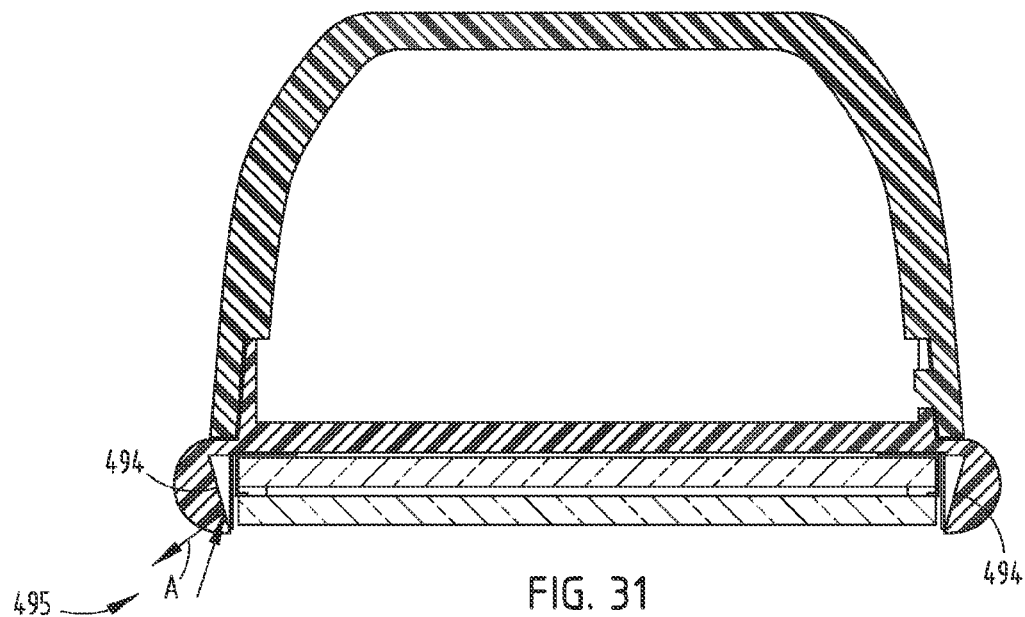
FIG. 31 is an enlarged cross-sectional partial view of another embodiment of a clear bezel of the present invention.
Figure 32:
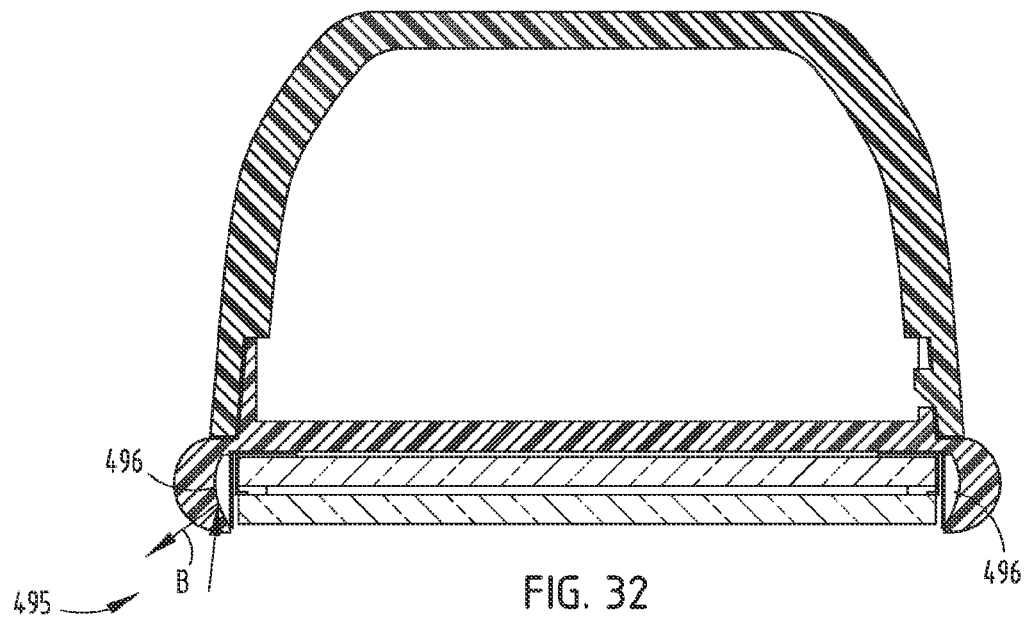
FIG. 32 is an enlarged cross-sectional partial view of another embodiment of a clear bezel of the present invention.

Referring now to FIGS. 31 and 32, an inner wall of a bezel 495 may be an angled wall 494 (FIG. 31) or an arched wall 496 (FIG. 32), such that light that is captured and redirected out of the outer periphery of the bezel 495 does not reflect back into the eyes of the driver, but rather is reflected at an angle thereto, as depicted by arrow A and arrow B.

Referring now to FIGS. 33-43B, the optically transparent bezel is generally designed to allow for light collection in low light conditions. As a result of the light collection, the oversized bezel may have a slight apparent glow. The oversized bezel can be tinted to glow different colors and further, may include lighting systems that are integral with the bezel. Accordingly, the bezel can glow different colors to signal information to the user. For example, when the electrochromic element is activated, the bezel may glow a shade of blue and when the electrochromic element is deactivated, the bezel may not glow at all or may glow a shade of red. Or, for example, the left side of the bezel can blink when the left turn signal is activated and the right side of the bezel can blink when the right turn signal is activated. The bezel could provide soft mood lighting or brightly lit areas above the bezel or below the bezel, such as the overhead console or instrument cluster.

Figure 33:
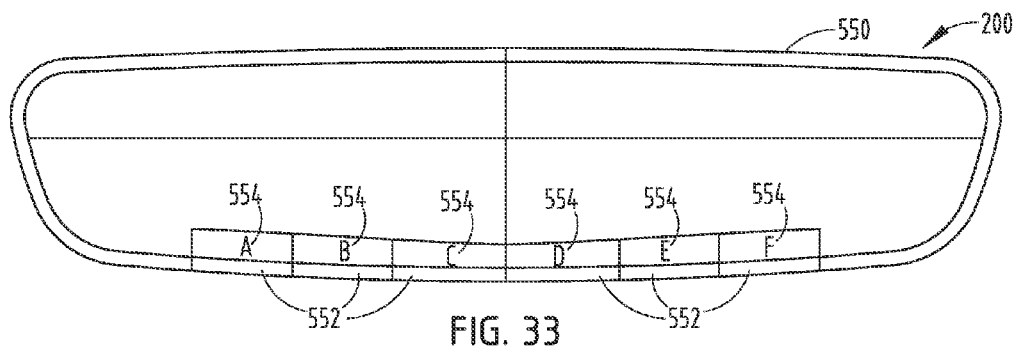
FIG. 33 is front elevational view of one embodiment of a viewing surface of an inside electrochromic mirror assembly incorporating a clear bezel of the present invention.

Referring now to FIG. 33, one embodiment of a bezel 550 of the present invention includes a plurality of functional switches in the form of buttons 552 that are disposed on the bezel 550. Indicia 554 representing the functionality of each button 552 is provided on the rearward viewing device 208. It is contemplated that the indicia 554 may be etched or otherwise printed on the first surface or second surface of the front substrate. The buttons 552 may have a mechanical, resistive, capacitive, or field effect construction as understood by one having ordinary skill in the art. The bezel 500 in FIG. 33 could be raised in the switch area and overlap the front surface of the mirror in the switch area, as shown in FIGS. 33 and 35. The bezel 550 could be made by the above-described IMD and IML processed and incorporate the switch and lighting functions in the switch areas, as indicated in FIGS. 33-35.

Figure 34:
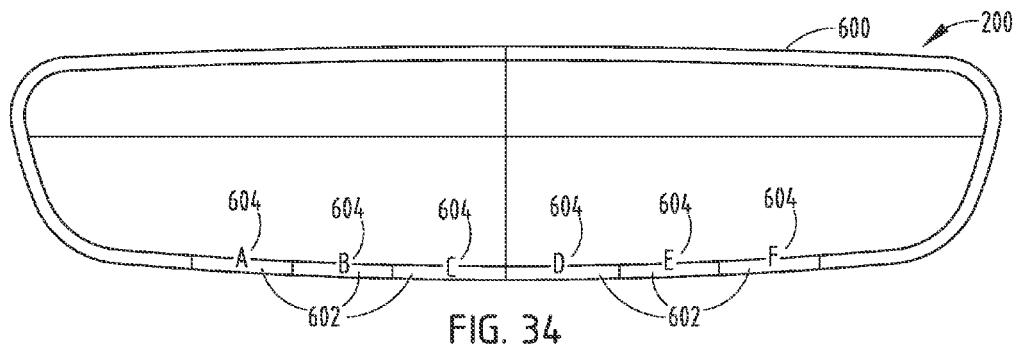
FIG. 34 is front elevational view of another embodiment of a viewing surface of an inside electrochromic mirror assembly incorporating a clear bezel of the present invention.
Figure 35:
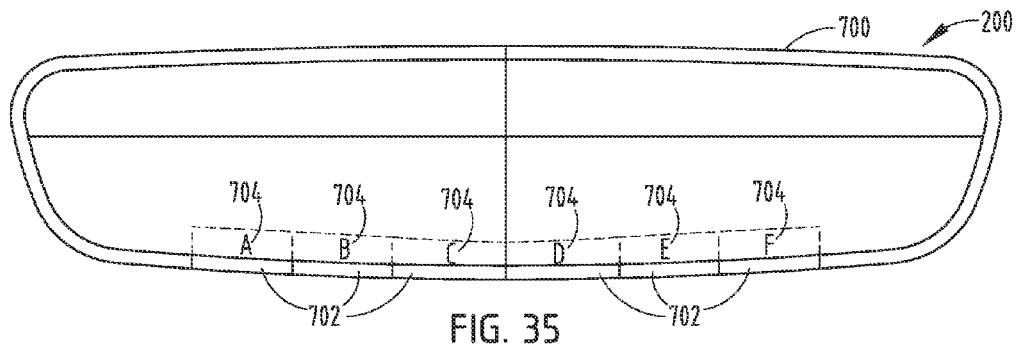
FIG. 35 is front elevational view of another embodiment of a viewing surface of an inside electrochromic mirror assembly incorporating a clear bezel of the present invention.
Figure 36:
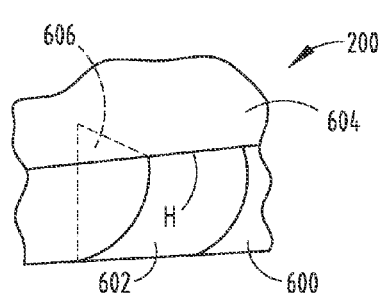
FIG. 36 is a top perspective view of one embodiment of a button assembly on a clear bezel of the present invention.
Figure 37:
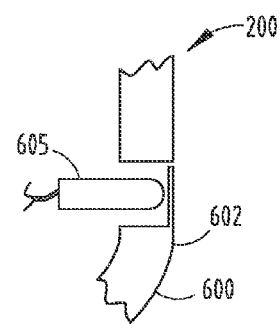
FIG. 37 is a side elevational cross-sectional view of another embodiment of a button assembly of the present invention.

As shown in FIG. 34, another embodiment of a bezel 600 of the present invention includes a plurality of functional switches in the form of buttons 602 that are disposed on the bezel 600. Indicia 604 representing the functionality of each button 602 is provided directly on the bezel 600. It is contemplated that the indicia 604 may be etched or otherwise printed on the bulbous peripheral frame of the bezel 600. The buttons 602 may have a mechanical, resistive, capacitive, or field effect construction as understood by one having ordinary skill in the art. In addition, each button 602 may have a light pipe construction such that the bezel 600 is lit a particular color when a particular button 602 has been activated. More specifically, it is contemplated that the indicia may be lit by a light source, such as an LED 605 (FIG. 37), disposed behind the bezel 600. The indicia and light source can also be mounted behind the mirror element (i.e., directly above the switches) and used separately or in combination with the icons behind the switches for redundancy. It is anticipated that a portion of the mirror reflector will be at least partially transparent in front of the lighted icon area. Upon activation of a particular button 602, a portion of the bezel 600, or the entire bezel lights up to signify that the button 602 has been selected. If necessary, an opaque barrier member 606 (FIG. 36) may be disposed between the buttons 602 or lighted icons to prevent infiltration of light by the LED 605 from an adjacent button 602 or icon, thereby minimizing confusion by the user as to which button 602 has been selected.

Referring now to FIG. 35, yet another embodiment of a bezel 700 of the present invention includes a plurality of buttons 702 disposed on the bezel 700. The buttons 702 include indicia 704 partially disposed on the bezel 700 and partially disposed on the rearward viewing device 208. It is contemplated that the indicia 704 may be disposed on the second surface of the front substrate, third surface of the rear substrate or fourth surface of the fourth substrate.

It will be understood for each of the aforementioned embodiment illustrated in FIGS. 33-35 that other button constructions could also be utilized. It will also be understood that various forms of user confirmation signals may be sent to the user to indicate that a button has been activated. For instance, any or all of the buttons may include a light source as noted above, that emits light through the bezel proximate the button, thereby confirming that the button has been actuated. In addition, any or all of the buttons could include audible or tactile cues such as an audible "click" or a haptic vibration that is sensed by the finger of a user.

Figure 38A:
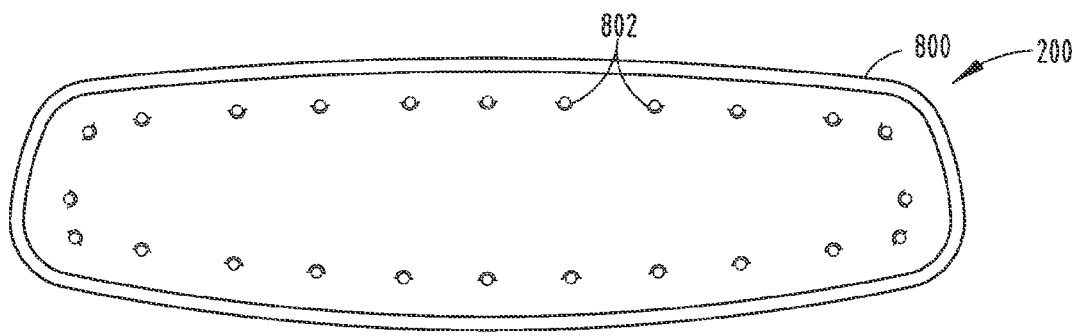
FIG. 38A is a front elevational view of one embodiment of a rearview assembly having a clear bezel.
Figure 38B:
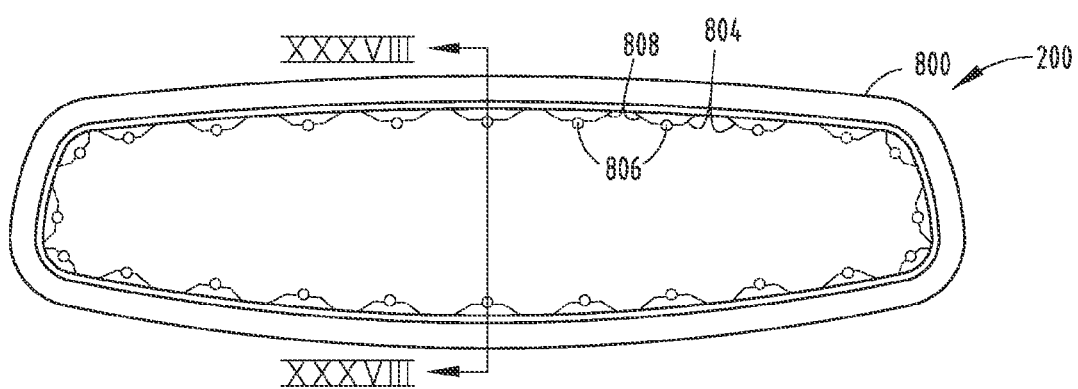
FIG. 38B is a rear elevational view of the rearview assembly of FIG. 38A.
Figure 38C:
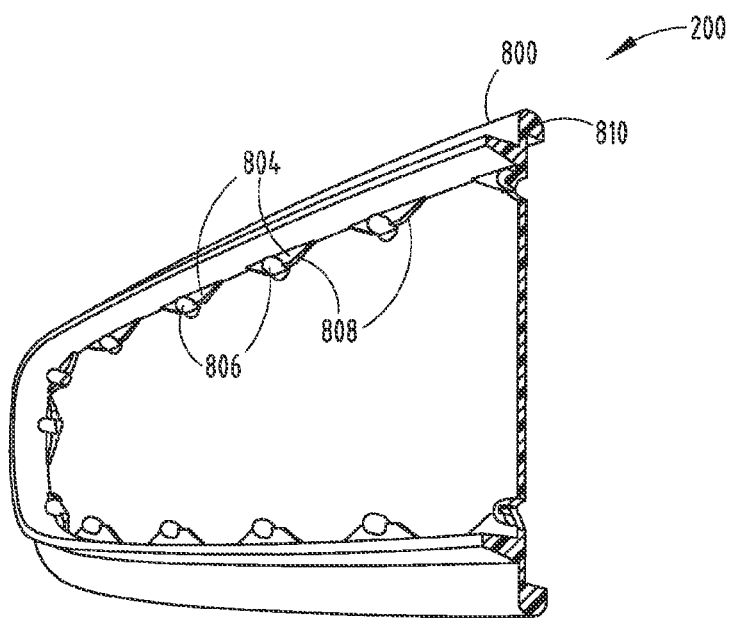
FIG. 38C is side elevational cross-sectional view of the rearview assembly of FIG. 38B across line XXXVIII-XXX-VIII.

With respect to an embodiment illustrated in FIGS. 38A-38C, the rearview assembly 200 can include a bezel 800 and one or more light sources 802 (FIG. 38A), which can be, but are not limited to, light emitting diodes (LEDs). The one or more light sources 802 are in optical communication with the bezel 800, typically, such that the bezel 800 is approximately uniformly illuminated. The rearview assembly 200 can further include an optical device 804 (FIGS. 38B and 38C) in optical communication between the light source 802 and the bezel 800. The optical device 804 can be configured to enhance a brightness of the illuminated bezel 800 and/or enhance an approximate uniform illumination of the bezel 800. The optical device 804 can include a collector portion 806 that is configured to increase an amount of light received by the optical device 804 from the light source 802. The optical device 804 can also include diffuser portion 808 configured to approximately uniformly distribute the emitted light along a light pipe 810 (FIG. 38C) of the bezel 800 or approximately uniformly illuminate a portion of the bezel 800. It should be appreciated by those skilled in the art that the bezel 800 and/or the optical device 804 can include one or more reflectors to enhance a brightness of the light perceived from the bezel 800, to alter an illumination pattern of the emitted light, or a combination thereof.

Figure 39A:
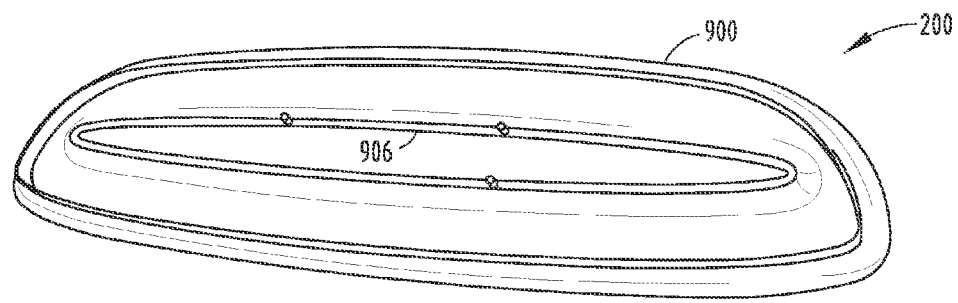
FIG. 39A is a rear elevational view of one embodiment of a rearview assembly having a clear bezel.
Figure 39B:
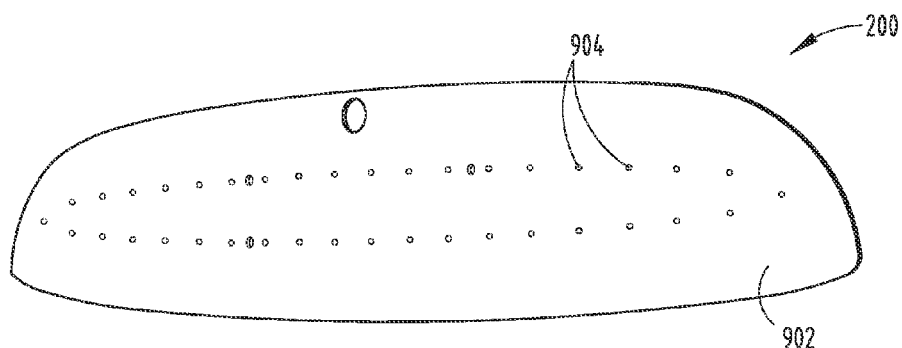
FIG. 39B is a front elevational view of a circuit board of the rearview assembly of FIG. 39A.
Figure 39C:
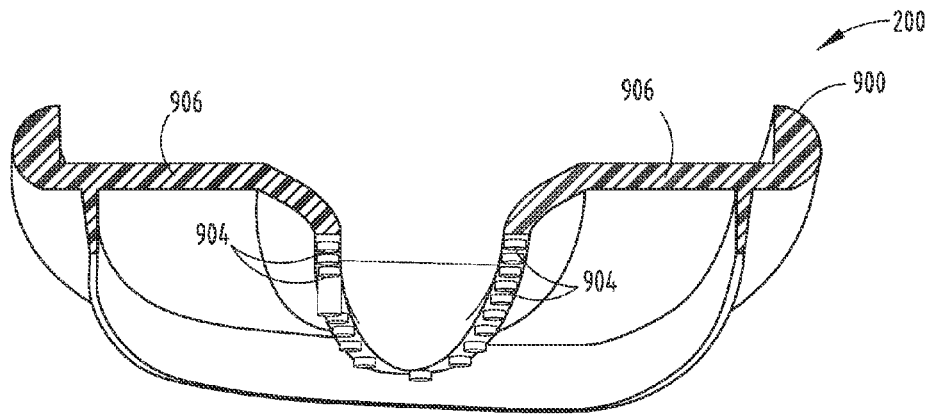
FIG. 39C is a front elevational cross-sectional view of the rearview assembly of FIG. 39A.

In regards to an embodiment illustrated in FIGS. 39A-39C, the rearview assembly 200 can include a bezel 900 and a circuit board 902 (FIG. 39B) that includes one or more light sources 90 (e.g. LEDs) (FIGS. 39B and 39C). The light sources 904 can be in optical communication with the bezel 900 by a light pipe 906. The light pipe 906, and the corresponding light sources 904, can extend approximately longitudinally along the rearview assembly 200. According to one embodiment, the light pipe 906 can be substantially continuous (e.g., an elliptical shape as illustrated in FIGS. 39A and 39B). However, it should be appreciated by those skilled in the art that the light pipe 904 can be any suitable symmetrical or non-symmetrical shape. The bezel 900, the light sources 904, the light pipe 906, or a combination thereof, can be configured so that the bezel is approximately uniformly illuminated. Locating the light sources 904 closer to an interior of the rearview assembly 200, as illustrated in FIGS. 39A-39C, as compared to closer to an edge of the rearview assembly 200, as illustrated in FIGS. 38A-38C, can enhance an approximately uniform illumination of the bezel 900.

Figure 40A:
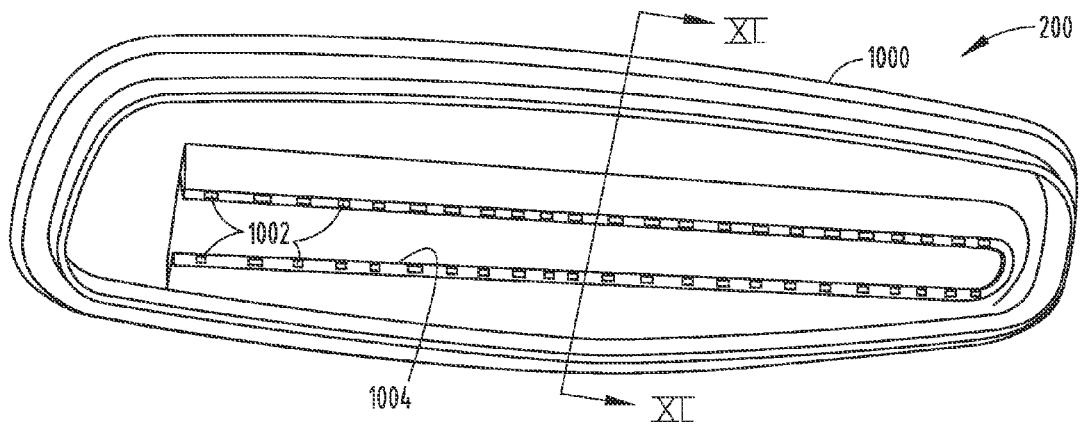
FIG. 40A is a rear elevational view of one embodiment of a rearview assembly having a clear bezel.
Figure 40B:
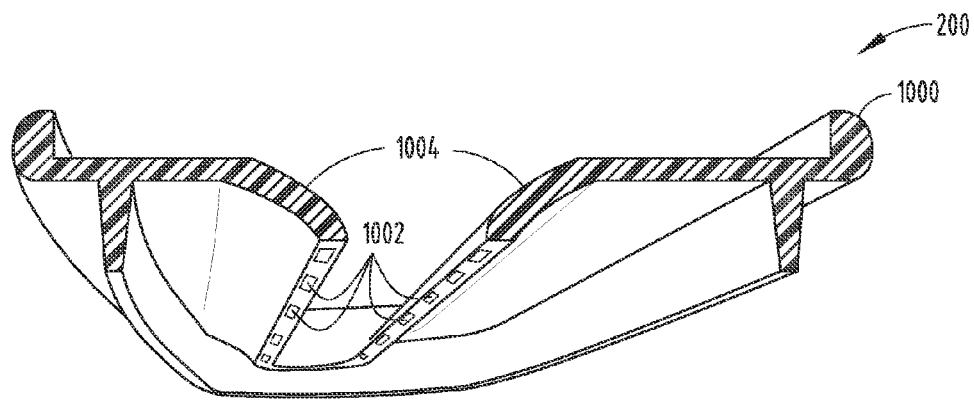
FIG. 40B is a side elevational cross-sectional view of the rearview assembly of FIG. 40A across line XL-XL.

As to an embodiment illustrated in FIGS. 40A and 40B, the rearview assembly 200 includes a portion of similar components and structural design as the embodiment illustrated in FIGS. 39A-39C; however, the rearview assembly 200, as illustrated in FIGS. 40A and 40B, include one or more light sources 1002 (e.g., LEDs) and a light pipe 1004 that is not continuous. The bezel 1000, the one or more light sources 1002, the light pipe 1004, or a combination thereof, can be configured to approximately uniformly illuminate the bezel 1000.

Figure 41A:
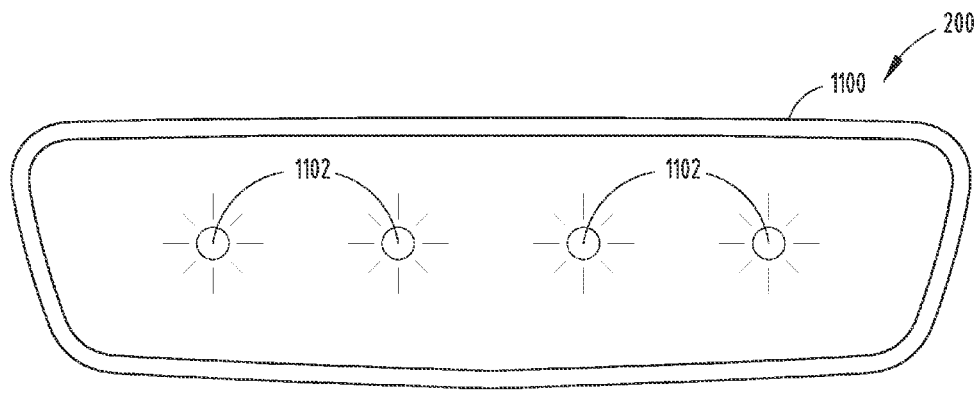
FIG. 41A is a front elevational view of one embodiment of a rearview assembly having a clear bezel.
Figure 41B:
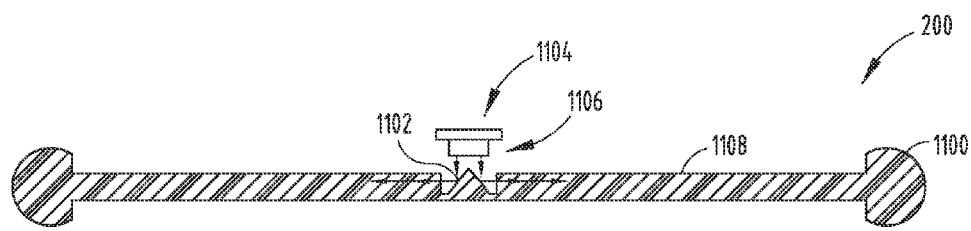
FIG. 41B is a side cross-sectional view of the rearview assembly of FIG. 41A.
Figure 41C:
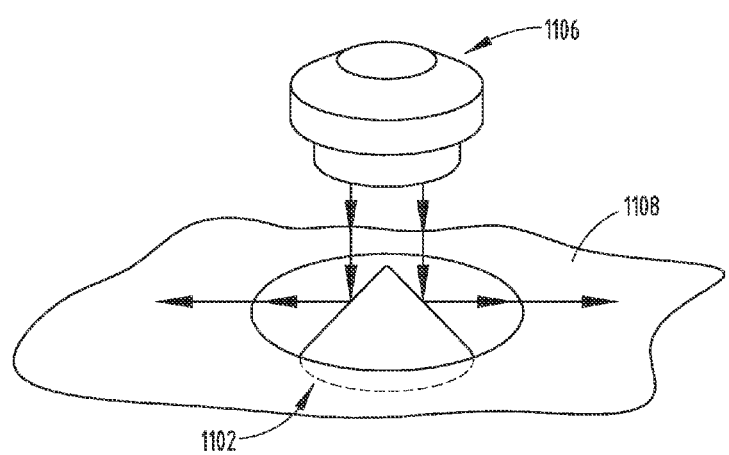
FIG. 41C is a side perspective view of one embodiment of an optical device.

According to one embodiment, as illustrated in FIGS. 41A-41C, the rearview assembly 200 can include a bezel 1100 (FIGS. 41A and 41B) that can be at least partially illuminated. The rearview assembly 200 can further include at least one reflector 1102, at least one circuit board 1104 that has at least one light source 1106 (e.g., an LED), wherein the at least one light source 1106 is in optical communication the at least one reflector 1102. The rearview assembly 200 can also include a light pipe 1108 that is in optical communication between the light source 1106 and the bezel 1100, such that the light emitted from the light source 1106 propagates along the light pipe 1108 to illuminate the bezel 1100. The reflector 1102 can be, but is not limited to, a total internal reflection (TIR) reflector. Typically, the reflector 1102 receives the light emitted from the light source 1106, such that the light is propagated through the light pipe 1108 to approximately uniformly illuminate the bezel 1100.

Figure 42A:
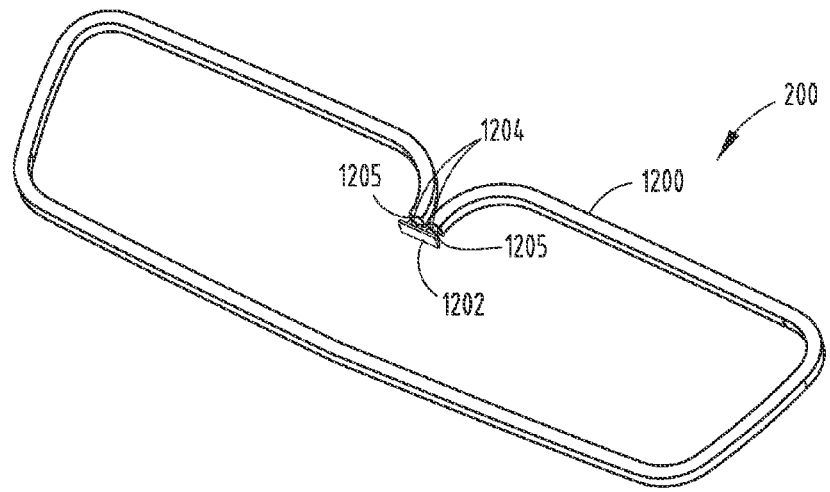
FIG. 42A is a side elevational view of one embodiment of a rearview assembly.
Figure 42B:
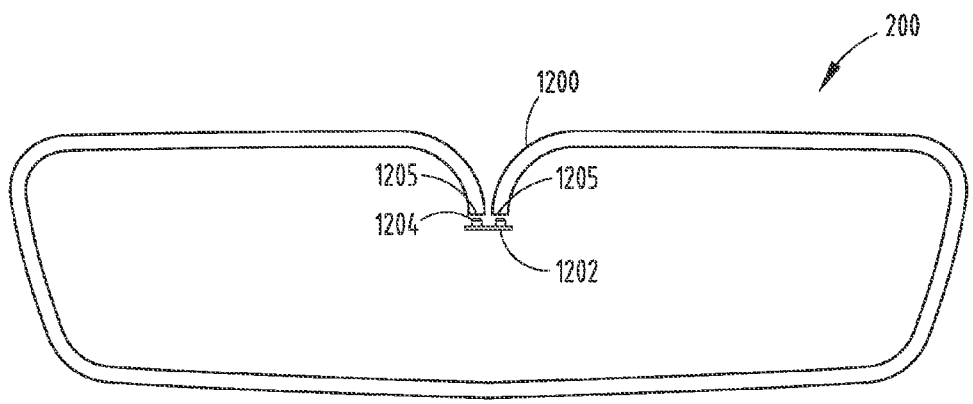
FIG. 42B is a front elevational view of the rearview assembly of FIG. 42A.
Figure 42C:
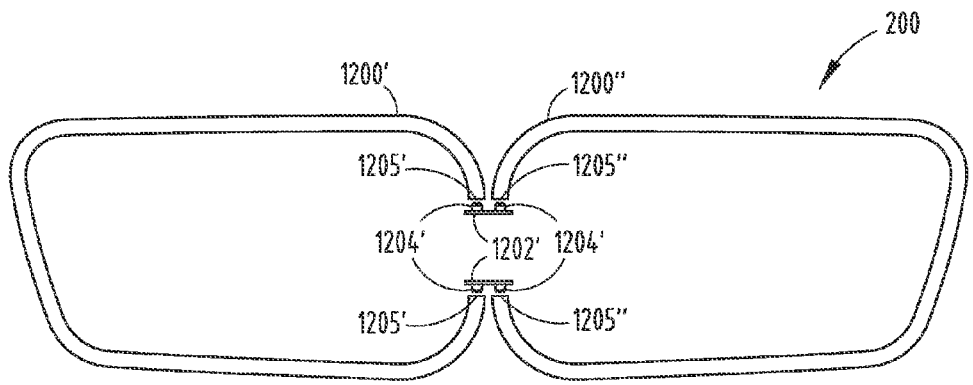
FIG. 42C is a front elevational view of one embodiment of a rearview assembly.

With respect to an embodiment illustrated in FIGS. 42A and 42B, the rearview assembly 200 can include a bezel 1200, a circuit board 1202, and at least one light source 1204 (e.g., LED) in optical communication with the bezel 1200 (e.g., a light pipe). The bezel 1200, the light source 1204, or a combination thereof can be configured, such that the bezel is approximately uniformly illuminated. For example, as illustrated, the light source 1204 optically communicates with first and second distinct light receiving ends 1205. As to an embodiment illustrated in FIG. 42C, the rearview assembly 200 can include a first bezel 1200' and a second bezel 1200", two circuit boards 1202', and four light sources 1204', wherein each light source 1204' is in optical communication with one of the first bezel 1200' and the second bezel 1200". Such an orientation can enhance illumination uniformity of the first and second bezels 1200', 1200". As illustrated, light enters the first bezel 1200' at first and second light receiving ends 1205'. Similarly, light enters the second bezel 1200" at first and second light receiving ends 1205".

Figure 43A:
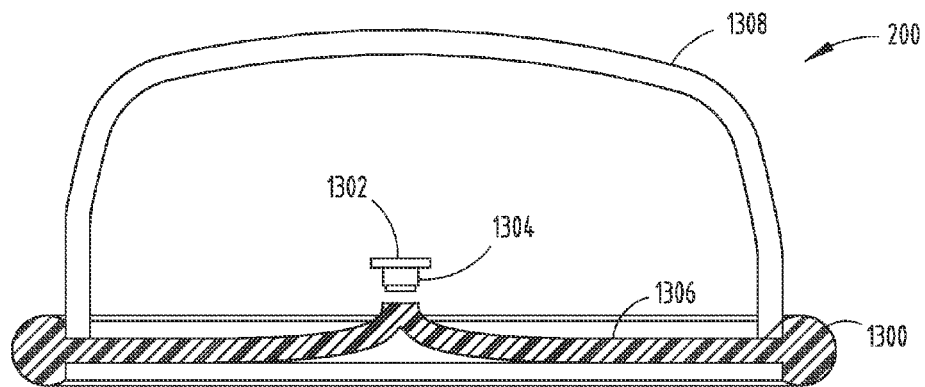
FIG. 43A is a top elevational cross-sectional view of one embodiment of a rearview assembly.
Figure 43B:
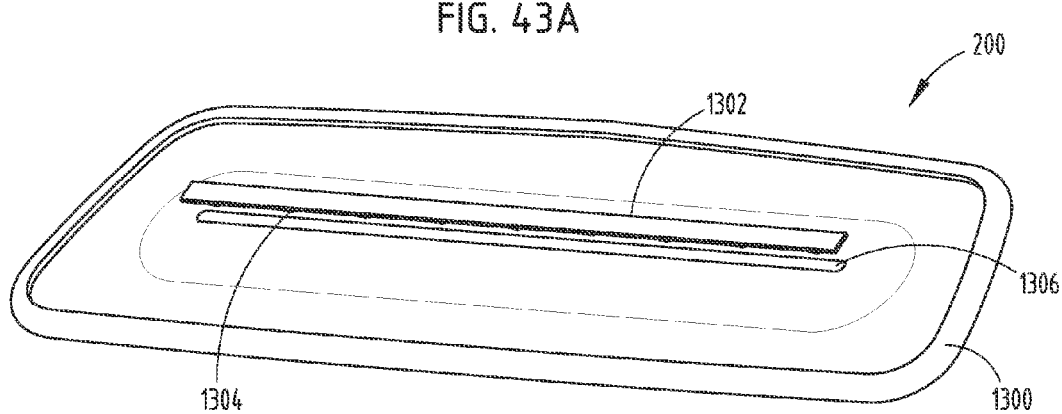
FIG. 43B is rear elevational view of the rearview assembly of FIG. 43A.
Figure 44:
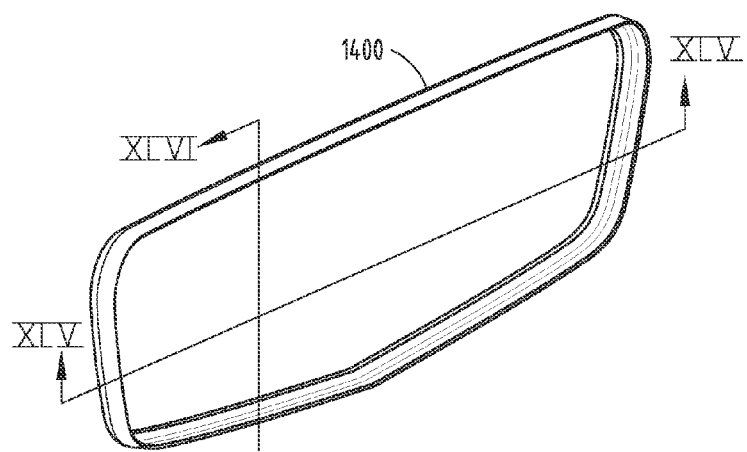
FIG. 44 is a perspective view of one embodiment of a bezel.
Figure 45:
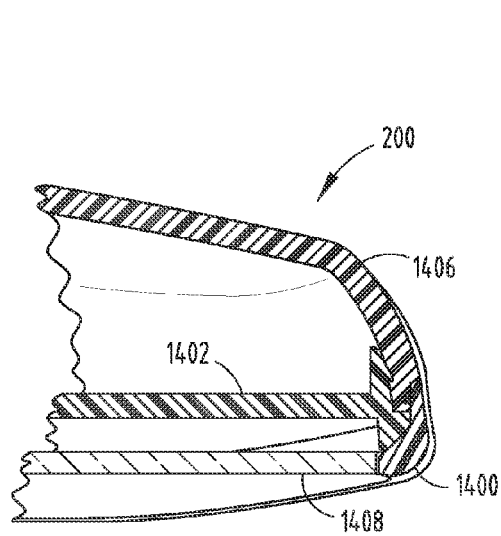
FIG. 45 is a cross-sectional view of the bezel across line XLV-XLV in FIG. 44 and a rearview assembly.
Figure 46:
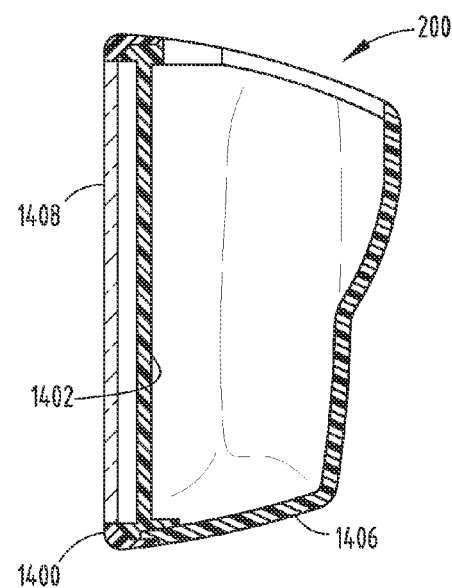
FIG. 46 is a cross-sectional view of the bezel across line XLVI-XLVI in FIG. 44 and a rearview assembly.

In regards to an embodiment illustrated in FIGS. 43A and 43B, the rearview assembly 200 can include a bezel 1300, a circuit board 1302, at least one light source 1304 (e.g., LED) in optical communication with the bezel 1300, and a light pipe 1306 in optical communication between the bezel 1300 and the light source 1304. In such an embodiment, the light sources 1304 and light pipe 1306 can extend approximately longitudinally across a center of the rearview assembly 200, wherein the light pipe 106 also extends outwards to optically connect with the bezel 1300. The light source 1304 and/or the light pipe 1306 can be configured to approximately uniformly illuminate the bezel 1300. The rearview assembly, can further include a housing 1308 (FIG. 43A) that encloses a portion of the bezel 1300, the circuit board 1302, the light source 1304, the light pipe 1306, or a combination thereof.

It should be appreciated that the embodiments described herein can have any suitable number of light sources to at least partially illuminate the bezel, such that a portion of the bezel can be approximately uniformly illuminated or all of the bezel can be approximately uniformly illuminated. The number of light sources can be based upon any of several considerations, including, but not limited to, color of emitted light, illumination pattern, illumination uniformity, and/or heat generated by the light source. The light sources described herein can be multi-colored light sources (e.g., LEDs configured to emit light at different colors/wavelengths), single colored light sources, a plurality of light sources of different colors configured to have intensity altered so the blended emitted light is perceived as different colors, the like, or a combination thereof. Additionally or alternatively, the light pipe and/or bezel can have a non-uniform cross-section, one or more reflectors can be used, the bezel can have optical properties (e.g., stippling on the surface) to alter light propagation, the like, or a combination thereof, to control light distribution. The one or more light sources can be turned on or off, change intensity, change color, or a combination thereof, based upon a user input, a detected emergency situation, an input signal (e.g., music, phone call, text message, turn signal, lane departure, etc.), or a combination thereof. Further, it is contemplated that electroluminescent wires, such as those that include phosphorous, can be used as a light source. It is also contemplated that glowing or fluorescent plastics may be used to construct the bezel.

It should be understood by those skilled in the art that the above described components of various embodiments, including, but not limited to, the light source, the optical device, the light pipe, and the bezel, can be configured and/or combined in additional or alternative ways not explicitly described herein. One such example is embodiments that illuminate the bezel can include TIR lenses.

In regards to FIG. 44-48E, the rearview assembly 200 can include a bezel 1400 that is substantially transparent along a first portion (e.g., an A side) and a second portion (e.g., a B side) that is substantially opaque. The substantially opaque second portion of the bezel 1400 can be plated, such that the second portion is at least partially reflective, plated with a color, plated with a silver material, the like, or a combination thereof. The rearview assembly 200 can include a carrier 1402 (FIGS. 45-47B) and a circuit board (FIG. 47B). Thus, the substantially opaque second portion of the bezel 1400 can be configured so that visibility of the carrier 1402 and the circuit board 1404 (FIGS. 45-47B) is reduced as compared to a non-plated bezel, and according to one embodiment, the visibility of the carrier 1402 and the circuit board 1404 is eliminated.

With respect to FIGS. 44-47B, the bezel 1400 can be configured to snap connect (or snap fit) to at least one of the carrier 1402 and a rear housing 1406. Thus, the carrier 1402, the circuit board 1404, the rear housing 1406, and a mirror assembly 1408 can be configured to align, and the bezel 1400 can then be snap fitted around the perimeter of the carrier 1402, a perimeter of the rear housing 1406, and a perimeter of the mirror assembly 1408, such that the bezel 1402 extending around the perimeter substantially secures these components together. However, it should be appreciated by those skilled in the art that the bezel 1400 can be connected in additional or alternative ways.

Figure 47A:
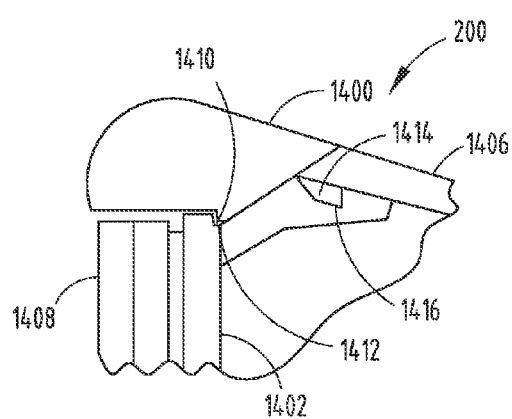
FIG. 47A is a partial cross-sectional view of one embodiment of a rearview assembly.

In regards to an embodiment illustrated in FIG. 47A, the bezel 1400 can be configured to snap fit with the carrier 1402, and the carrier 1402 can be configured to snap fit with the rear housing 1406. The bezel 1400 can include a flange 1410 (male) and the carrier 1402 can define an indent 1412 (female) configured to receive the flange 1410. The rear housing 1406 can include a flange 1414 (male) and the carrier 1402 can define an indent 1416 (female) configured to receive the flange 1414.

Figure 47B:
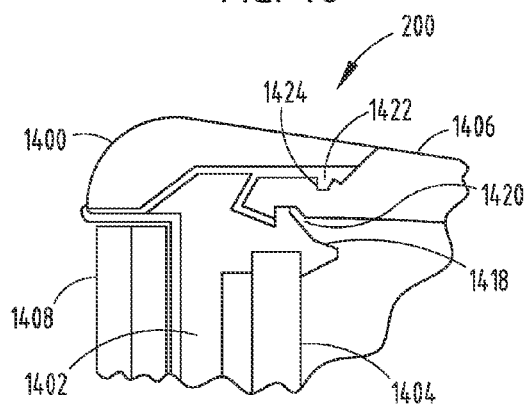
FIG. 47B is a partial cross-sectional view of one embodiment of a rearview assembly.

As to an embodiment illustrated in FIG. 47B, the bezel 1400 can be configured to snap fit with the rear housing 1406, and the carrier 1402 can be configured to snap fit with the rear housing 1406. The carrier 1402 can include a flange 1418 that is configured to wrap around the circuit board 1404, and further configured to be received by an indent 1420 that is defined by the rear housing 1406. The bezel 1400 can include a flange 1422 that is received by an indent 1424 that is defined by the rear housing.

Figure 47C:
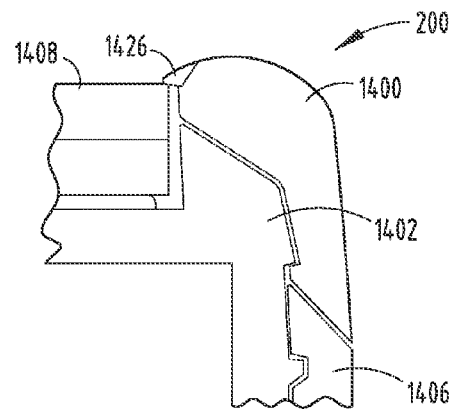
FIG. 47C is a partial cross-sectional view of one embodiment of a rearview assembly.

Referring to FIG. 47C, the illustrated embodiment includes bezel 1400, which is configured to snap-fit or adhere with the carrier 1402. The carrier 1402 can likewise be configured to snap-fit or adhere with the rear housing 1406. The bezel 1400 may include a two-shot elastomer 1426 connecting the bezel 1400 with a forward portion of the mirror assembly 1408. This elastomeric portion aids in relieving hoop stress and fills the gap between the mirror element and the bezel 1400, reducing ingress of dirt and contamination, and providing a better aesthetic appearance.

Figure 47D:
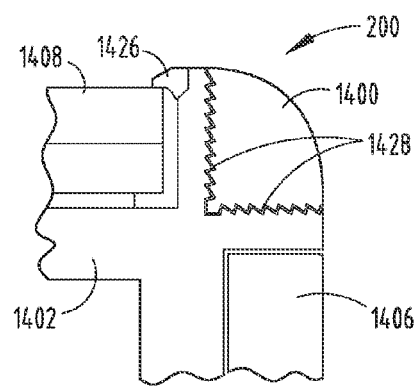
FIG. 47D is a partial cross-sectional view of one embodiment of a rearview assembly.
Figure 48A:
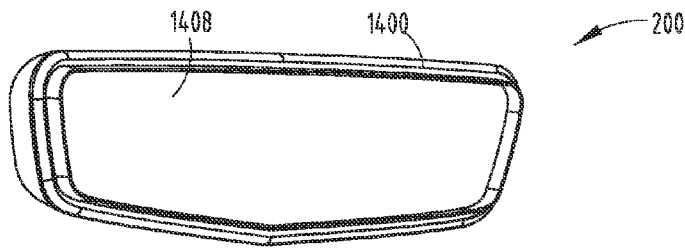
FIG. 48A is a perspective view of one embodiment of a rearview assembly.
Figure 48B:
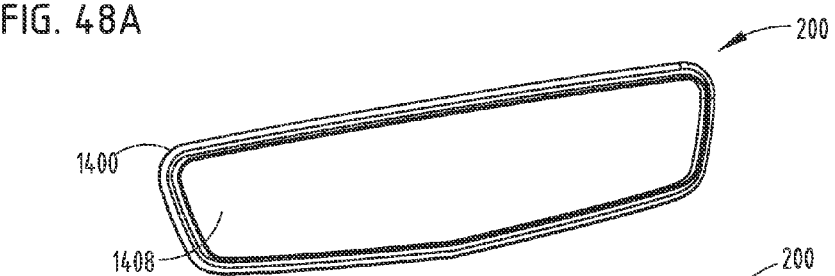
FIG. 48B is a front perspective view of the rearview assembly of FIG. 48A.
Figure 48C:
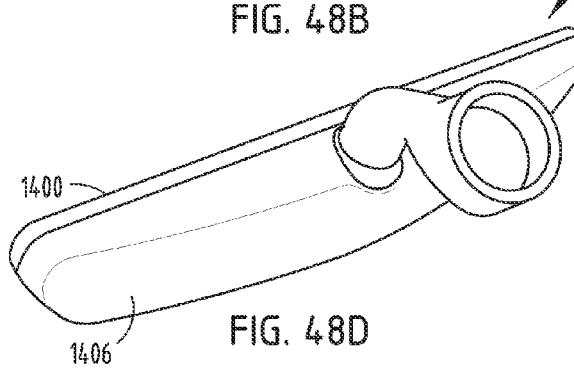
FIG. 48C is a side view of the rearview assembly of FIG. 48A.
Figure 48D:
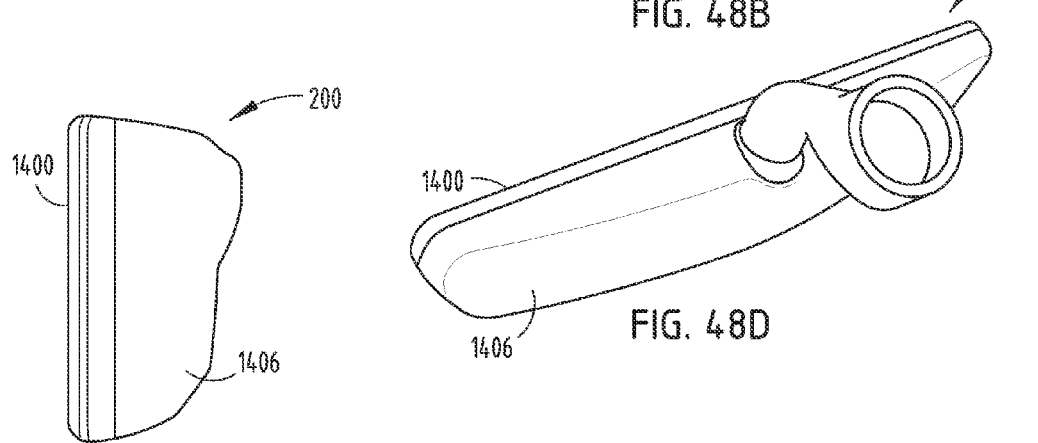
FIG. 48D is a top perspective view of the rearview assembly of FIG. 48A having a mount structure.
Figure 48E:
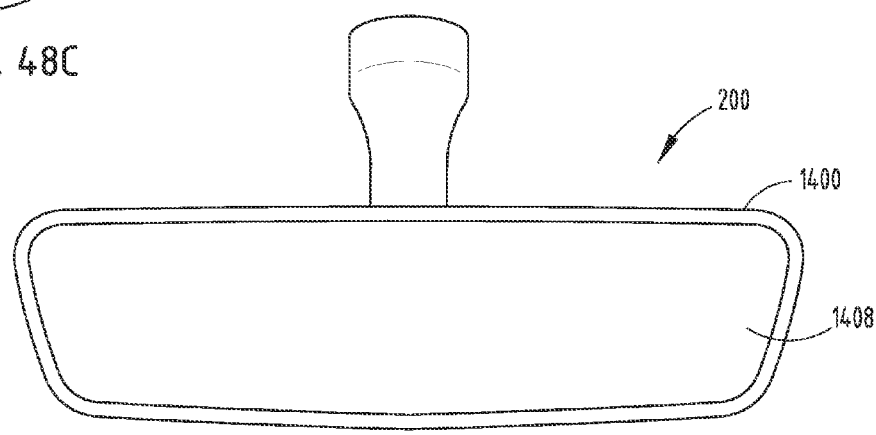
FIG. 48E is a front view of the rearview assembly of FIG. 48D.

Referring now to the embodiment illustrated in FIG. 47D, the bezel 1400 may generally define a clear light pipe that is held in place by a sawtooth interface between the carrier 1402 and the bezel 1400. Similar to the embodiment noted above in FIG. 47C, a two-shot elastomer 1426 is provided at the interface between the bezel 1400 and the forward portion of the mirror assembly 1408. A sawtooth construction 1428 between the bezel 1400 and the carrier 1402 holds the bezel 1400 in place and at the same time provides an aesthetically pleasing optical feature. It should be noted that any of the bezel 1400 surfaces indicated in FIGS. 45-48E could be created with a reflective or decorative layer, as desired. The bezel 1400 components could be attached mechanically or with an adhesive.

Typically, the above-described male and female connections extend along a horizontal axis of the rearview assembly 200 (i.e., along a top and/or bottom edge of the component), and not along a vertical axis of the rearview assembly 200 (i.e., along a side of the component). It should be appreciated by those skilled in the art that the male and female connections can be switched between components.

Figure 49:
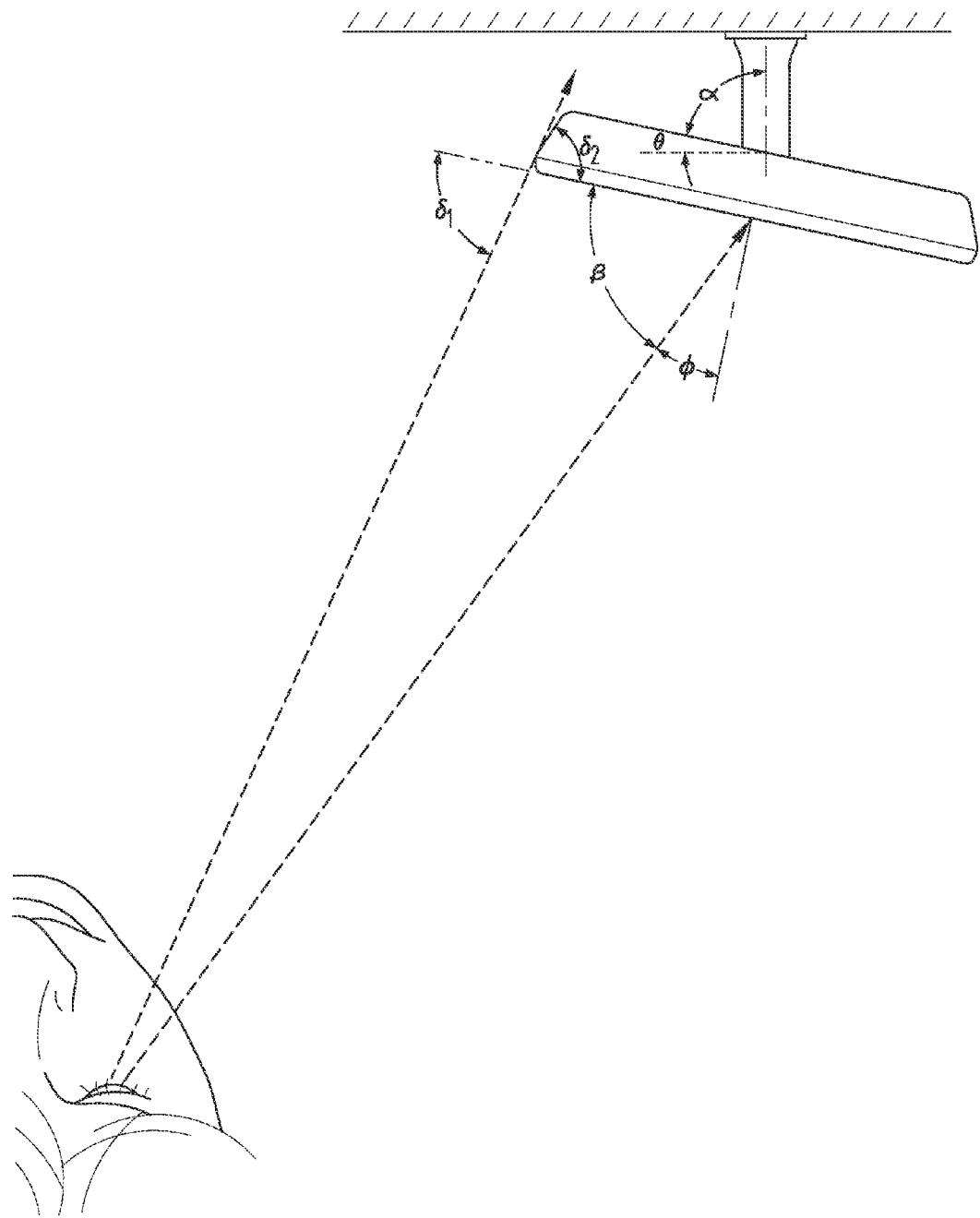
FIG. 49 is a top plan view of one embodiment of the rearview assembly of the present invention.

Referring now to FIG. 49, the rearview assembly 200 is connected to the vehicle windshield such that the rearview assembly mount extends orthogonally from the windshield, when viewed from a top plan perspective. The rearview assembly 200 is tilted at angle θ toward the driver. It will be appreciated that the angle θ may be anywhere from 12 degrees to 17 degrees. Thus, the complimentary angle of α, which is the angle from a line parallel with the longitudinal extent of the vehicle to a line parallel with the longitudinal extent of a rear wall of the housing 204 is approximately 73 degrees to 78 degrees. Thus, a driver of average proportions will view a midpoint of the rearview assembly 200 at an angle β, which is approximately 61 degrees to 66 degrees measured from the planar extent of the rearward viewing device 208 of the rearview assembly 200. Thus, the complimentary angle φ from the driver's line of sight to a line extending orthogonally from the rearward viewing device 208, is generally between 19 degrees and 24 degrees.

Referring again to FIG. 49, the angle $\delta_1$, which is the angle from the driver's line of sight to a proximal edge of the bezel 300, will not generally exceed 66 degrees. Likewise, the angle $\delta_2$ will also not generally exceed 66 degrees. Consequently, the bezel 300 prevents the driver from seeing any part of the housing 204 of the rearview assembly 200, thereby providing an aesthetically desirable slim look to the mirror assembly.

Figure 50:
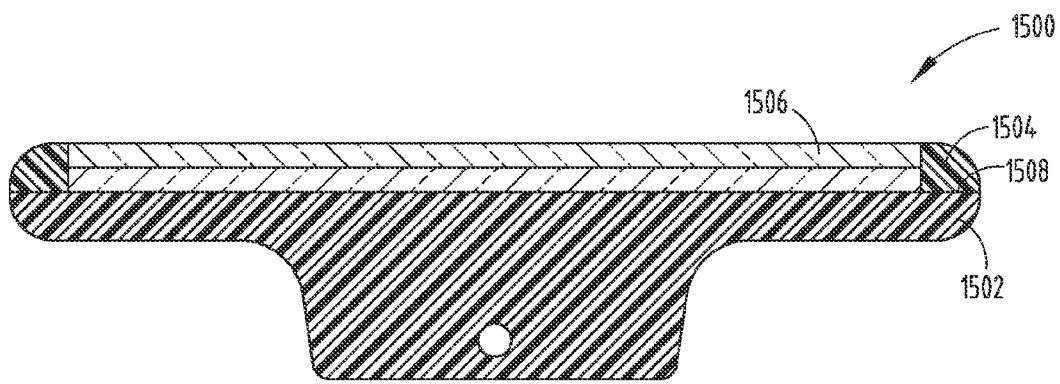
FIG. 50 is a top plan view of another embodiment of the rearview assembly of the present invention.
Figure 50A:
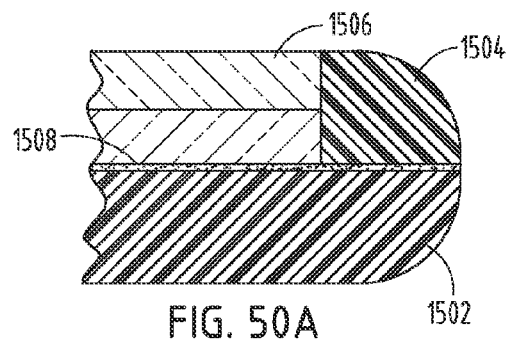
FIG. 50A is an enlarged top plan view of a portion of FIG. 50.
Figure 50B:
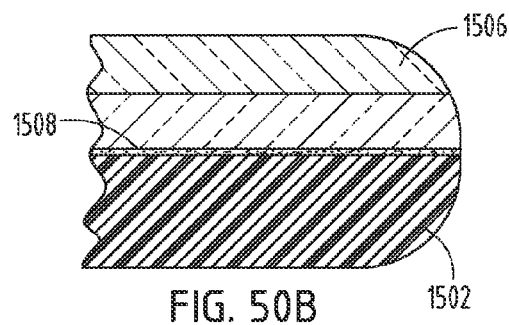
FIG. 50B is another enlarged top plan view of a portion of FIG. 50.
Figure 50C:
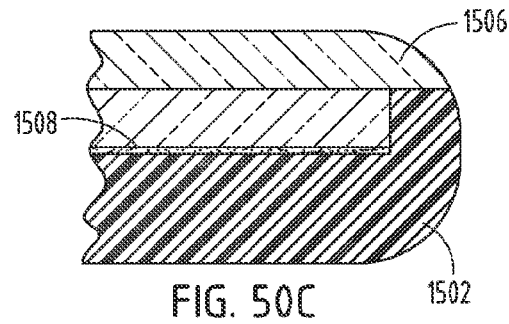
FIG. 50C is another enlarged top plan view of a portion of FIG. 50.

Referring now to FIGS. 50 and 50A, yet another embodiment of a rearview assembly 1500 is illustrated which includes a housing 1502 having a bezel 1504 at an outer periphery thereof. The bezel 1504 secures a rearward viewing device 1506. The radius of the outer corner of the bezel 1504 as well as a rear portion of the housing 1502 proximate the bezel 1504 is approximately 2.5 mm. As noted in FIG. 50A, an adhesive may be used to secure the bezel 1504 with the housing 1502. The mirror assembly, as indicated in FIGS. 50 and 50A, provides an aesthetically desirable slim look from most all viewing angles including that of the driver.

It will be understood that the bezel as defined herein may or may not be clear or even partially clear in construction. It is also to be understood that variations and modifications can be made on the aforementioned structure without departing from the concepts of the present invention, and further it is to be understood that such concepts are intended to be covered by the following claims unless these claims by their language expressly state otherwise. It is also understood that the forward facing rounded portion could be formed in the rearward viewing device 1506.

What is claimed is:

1. A rearview assembly comprising:
a mounting structure configured to be operably coupled with an interior windshield of a vehicle;
a housing operably connected with the mounting structure;
a rearward viewing device supported by one of the housing and the mounting structure, the rearward viewing device providing a rearward view to a vehicle driver and including a front substrate, defining first and second surfaces and a rear substrate defining third and fourth surfaces, wherein the entire first surface of the front substrate is exposed and wherein the entire rear substrate is positioned behind the front substrate;
a peripheral concealing layer disposed about a periphery of the rearward viewing device on the second surface of the front substrate;
a bezel including a rear wall that supports the rear substrate, the bezel extending around the entire periphery of the rearward viewing device adjacent to both the rearward viewing device and the housing, wherein the entire bezel is light transmissive, and further wherein the bezel is substantially flush with the first surface of the front substrate such that the first surface of the front substrate is unobstructed by the bezel; and
a light source proximate the bezel.

2. The rearview assembly of claim 1, further comprising:
a hiding layer disposed between one of:
the bezel and rearward viewing device; and
the bezel and the housing.

3. The rearview assembly of claim 1, wherein the bezel includes an outer perimeter that is larger than an outer perimeter of the housing edge.

4. The rearview assembly of claim 1, wherein the bezel includes a rear wall and wherein at least one total internal reflection reflector is disposed on the rear wall.

5. A rearview assembly comprising:
a mounting structure configured to be operably coupled with an interior windshield of a vehicle;
a housing operably connected with the mounting structure;
a rearward viewing device having a front substrate defining first and second surfaces and a rear substrate defining third and fourth surfaces and being supported by one of the housing and the mounting structure, the rearward viewing device being adapted to provide a rearward view to a vehicle driver;
a peripheral concealing layer disposed about a periphery of the rearward viewing device on the second surface of the front substrate;
a bezel that extends completely around a periphery of the rearward viewing device, wherein the entire bezel is light transmissive and is disposed adjacent to both the rearward viewing device and the housing such that the entire first surface is unobstructed b the bezel the bezel including a rear wall that supports the rear surface of the rearward viewing device;
a hiding layer disposed between one of:
the bezel and rearward viewing device, about a majority of a forward periphery of the rearward viewing device; and
the bezel and the housing, about a majority of a peripheral edge of the housing; and
a light source proximate the bezel.

6. The rearview assembly of claim 5, wherein the hiding layer at least partially reduces the visibility of a peripheral portion of the rearward viewing device.

7. The rearview assembly of claim 5, wherein the rearward viewing device includes one of an electrochromic element and a prism-type element.

8. The rearview assembly of claim 5, wherein the bezel includes a bulbous peripheral frame that extends around an outer edge of the rearward viewing device.

9. The rearview assembly of claim 8, wherein the bulbous peripheral frame includes a multi-radius arcuate outer edge.

10. The rearview assembly of claim 5, wherein the bezel is constructed from at least one of a transparent plastic, transparent elastomer, acrylic, polycarbonate, cyclic polyolefin, polyolefin, polysulfone, PVC, epoxy, silicone, polyurethane.

11. The rearview assembly of claim 5, wherein the rear wall only extends behind a periphery of the rearward viewing device.

12. The rearview assembly of claim 11, wherein the rear wall includes a plurality of connecting members separated by slots.

13. The rearview assembly of claim 5, wherein the bezel includes a plurality of flexible protuberances that flex against the rearward viewing device.

14. The rearview assembly of claim 5, wherein the hiding layer is a reflective layer that is formed from one of an opaque, diffuse, reflective, and translucent material.

15. The rearview assembly of claim 5, wherein the hiding layer is integrally formed in the bezel.

16. The rearview assembly of claim 5, wherein the light source includes a plurality of distinct lighting elements spaced substantially uniformly about the bezel.

17. The rearview assembly of claim 16, wherein the light source is disposed proximate an interior portion of the rear wall.

18. The rearview assembly of claim 5, wherein the
light source is in optical communication with the bezel via a light pipe.

19. The rearview assembly of claim 5, wherein a forward edge of the bezel is substantially flush with the first surface of the rearward viewing device.

20. The rearview assembly of claim 5, wherein the bezel includes an arcuate outer edge substantially flush with a forward edge of the rearward viewing device and a side edge of the housing.

21. A rearview assembly comprising:
a mounting structure configured to be operably coupled with an interior windshield of a vehicle;
a housing operably connected with the mounting structure;
a rearward viewing device having a front surface and a rear surface and being operably coupled with the housing proximate a forward edge of the housing, wherein the rearward viewing device is configured to provide a rearward view to a vehicle driver;
a peripheral concealing layer disposed between the front surface and rear surface;
a bezel having a rear wall supporting the rear surface of the rearward viewing device, the bezel being disposed adjacent to the rearward viewing device and the housing, the bezel having a forward edge that is light transmissive and that is substantially flush with the front surface of the rearward viewing device and an outer perimeter that is larger than an outer perimeter of the forward edge of the housing and further comprising a hiding layer between one of:
the bezel and the rearward viewing device, about a majority of a periphery of the rearward viewing device; and
the bezel and the housing, about a majority of a peripheral edge of the housing.

22. The rearview assembly of claim 21, wherein the hiding layer is a reflective layer that is formed from one of an opaque, diffuse, reflective, or translucent material.

23. The rearview assembly of claim 21, wherein the rearward viewing device includes one of an electrochromic element and a prism-type construction.

24. A rearview assembly comprising:
a mounting structure configured to be operably coupled with an interior windshield of a vehicle;
a housing with an outer wall operably connected to the mounting structure;
a rearward viewing device having a front surface and a rear surface, the rearward viewing device being operably connected to the housing and adapted to provide a rearward view to a vehicle driver;
a peripheral concealing layer disposed between the front surface and rear surface;
a bezel that supports the rear surface of the rearward viewing device and that extends completely around a periphery of the rearward viewing device adjacent to both the rearward viewing device and the housing, wherein the entire bezel is light transmissive and has a forward edge that is substantially flush with the front surface of the rearward viewing device such that the front surface of the rearward viewing device is unobstructed by the bezel, the bezel further having a side edge that is substantially flush with the outer wall of the housing; and
a hiding layer disposed on the bezel proximate a forward edge of the outer wall.

25. The rearview assembly of claim 24, wherein the hiding layer at least partially reduces the visibility of a peripheral portion of the rearward viewing device.

26. The rearview assembly of claim 24, wherein the hiding layer is a reflective layer that is formed from one of an opaque, diffuse, reflective, or translucent material.

27. The rearview assembly of claim 24, wherein the rearward viewing device includes one of an electrochromic element and a prism-type construction.

28. The rearview assembly of claim 24, further comprising:
a light source adjacent to the bezel and configured to illuminate a portion of the bezel.

29. A rearview assembly comprising: a mounting structure configured to be operably coupled with an interior windshield of a vehicle;
a housing operably connected with the mounting structure;
a rearward viewing device supported by one of the housing and the mounting structure, the rearward viewing device having a front surface and a rear surface, and being adapted to provide a rearward view to a vehicle driver;
a peripheral concealing layer disposed between the front surface and rear surface;
a bezel including a rear wall that supports the rearward viewing device, the bezel extending completely around a periphery of the rearward viewing device and includes an arcuate outer wall and an inner wall adjacent to an outer periphery of the rearward viewing device, wherein the entire arcuate outer wall of the bezel is light transmissive, and wherein a front surface of the rearward viewing device is unobstructed by the bezel; and a light source adjacent the bezel and configured to illuminate at least a portion of the bezel.

30. The rearview assembly of claim 29, wherein the bezel is constructed from a first material that is substantially optically clear and from a second material that is not substantially optically clear.

31. The rearview assembly of claim 29, wherein the bezel further includes a recess that encompasses a forward edge of the housing.

32. The rearview assembly of claim 29, wherein the inner wall includes a stepped construction.

33. The rearview assembly of claim 29, wherein the inner wall includes an angled portion that defines a triangular void between the inner wall and the rearward viewing device.

34. The rearview assembly of claim 29, wherein the inner wall includes an arcuate portion that defines an arcuate void between the inner wall and the rearward viewing device.

35. The rearview assembly of claim 29, wherein the inner wall includes a reflective layer disposed thereon.

36. The rearview assembly of claim 29, wherein the inner wall includes a plurality of channels disposed thereon.

37. A rearview assembly comprising:
a mounting structure configured to be operably coupled with an interior windshield of a vehicle;
a housing operably connected with the mounting structure;
a rearward viewing device supported by one of the housing and the mounting structure, the rearward viewing device having a front surface and a rear surface, and being adapted to provide a rearward view to a vehicle driver;
a peripheral concealing layer disposed between the front surface and rear surface;
a bezel including a rear wall that supports the rearward viewing device, the bezel being adjacent to and unobstructing the rearward viewing device, wherein the entire bezel is light transmissive;
a decorative treatment disposed between the bezel and the rearward viewing device; and
and a light source proximate the bezel that optically communicates with first and second light receiving ends of the bezel to illuminate a periphery of the bezel.

38. The rearview assembly of claim 37, wherein one of the bezel and the forward edge of the rearward viewing device includes an arcuate portion, thereby defining an arcuate void between the bezel and the forward edge.

39. The rearview assembly of claim 37, wherein one of the bezel and the forward edge of the rearward viewing device includes an angled portion, thereby defining a triangular void between the bezel and the forward edge.

40. The rearview assembly of claim 37, wherein one of the bezel and the forward edge of the rearward viewing device includes a plurality of acute channels.

41. The rearview assembly of claim 37, wherein the bezel is operably connected to the housing via a snap-fit connection.

42. The rearview assembly of claim 37, wherein the bezel is operably connected to a carrier disposed inside the housing via a snap-fit connection.

43. A rearview assembly comprising:
   a mounting structure configured to be operably coupled with an interior windshield of a vehicle;
   a housing operably connected with a mounting structure;
   a rearward viewing device supported by one of the housing and the mounting structure, the rearward viewing device having a front surface and a rear surface, and being adapted to provide a rearward view to a vehicle driver;
   a peripheral concealing layer disposed between a front surface and rear surface;
   a bezel having a rear wall that supports the rear surface of the rearward viewing device, the bezel being adjacent to and obstructing the rearward viewing device, wherein the entire bezel is light transmissive;
   a decorative treatment disposed between the bezel and the rearward viewing device;
   and a light source proximate the bezel and a reflector proximate the light source, wherein the reflector is adapted to reflect light from the light source to a light pipe that is in optical communication with the bezel, resulting in illumination of a forward peripheral edge of the bezel.

44. The rearview assembly of claim 43, wherein the reflector is a total internal reflection reflector.

* * * * *

UNITED STATES PATENT AND TRADEMARK OFFICE
CERTIFICATE OF CORRECTION

| | | |
|---|---|---|
| PATENT NO. | : 8,827,517 B2 | Page 1 of 1 |
| APPLICATION NO. | : 13/271745 | |
| DATED | : September 9, 2014 | |
| INVENTOR(S) | : Cammenga et al. | |

It is certified that error appears in the above-identified patent and that said Letters Patent is hereby corrected as shown below:

In the Specification,

Col. 7, line 65;

"8202" should be --R202--.

Col. 8, line 21;

"5,336,448 6,020,987" should be --5,336,448. U.S. Pat. No. 6,020,987--.

In the Claims,

Col. 32, claim 5, line 19;

"b" should be --by--.

Col. 32, claim 5, line 19;

"bezel" should be --bezel,-- ($1^{st}$ occurrence).

Col. 34, claim 37, line 63;

Delete "and".

Col. 36, claim 43, lines 12-13;

Move the "and" up to the previous line, following --device;--.

Signed and Sealed this
Eighth Day of September, 2015

Michelle K. Lee
*Director of the United States Patent and Trademark Office*